United States Patent
Periyagaram et al.

(10) Patent No.: US 12,541,486 B2
(45) Date of Patent: *Feb. 3, 2026

(54) COPYING A FILE SYSTEM

(71) Applicant: Pure Storage, Inc., Mountain View, CA (US)

(72) Inventors: Subramaniam Periyagaram, Campbell, CA (US); Dirk Meister, Mountain View, CA (US); Zoheb Shivani, Newark, CA (US); Ronald Karr, Palo Alto, CA (US)

(73) Assignee: Pure Storage, Inc., Santa Clara, CA (US)

( * ) Notice: Subject to any disclaimer, the term of this patent is extended or adjusted under 35 U.S.C. 154(b) by 913 days.

This patent is subject to a terminal disclaimer.

(21) Appl. No.: 17/162,038

(22) Filed: Jan. 29, 2021

(65) Prior Publication Data

US 2021/0303522 A1  Sep. 30, 2021

Related U.S. Application Data

(63) Continuation-in-part of application No. 17/022,857, filed on Sep. 16, 2020, now Pat. No. 12,373,397, and
(Continued)

(51) Int. Cl.
*G06F 16/178* (2019.01)
*G06F 16/188* (2019.01)

(52) U.S. Cl.
CPC .......... *G06F 16/178* (2019.01); *G06F 16/188* (2019.01)

(58) Field of Classification Search
CPC ...... G06F 16/178; G06F 16/188; G06F 3/061; G06F 3/064; G06F 3/0643; G06F 3/0688; G06F 16/16; G06F 16/13
See application file for complete search history.

(56) References Cited

U.S. PATENT DOCUMENTS

| 5,802,547 A | 9/1998 | Legvold |
| 5,832,527 A | 11/1998 | Kawaguchi |

(Continued)

FOREIGN PATENT DOCUMENTS

WO  WO-2017053916 A1  3/2017

OTHER PUBLICATIONS

"International Search Report and Written Opinion received in International Application No. PCT/US2021/023728, dated Jun. 21, 2021."

(Continued)

*Primary Examiner* — Kenneth M Lo
*Assistant Examiner* — Jonah C Krieger
(74) *Attorney, Agent, or Firm* — ALG Intellectual Property, LLC

(57) ABSTRACT

An illustrative data storage system is configured to use pods to efficiently copy files systems constructed of block objects. In certain examples, the storage system generates, based on a pod that includes a file system constructed of block objects, a virtual copy of the pod such that modifications made to the pod (e.g., modifications to contents of the block objects by way of the pod) after the generation of the virtual copy of the pod are distinct from the virtual copy of the pod. In certain examples, the virtual copy of the pod is a writeable clone of the pod and modifications made to the clone (e.g., modifications to contents of the block objects by way of the clone) after the generation of the clone are distinct from the pod.

20 Claims, 29 Drawing Sheets

Related U.S. Application Data a continuation-in-part of application No. 16/834,762, filed on Mar. 30, 2020, now Pat. No. 11,704,035.

(60) Provisional application No. 63/077,259, filed on Sep. 11, 2020, provisional application No. 63/036,955, filed on Jun. 9, 2020.

(56) References Cited

U.S. PATENT DOCUMENTS

| | | | |
|---|---|---|---|
| 5,933,368 | A | 8/1999 | Ma |
| 6,473,775 | B1 | 10/2002 | Kusters |
| 6,484,177 | B1 | 11/2002 | Van Huben |
| 6,542,967 | B1 | 4/2003 | Major |
| 6,643,654 | B1 | 11/2003 | Patel |
| 6,647,473 | B1 | 11/2003 | Golds |
| 6,748,420 | B1 | 6/2004 | Quatrano et al. |
| 6,915,420 | B2 | 7/2005 | Hensley |
| 6,934,822 | B2 | 8/2005 | Armangau |
| 6,957,362 | B2 | 10/2005 | Armangau |
| 6,970,975 | B2 | 11/2005 | Frank |
| 6,976,146 | B1 | 12/2005 | Aiello |
| 7,007,047 | B2 | 2/2006 | Zelenka |
| 7,016,907 | B2 | 3/2006 | Boreham et al. |
| 7,065,558 | B2 | 6/2006 | Ramanathan et al. |
| 7,162,486 | B2 | 1/2007 | Patel |
| 7,200,627 | B2 | 4/2007 | Stickler |
| 7,225,210 | B2 | 5/2007 | Guthrie, II |
| 7,409,494 | B2 | 8/2008 | Edwards |
| 7,409,511 | B2 | 8/2008 | Edwards |
| 7,478,096 | B2 | 1/2009 | Margolus |
| 7,499,905 | B2 | 3/2009 | Jaschek |
| 7,506,111 | B1 | 3/2009 | Hamilton |
| 7,529,905 | B2 | 5/2009 | Sinclair |
| 7,539,706 | B1 | 5/2009 | Campbell |
| 7,587,570 | B2 | 9/2009 | Sarkar |
| 7,631,156 | B2 | 12/2009 | Nakamura et al. |
| 7,634,514 | B2 | 12/2009 | Langan et al. |
| 7,636,776 | B2 | 12/2009 | Shah et al. |
| 7,664,798 | B2 | 2/2010 | Wood |
| 7,680,996 | B2 | 3/2010 | Komarov |
| 7,711,946 | B2 | 5/2010 | Gilliam |
| 7,725,668 | B2 | 5/2010 | Akutsu |
| 7,734,603 | B1 | 6/2010 | Mcmanis |
| 7,739,312 | B2 | 6/2010 | Gordon |
| 7,743,023 | B2 | 6/2010 | Teodosiu |
| 7,747,637 | B2 | 6/2010 | Haselden et al. |
| 7,756,821 | B2 | 7/2010 | Havens et al. |
| 7,757,056 | B1 | 7/2010 | Fair |
| 7,774,312 | B2 | 8/2010 | Ngai |
| 7,779,034 | B2 | 8/2010 | Pedersen et al. |
| 7,801,894 | B1 | 9/2010 | Bone |
| 7,814,262 | B2 | 10/2010 | Sinclair |
| 7,827,350 | B1 | 11/2010 | Jiang |
| 7,836,017 | B1 | 11/2010 | Srinivasan |
| 7,849,057 | B1 | 12/2010 | Kazar |
| 7,853,624 | B2 | 12/2010 | Friedlander et al. |
| 7,873,614 | B2 | 1/2011 | Boreham et al. |
| 7,877,539 | B2 | 1/2011 | Sinclair |
| 7,958,095 | B1 | 6/2011 | Campbell |
| 7,991,942 | B2 | 8/2011 | Biswas |
| 7,996,636 | B1 | 8/2011 | Prakash |
| 8,046,522 | B2 | 10/2011 | Sinclair |
| 8,055,832 | B2 | 11/2011 | Sinclair |
| 8,117,164 | B2 | 2/2012 | Spektor |
| 8,121,981 | B2 | 2/2012 | Simek |
| 8,190,798 | B1 | 5/2012 | Dalal et al. |
| 8,190,832 | B2 | 5/2012 | Dickey |
| 8,190,850 | B1 | 5/2012 | Davenport |
| 8,195,623 | B2 | 6/2012 | Prahlad |
| 8,195,636 | B2 | 6/2012 | Stager |
| 8,195,980 | B2 | 6/2012 | Schuba |
| 8,214,583 | B2 | 7/2012 | Sinclair |
| 8,224,781 | B2 | 7/2012 | Popovski |
| 8,230,085 | B2 | 7/2012 | Roa |
| 8,245,035 | B2 | 8/2012 | Khalidi et al. |
| 8,255,651 | B2 | 8/2012 | Liu |
| 8,280,908 | B2 | 10/2012 | Khalidi et al. |
| 8,284,198 | B1 | 10/2012 | Hackworth |
| 8,285,681 | B2 | 10/2012 | Prahlad |
| 8,286,030 | B1 | 10/2012 | Chatterjee |
| 8,321,380 | B1 | 11/2012 | Leverett |
| 8,352,785 | B1 | 1/2013 | Nicklin et al. |
| 8,370,302 | B2 | 2/2013 | Otani |
| 8,412,682 | B2 | 4/2013 | Zheng |
| 8,433,682 | B2 | 4/2013 | Ngo |
| 8,458,690 | B2 | 6/2013 | Zhang |
| 8,484,164 | B1 | 7/2013 | Sivakumar |
| 8,549,648 | B2 | 10/2013 | Sallam |
| 8,589,447 | B1 | 11/2013 | Grunwald |
| 8,613,093 | B2 | 12/2013 | Camp |
| 8,959,048 | B1 | 2/2015 | Rossberg |
| 8,984,221 | B2 | 3/2015 | Satoyama et al. |
| 9,002,807 | B2 | 4/2015 | Hasegawa et al. |
| 9,015,123 | B1 | 4/2015 | Mathew |
| 9,043,637 | B2 | 5/2015 | Saika |
| 9,069,780 | B2 | 6/2015 | Zuckerman |
| 9,116,901 | B2 | 8/2015 | Bostock |
| 9,152,776 | B2 | 10/2015 | Aggarwal et al. |
| 9,223,679 | B1 | 12/2015 | Ho |
| 9,280,556 | B2 | 3/2016 | Hasegawa et al. |
| 9,286,182 | B2 | 3/2016 | Fries |
| 9,378,067 | B1 | 6/2016 | Agarwala et al. |
| 9,417,815 | B1 | 8/2016 | Elisha |
| 9,471,587 | B2 | 10/2016 | Conway et al. |
| 9,496,043 | B1 | 11/2016 | Camp et al. |
| 9,521,198 | B1 | 12/2016 | Agarwala et al. |
| 9,552,259 | B1 | 1/2017 | Chopra |
| 9,558,078 | B2 | 1/2017 | Farlee |
| 9,563,555 | B2 | 2/2017 | Flynn |
| 9,569,123 | B2 | 2/2017 | Desantis |
| 9,569,455 | B1 | 2/2017 | Bono |
| 9,606,909 | B1 | 3/2017 | Vincent |
| 9,619,335 | B1 | 4/2017 | Bushman |
| 9,635,132 | B1 | 4/2017 | Lin |
| 9,639,296 | B1 | 5/2017 | Vincent |
| 9,646,024 | B2 | 5/2017 | Srivas |
| 9,665,306 | B1 | 5/2017 | Patwardhan |
| 9,679,040 | B1 | 6/2017 | Davis |
| 9,697,268 | B1 | 7/2017 | Prater |
| 9,715,348 | B2 | 7/2017 | Periyagaram |
| 9,715,507 | B2 | 7/2017 | Brand |
| 9,720,619 | B1 | 8/2017 | Shah et al. |
| 9,753,659 | B2 | 9/2017 | Hasegawa et al. |
| 9,753,932 | B1 | 9/2017 | Brow |
| 9,767,106 | B1 | 9/2017 | Duggal |
| 9,778,881 | B2 | 10/2017 | Romanovskiy |
| 9,792,941 | B2 | 10/2017 | Farey |
| 9,830,096 | B2 | 11/2017 | Raj |
| 9,858,155 | B2 | 1/2018 | Ashutosh |
| 9,870,367 | B2 | 1/2018 | Sergeev |
| 9,875,054 | B2 | 1/2018 | Vishniac |
| 9,880,762 | B1 | 1/2018 | Armangau |
| 9,886,346 | B2 | 2/2018 | Kumarasamy |
| 9,891,833 | B2 | 2/2018 | Devendrappa |
| 9,904,487 | B2 | 2/2018 | Elisha |
| 9,921,773 | B2 | 3/2018 | Georgiev |
| 9,928,246 | B1 | 3/2018 | Xu |
| 9,940,066 | B2 | 4/2018 | Eggers |
| 9,959,070 | B2 | 5/2018 | Vishniac |
| 9,959,280 | B1 | 5/2018 | Whitehead |
| 9,965,203 | B1 | 5/2018 | Agarwala et al. |
| 9,965,204 | B1 | 5/2018 | Cousins |
| 9,983,933 | B2 | 5/2018 | Furman |
| 9,983,934 | B2 | 5/2018 | Furman |
| 10,007,445 | B2 | 6/2018 | Nithrakashyap |
| 10,019,180 | B1 | 7/2018 | Miah |
| 10,031,672 | B2 | 7/2018 | Wang |
| 10,055,149 | B2 | 8/2018 | Dewey |
| 10,108,356 | B1 | 10/2018 | Natanzon |
| 10,140,054 | B2 | 11/2018 | Chiu |
| 10,185,505 | B1 | 1/2019 | Golden |
| 10,228,871 | B2 | 3/2019 | Patnaik |
| 10,248,618 | B1 | 4/2019 | Gaurav |

(56) References Cited

U.S. PATENT DOCUMENTS

| | | |
|---|---|---|
| 10,248,657 B2 | 4/2019 | Prahlad |
| 10,275,308 B2 | 4/2019 | Czezatke |
| 10,275,317 B2 | 4/2019 | Borate |
| 10,339,101 B1 | 7/2019 | Gupta |
| 10,360,261 B2 | 7/2019 | Zuckerman |
| 10,397,241 B2 | 8/2019 | White et al. |
| 10,437,687 B2 | 10/2019 | Bushman |
| 10,437,787 B2 | 10/2019 | Plisko |
| 10,452,641 B1 | 10/2019 | Batchu |
| 10,503,427 B2 | 12/2019 | Botes et al. |
| 10,503,771 B2 | 12/2019 | Maybee |
| 10,528,521 B2 | 1/2020 | Agarwal |
| 10,534,749 B1 | 1/2020 | Miah |
| 10,628,379 B1 | 4/2020 | Sela et al. |
| 10,795,598 B1 | 10/2020 | Vohra |
| 12,298,753 B2 | 5/2025 | Walzenbach et al. |
| 2002/0178146 A1 | 11/2002 | Akella |
| 2003/0088593 A1 | 5/2003 | Stickler |
| 2003/0163550 A1 | 8/2003 | Ramanathan et al. |
| 2003/0182301 A1 | 9/2003 | Patterson |
| 2003/0187883 A1 | 10/2003 | Zelenka |
| 2004/0030727 A1 | 2/2004 | Armangau |
| 2004/0030951 A1 | 2/2004 | Armangau |
| 2004/0059866 A1 | 3/2004 | Patel |
| 2004/0098539 A1 | 5/2004 | Frank |
| 2004/0133790 A1 | 7/2004 | Hensley |
| 2004/0167938 A1 | 8/2004 | Margolus |
| 2004/0167943 A1 | 8/2004 | Margolus |
| 2004/0250033 A1 | 12/2004 | Prahlad et al. |
| 2005/0114402 A1 | 5/2005 | Guthrie, II |
| 2005/0182910 A1 | 8/2005 | Stager |
| 2005/0246397 A1 | 11/2005 | Edwards |
| 2005/0246401 A1 | 11/2005 | Edwards |
| 2006/0123211 A1 | 6/2006 | Derk |
| 2006/0184719 A1 | 8/2006 | Sinclair |
| 2006/0184720 A1 | 8/2006 | Sinclair |
| 2007/0022091 A1 | 1/2007 | Styles et al. |
| 2007/0033328 A1 | 2/2007 | Sinclair |
| 2007/0083501 A1 | 4/2007 | Pedersen et al. |
| 2007/0086260 A1 | 4/2007 | Sinclair |
| 2007/0088669 A1 | 4/2007 | Jaschek |
| 2007/0150559 A1 | 6/2007 | Smith |
| 2007/0174569 A1 | 7/2007 | Schnapp |
| 2007/0208790 A1 | 9/2007 | Reuter |
| 2007/0220029 A1 | 9/2007 | Jones et al. |
| 2007/0288487 A1 | 12/2007 | Song et al. |
| 2008/0005060 A1 | 1/2008 | Khalidi et al. |
| 2008/0005133 A1 | 1/2008 | Khalidi et al. |
| 2008/0005141 A1 | 1/2008 | Zheng |
| 2008/0034176 A1 | 2/2008 | Akutsu |
| 2008/0046432 A1 | 2/2008 | Anderson |
| 2008/0082593 A1 | 4/2008 | Komarov |
| 2008/0109394 A1 | 5/2008 | Havens et al. |
| 2008/0155178 A1 | 6/2008 | Sinclair |
| 2008/0177770 A1 | 7/2008 | Friedlander et al. |
| 2008/0270461 A1 | 10/2008 | Gordon |
| 2009/0024600 A1 | 1/2009 | Martin, Jr. et al. |
| 2009/0164705 A1 | 6/2009 | Gorobets |
| 2009/0268903 A1 | 10/2009 | Bojinov |
| 2010/0037031 A1 | 2/2010 | Desantis |
| 2010/0070466 A1 | 3/2010 | Prahlad |
| 2010/0070726 A1 | 3/2010 | Ngo |
| 2010/0077013 A1 | 3/2010 | Clements |
| 2010/0077160 A1 | 3/2010 | Liu et al. |
| 2010/0169394 A1 | 7/2010 | Hahn |
| 2010/0180092 A1 | 7/2010 | Rajaa |
| 2010/0191922 A1 | 7/2010 | Dickey |
| 2010/0281081 A1 | 11/2010 | Stager |
| 2010/0281473 A1 | 11/2010 | Zhang |
| 2010/0299490 A1 | 11/2010 | Attarde |
| 2010/0306174 A1 | 12/2010 | Otani |
| 2010/0306277 A1 | 12/2010 | Rimer et al. |
| 2010/0306500 A1 | 12/2010 | Mimatsu |
| 2010/0332454 A1 | 12/2010 | Prahlad et al. |
| 2010/0332456 A1 | 12/2010 | Prahlad et al. |
| 2010/0333116 A1 | 12/2010 | Prahlad |
| 2011/0066768 A1 | 3/2011 | Brittner |
| 2011/0137966 A1 | 6/2011 | Srinivasan |
| 2011/0137991 A1 | 6/2011 | Russell |
| 2011/0218968 A1 | 9/2011 | Liu |
| 2011/0238936 A1 | 9/2011 | Hayden |
| 2011/0252208 A1 | 10/2011 | Ali et al. |
| 2011/0313973 A1 | 12/2011 | Srivas |
| 2012/0011176 A1 | 1/2012 | Aizman |
| 2012/0011336 A1 | 1/2012 | Saika |
| 2012/0011562 A1 | 1/2012 | Slater |
| 2012/0101991 A1 | 4/2012 | Srivas |
| 2012/0255011 A1 | 10/2012 | Sallam |
| 2012/0303585 A1 | 11/2012 | Zuckerman |
| 2013/0006936 A1 | 1/2013 | Chen |
| 2013/0007436 A1* | 1/2013 | Bookman ............ G06F 9/45533 713/2 |
| 2013/0024424 A1 | 1/2013 | Prahlad |
| 2013/0036098 A1* | 2/2013 | Mutalik ................ G06F 3/0604 707/690 |
| 2013/0036214 A1 | 2/2013 | Carmel |
| 2013/0054927 A1 | 2/2013 | Raj |
| 2013/0067175 A1 | 3/2013 | Yadav |
| 2013/0110790 A1 | 5/2013 | Matsumoto |
| 2013/0117239 A1 | 5/2013 | Hasegawa et al. |
| 2013/0212085 A1 | 8/2013 | Nica et al. |
| 2013/0268740 A1 | 10/2013 | Holt |
| 2013/0339406 A1 | 12/2013 | Kanfi |
| 2014/0081924 A1 | 3/2014 | Jennings et al. |
| 2014/0108519 A1* | 4/2014 | Klinkner ............... G06F 16/183 709/203 |
| 2014/0317371 A1 | 10/2014 | Muhlestein et al. |
| 2014/0321210 A1 | 10/2014 | Xiang |
| 2014/0325640 A1 | 10/2014 | Aggarwal et al. |
| 2014/0351217 A1 | 11/2014 | Bostock |
| 2014/0365540 A1 | 12/2014 | Conway et al. |
| 2015/0026126 A1 | 1/2015 | Lee et al. |
| 2015/0149411 A1 | 5/2015 | Plisko |
| 2015/0154418 A1 | 6/2015 | Redberg |
| 2015/0169618 A1 | 6/2015 | Hasegawa et al. |
| 2015/0261885 A1 | 9/2015 | Zuckerman |
| 2016/0054995 A1 | 2/2016 | Dehner et al. |
| 2016/0072898 A1 | 3/2016 | Fallon |
| 2016/0117099 A1 | 4/2016 | Prins et al. |
| 2016/0117228 A1 | 4/2016 | Farlee |
| 2016/0119428 A1 | 4/2016 | De Spiegeleer |
| 2016/0124978 A1 | 5/2016 | Nithrakashyap |
| 2016/0139996 A1 | 5/2016 | Mathew |
| 2016/0188236 A1 | 6/2016 | Hasegawa et al. |
| 2016/0283744 A1* | 9/2016 | Dawson ................. G06F 16/22 |
| 2016/0285779 A1 | 9/2016 | Commons et al. |
| 2016/0342334 A1 | 11/2016 | Elisha |
| 2016/0350006 A1 | 12/2016 | Wang |
| 2017/0031776 A1 | 2/2017 | Ren |
| 2017/0039218 A1 | 2/2017 | Prahlad |
| 2017/0091296 A1 | 3/2017 | Beard |
| 2017/0109227 A1 | 4/2017 | Furman |
| 2017/0109234 A1 | 4/2017 | Furman |
| 2017/0147439 A1 | 5/2017 | Charters |
| 2017/0212915 A1 | 7/2017 | Borate |
| 2017/0242599 A1 | 8/2017 | Patnaik |
| 2017/0262349 A1 | 9/2017 | Bushman |
| 2017/0262543 A1 | 9/2017 | Gerzi et al. |
| 2017/0277602 A1 | 9/2017 | Kumar |
| 2017/0300247 A1 | 10/2017 | Dewey |
| 2017/0300551 A1 | 10/2017 | Prater |
| 2017/0323110 A1 | 11/2017 | Griffith |
| 2017/0351695 A1 | 12/2017 | Rao |
| 2018/0034892 A1* | 2/2018 | Olsen ...................... G06F 16/17 |
| 2018/0081573 A1 | 3/2018 | Goodman et al. |
| 2018/0103062 A1 | 4/2018 | White et al. |
| 2018/0103104 A1 | 4/2018 | Burbey |
| 2018/0115556 A1 | 4/2018 | Otsubo |
| 2018/0181311 A1 | 6/2018 | Elisha |
| 2018/0196817 A1 | 7/2018 | Maybee et al. |
| 2018/0232279 A1 | 8/2018 | Furman |
| 2018/0232280 A1 | 8/2018 | Furman |
| 2018/0288057 A1 | 10/2018 | Varadamma et al. |
| 2018/0335902 A1 | 11/2018 | Arrouye et al. |

(56) References Cited

U.S. PATENT DOCUMENTS

| | | | |
|---|---|---|---|
| 2018/0356989 A1* | 12/2018 | Meister | G06F 3/062 |
| 2019/0012087 A1 | 1/2019 | Ding | |
| 2019/0146907 A1 | 5/2019 | Frolikov | |
| 2019/0155523 A1 | 5/2019 | Golden | |
| 2019/0179717 A1 | 6/2019 | Juniwal | |
| 2019/0199512 A1 | 6/2019 | Pentland | |
| 2019/0227878 A1 | 7/2019 | Agarwal | |
| 2019/0303010 A1 | 10/2019 | Meiri | |
| 2019/0303350 A1 | 10/2019 | Gupta | |
| 2019/0324663 A1 | 10/2019 | Kass et al. | |
| 2019/0370116 A1 | 12/2019 | Jacob | |
| 2019/0370249 A1 | 12/2019 | Batchu | |
| 2019/0370360 A1 | 12/2019 | Mainali | |
| 2019/0377802 A1 | 12/2019 | Haber | |
| 2019/0392053 A1* | 12/2019 | Chalakov | G06F 16/137 |
| 2020/0019620 A1 | 1/2020 | Sarda et al. | |
| 2020/0034051 A1 | 1/2020 | Zhang et al. | |
| 2020/0034240 A1 | 1/2020 | Natanzon | |
| 2020/0034718 A1 | 1/2020 | Beedu | |
| 2020/0089409 A1* | 3/2020 | Ankireddypalle | G06F 11/1453 |
| 2020/0097444 A1 | 3/2020 | Agarwal | |
| 2020/0364351 A1 | 11/2020 | Sanchez et al. | |
| 2020/0412707 A1* | 12/2020 | Siefker | H04L 63/101 |
| 2021/0081432 A1 | 3/2021 | Grunwald et al. | |
| 2021/0117377 A1 | 4/2021 | Savir et al. | |
| 2021/0141920 A1 | 5/2021 | Khurana et al. | |
| 2021/0173561 A1* | 6/2021 | Mastenbrook | G06F 3/0622 |
| 2021/0255778 A1* | 8/2021 | Garewal | G06F 3/0673 |
| 2021/0294775 A1 | 9/2021 | Keller et al. | |

OTHER PUBLICATIONS

"International Search Report and Written Opinion received in International Application No. PCT/US2022/024451 on Aug. 2, 2022".

Anonymous, "How to Enable Access-Based Enumeration (ABE) on Windows Server | Windows OS Hub", Jun. 24, 2019, pp. 1-15, XP055885118, [Retrieved on Jan. 28, 2022] Retrieved from URL: https://web.archive.org/web/20190624222937/woshub.com/enable-access-based-enumeration-in-windows-server/.

Hu F., et al., "Dell EMC PowerScale: Solution Design and Considerations for SMB Environments," Technical White Paper, Jun. 2, 2020, pp. 1-44, XP055885116, [Retrieved on Jan. 28, 2022] Retrieved from URL: https://www.delltechnologies.com/asset/en-us/products/storage/industry-market/h17463-wp-dell-emc-isilon-design-and-considerations-for-smb.pdf.

Turner J., "Access-Based Enumeration (ABE) Troubleshooting (part 2 of 2)," TechNet, Sep. 21, 2016, 9 Pages.

Brent Welch et al, "Scalable Performance of the Panasas Parallel File System", Proceedings of the 6th Usenix Conference on File and Storage Technologies (FAST 08),Feb. 26, 2008 (Feb. 26, 2008).

Nawab Ali et al, "An OSD-based approach to managing directory operations in parallel file systems", Cluster Computing, 2008 IEEE International Conference on, IEEE, Piscataway, NJ, USA,Sep. 29, 2008 (Sep. 29, 2008), p. 175-184.

* cited by examiner

COPYING A FILE SYSTEM

RELATED APPLICATIONS

The present application is a continuation-in-part application of U.S. patent application Ser. No. 16/834,762, entitled "Unified Storage on Block Containers" and filed on Mar. 30, 2020 and of U.S. patent application Ser. No. 17/022,857, entitled "Managing Directory-Tree Operations in File Storage" and filed on Sep. 16, 2020. The present application also claims priority to U.S. Provisional Patent Application No. 63/036,955, entitled "Managing Snapshots of Directories in File Systems" and filed on Jun. 9, 2020, and to U.S. Provisional Patent Application No. 63/077,259, entitled "Space Accounting in a Storage System" and filed Sep. 11, 2020. These applications are expressly incorporated by reference herein.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DESCRIPTION OF EMBODIMENTS

Figure 1A:
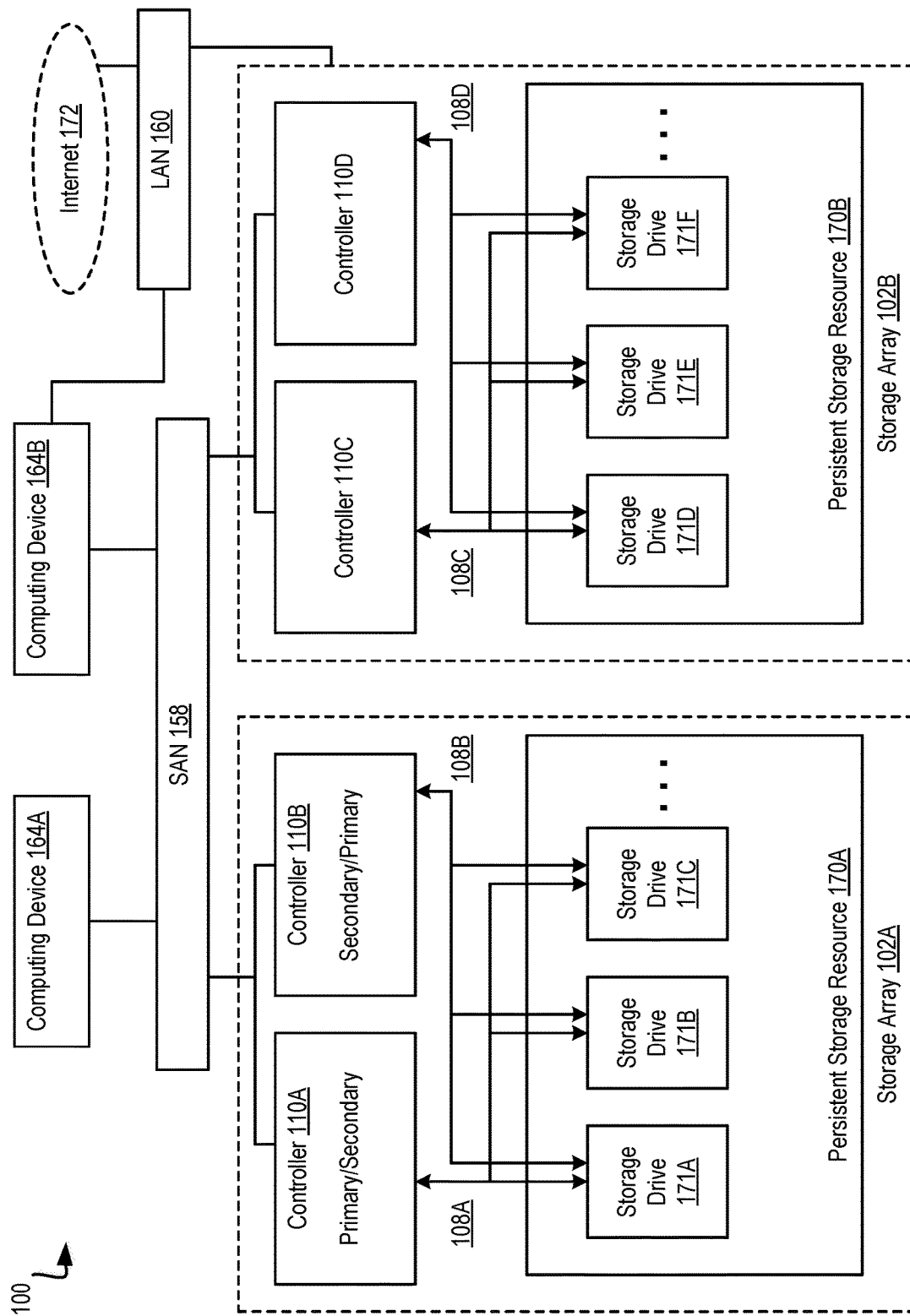
FIG. 1A illustrates a first example system for data storage in accordance with some implementations.

Example methods, apparatus, and products for pod-based copying of file systems in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
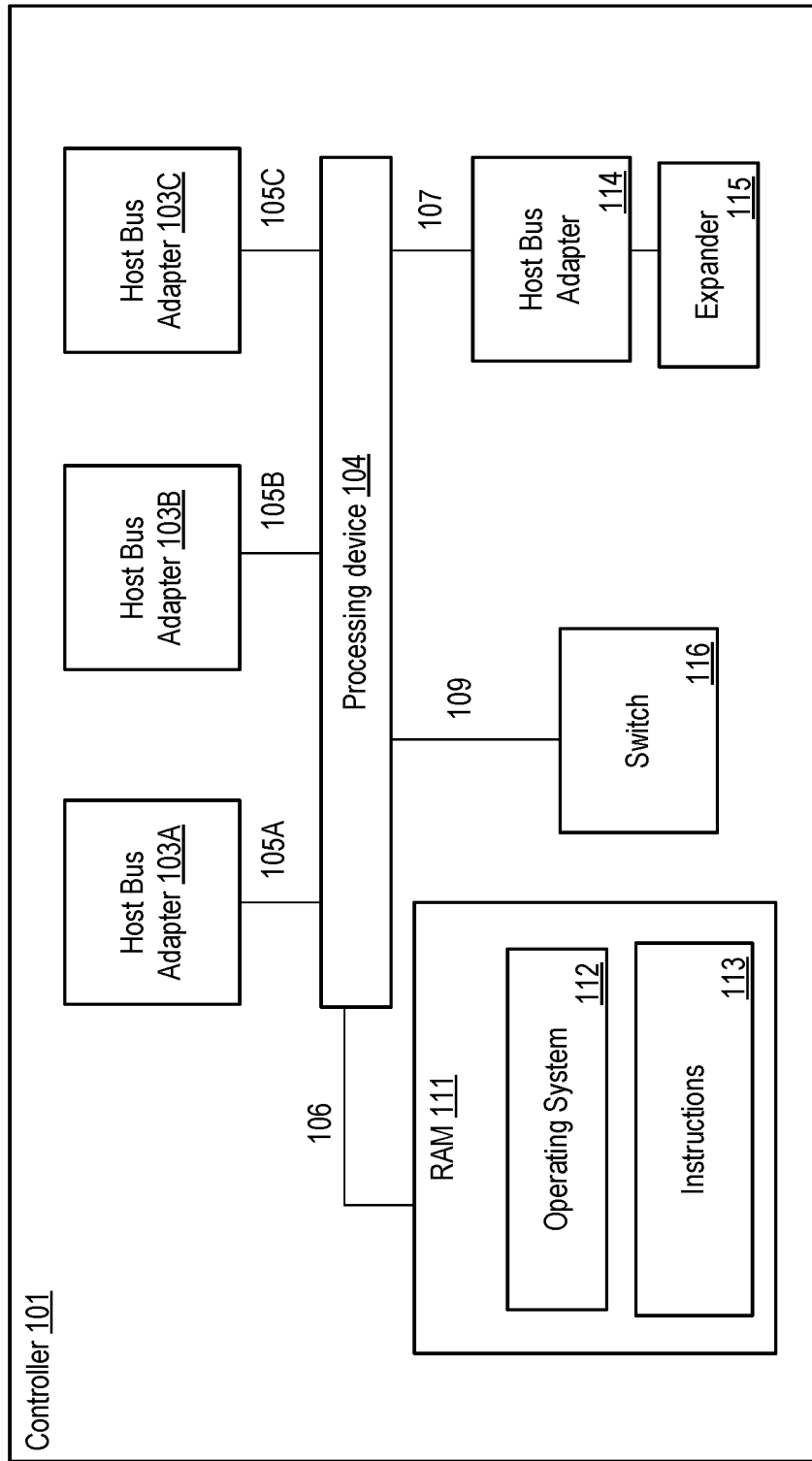
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

In implementations, storage drive 171A-F may be one or more zoned storage devices. In some implementations, the one or more zoned storage devices may be a shingled HDD. In implementations, the one or more storage devices may be a flash-based SSD. In a zoned storage device, a zoned namespace on the zoned storage device can be addressed by groups of blocks that are grouped and aligned by a natural size, forming a number of addressable zones. In implementations utilizing an SSD, the natural size may be based on the erase block size of the SSD.

The mapping from a zone to an erase block (or to a shingled track in an HDD) may be arbitrary, dynamic, and hidden from view. The process of opening a zone may be an operation that allows a new zone to be dynamically mapped to underlying storage of the zoned storage device, and then allows data to be written through appending writes into the zone until the zone reaches capacity. The zone can be finished at any point, after which further data may not be written into the zone. When the data stored at the zone is no longer needed, the zone can be reset which effectively deletes the zone's content from the zoned storage device, making the physical storage held by that zone available for the subsequent storage of data. Once a zone has been written and finished, the zoned storage device ensures that the data stored at the zone is not lost until the zone is reset. In the time between writing the data to the zone and the resetting of the zone, the zone may be moved around between shingle tracks or erase blocks as part of maintenance operations within the zoned storage device, such as by copying data to keep the data refreshed or to handle memory cell aging in an SSD.

In implementations utilizing an HDD, the resetting of the zone may allow the shingle tracks to be allocated to a new, opened zone that may be opened at some point in the future. In implementations utilizing an SSD, the resetting of the zone may cause the associated physical erase block(s) of the zone to be erased and subsequently reused for the storage of data. In some implementations, the zoned storage device may have a limit on the number of open zones at a point in time to reduce the amount of overhead dedicated to keeping zones open.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
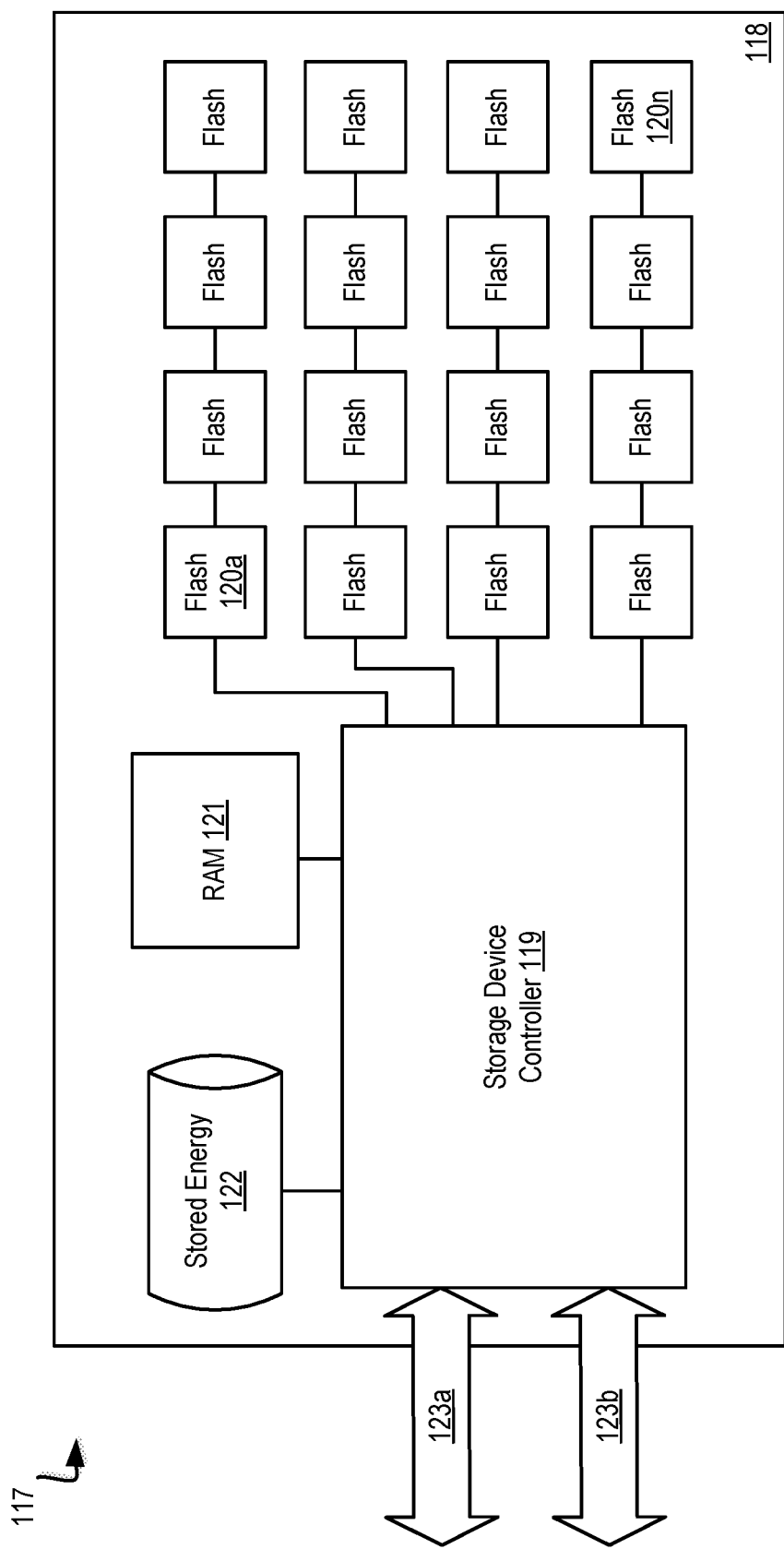
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
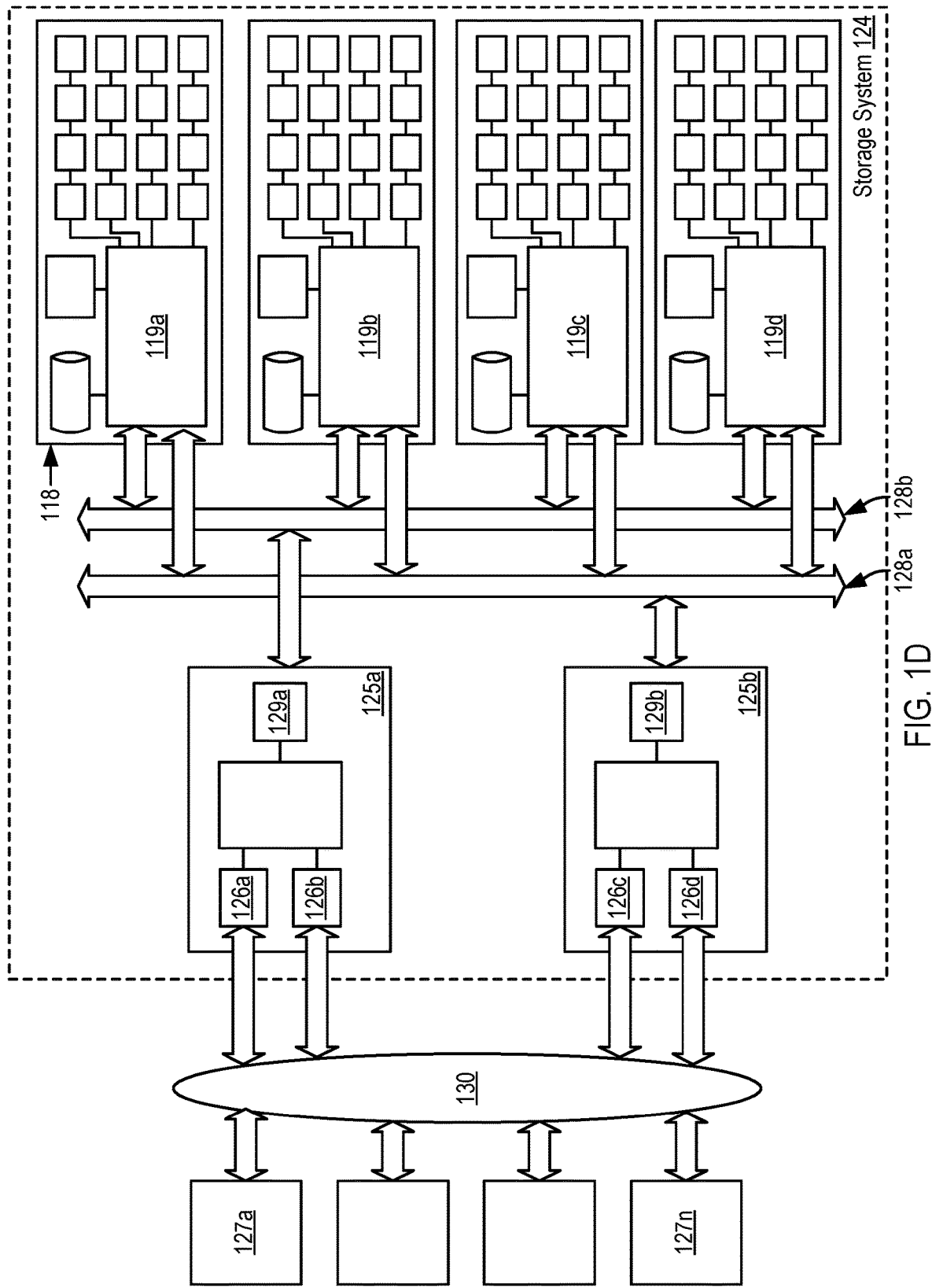
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
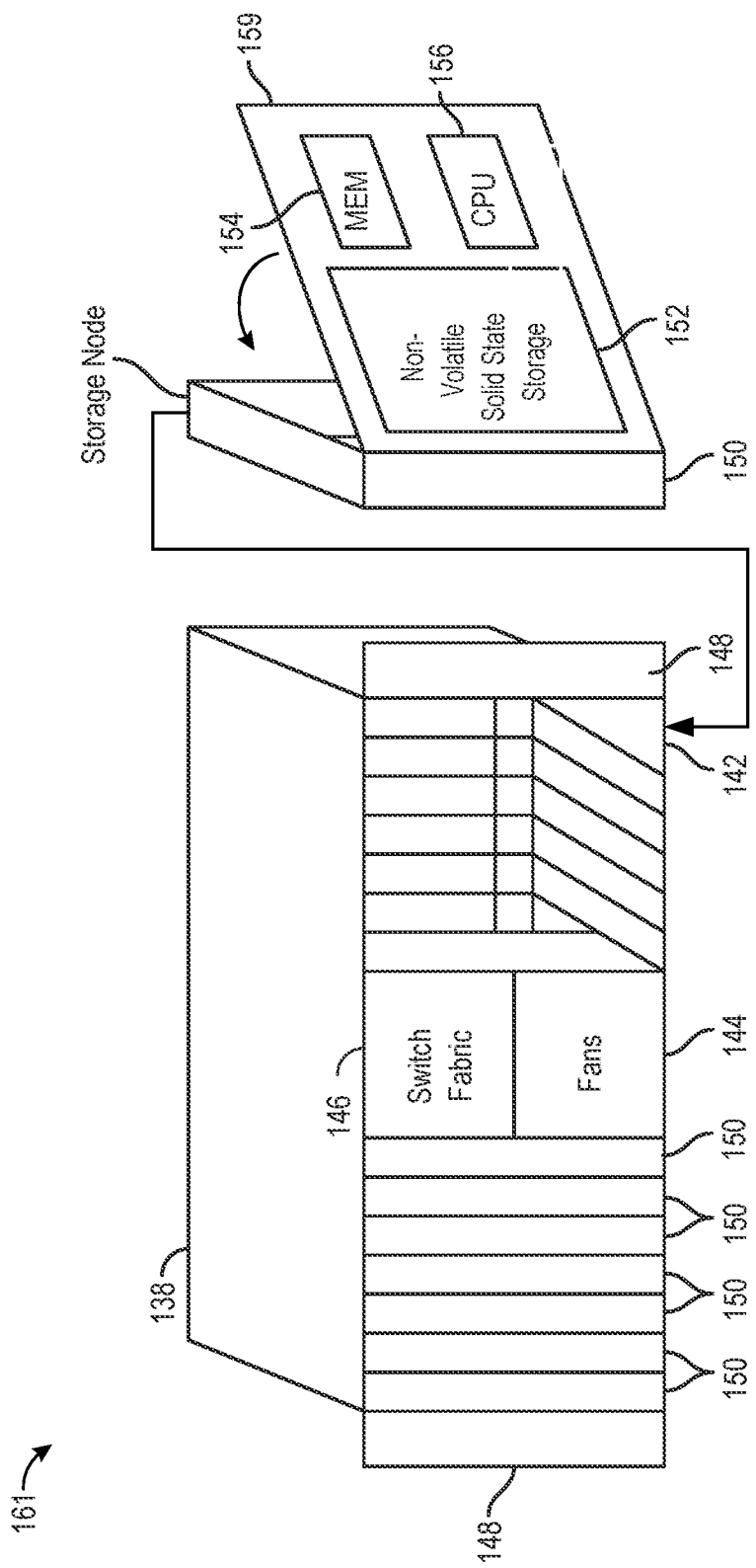
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
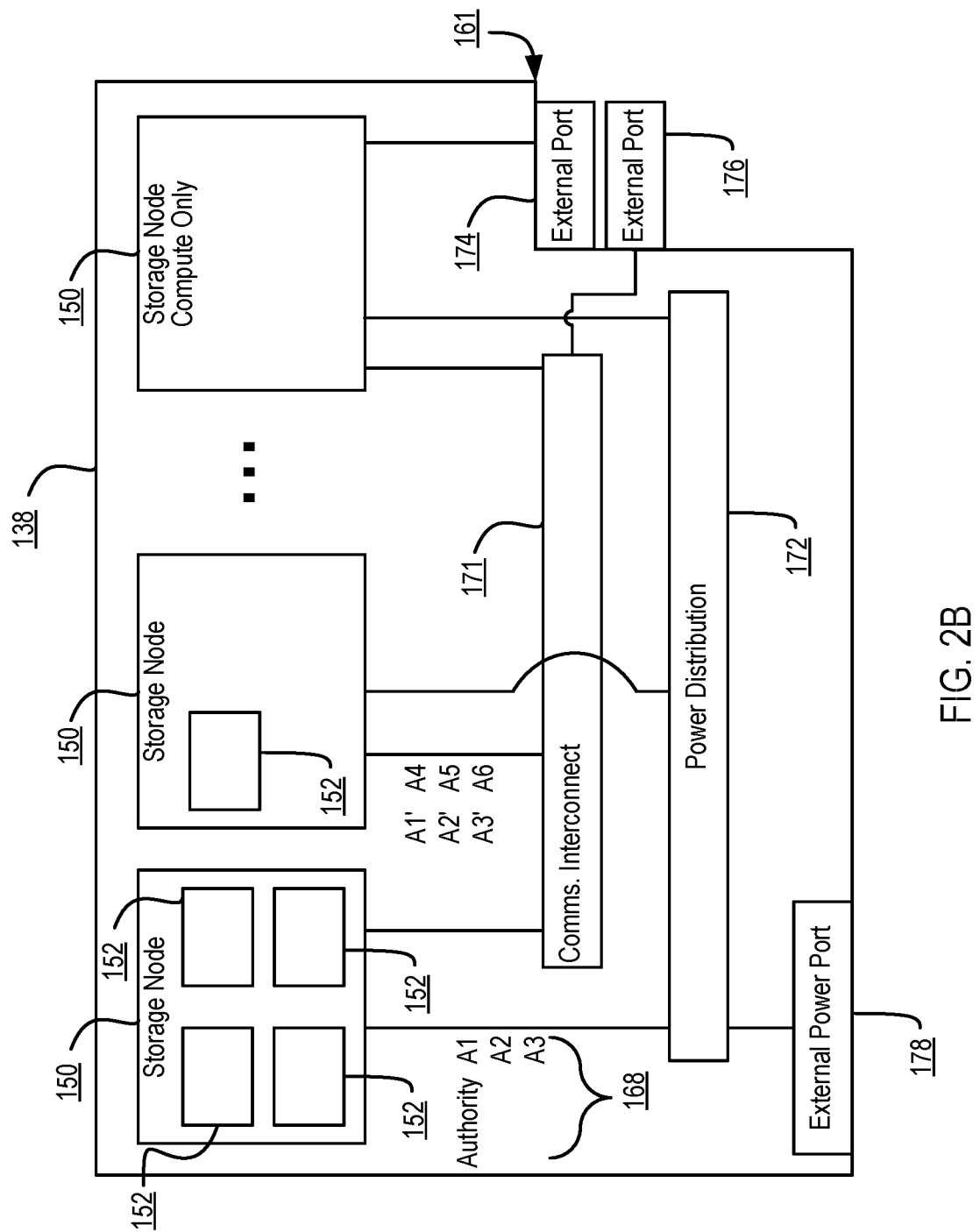
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In embodiments, authorities 168 operate to determine how operations will proceed against particular logical elements. Each of the logical elements may be operated on through a particular authority across a plurality of storage controllers of a storage system. The authorities 168 may communicate with the plurality of storage controllers so that the plurality of storage controllers collectively perform operations against those particular logical elements.

In embodiments, logical elements could be, for example, files, directories, object buckets, individual objects, delineated parts of files or objects, other forms of key-value pair databases, or tables. In embodiments, performing an operation can involve, for example, ensuring consistency, structural integrity, and/or recoverability with other operations against the same logical element, reading metadata and data associated with that logical element, determining what data should be written durably into the storage system to persist any changes for the operation, or where metadata and data can be determined to be stored across modular storage devices attached to a plurality of the storage controllers in the storage system.

In some embodiments the operations are token based transactions to efficiently communicate within a distributed system. Each transaction may be accompanied by or associated with a token, which gives permission to execute the transaction. The authorities 168 are able to maintain a pre-transaction state of the system until completion of the operation in some embodiments. The token based communication may be accomplished without a global lock across the system, and also enables restart of an operation in case of a disruption or other failure.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
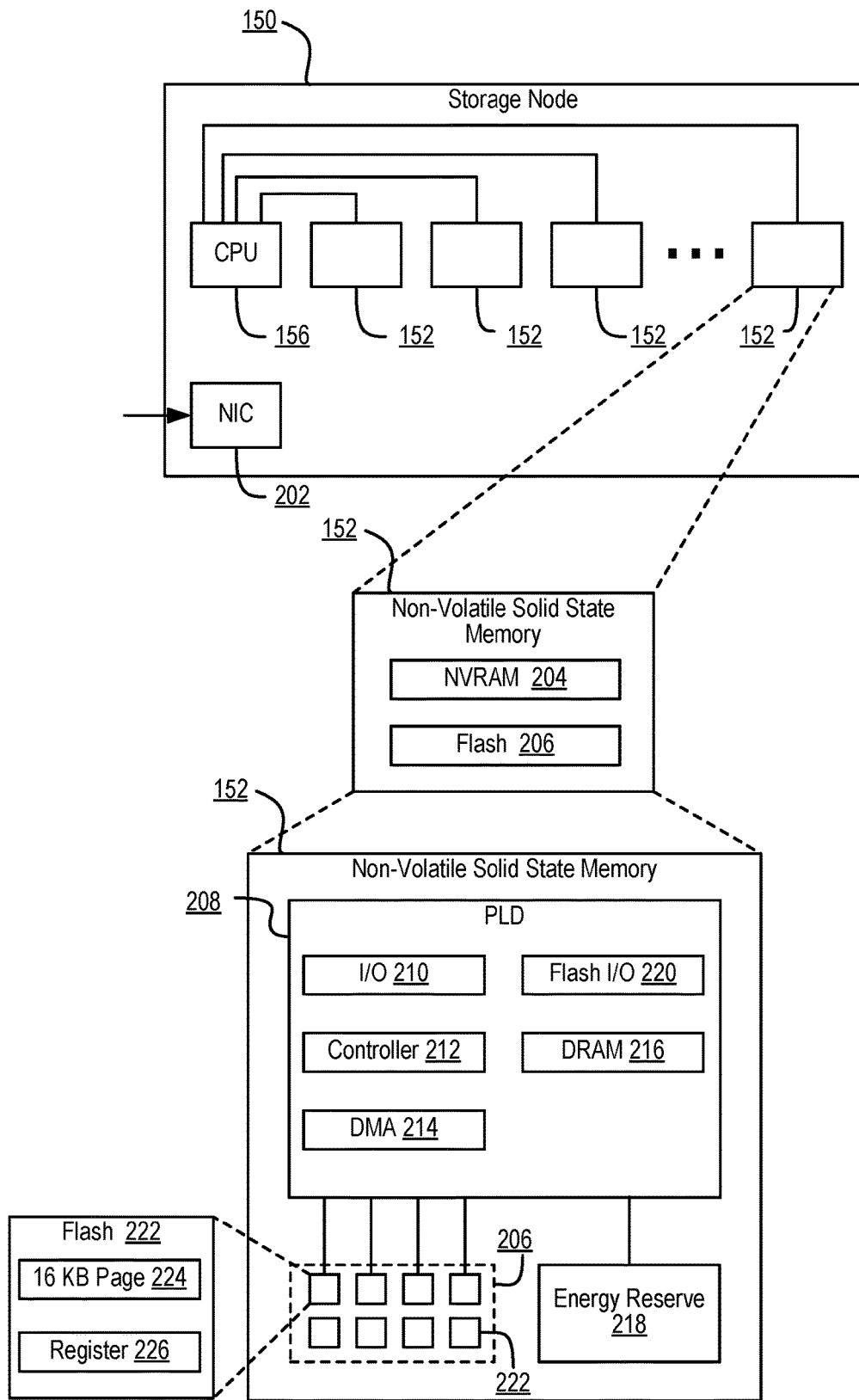
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
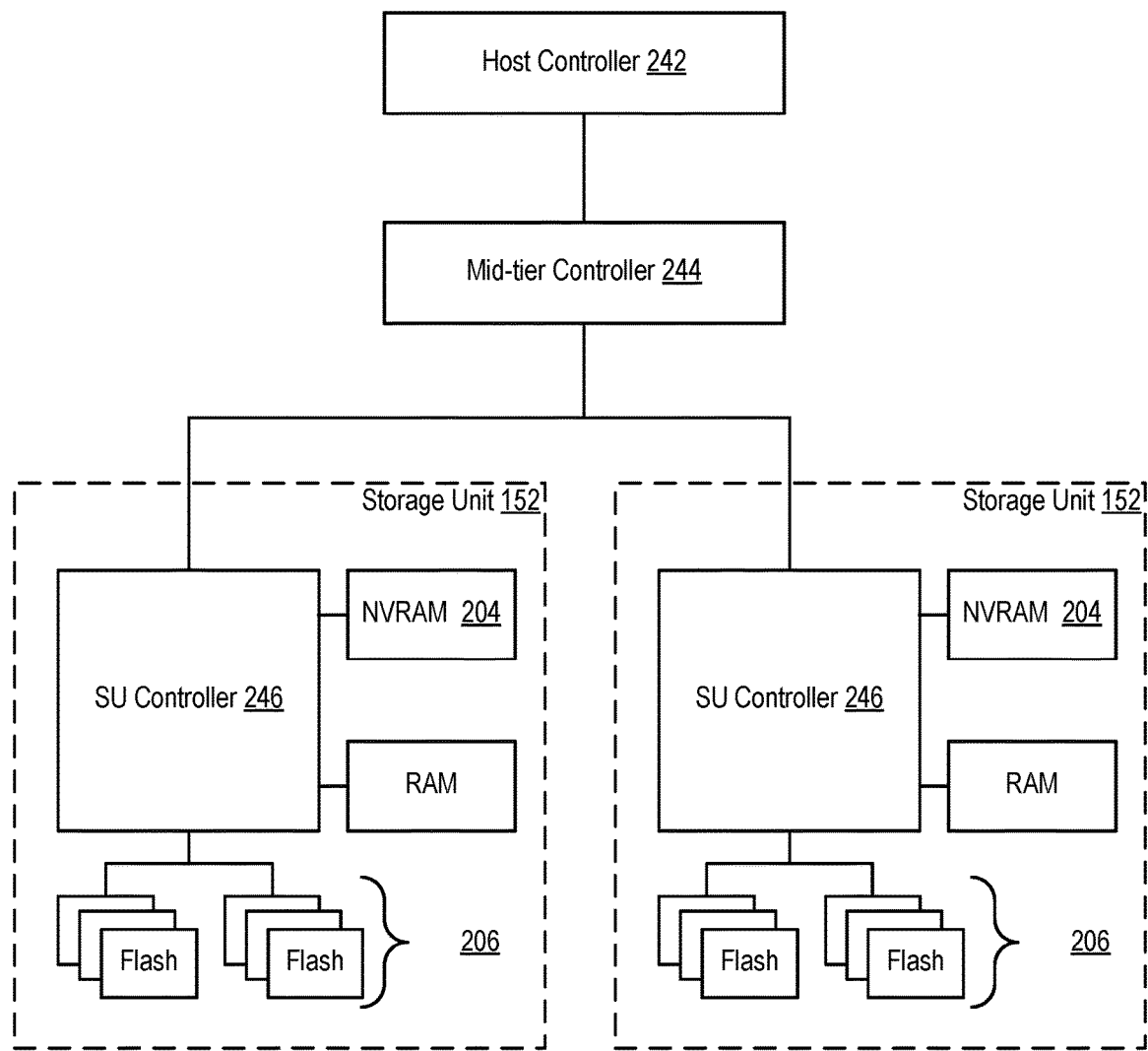
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
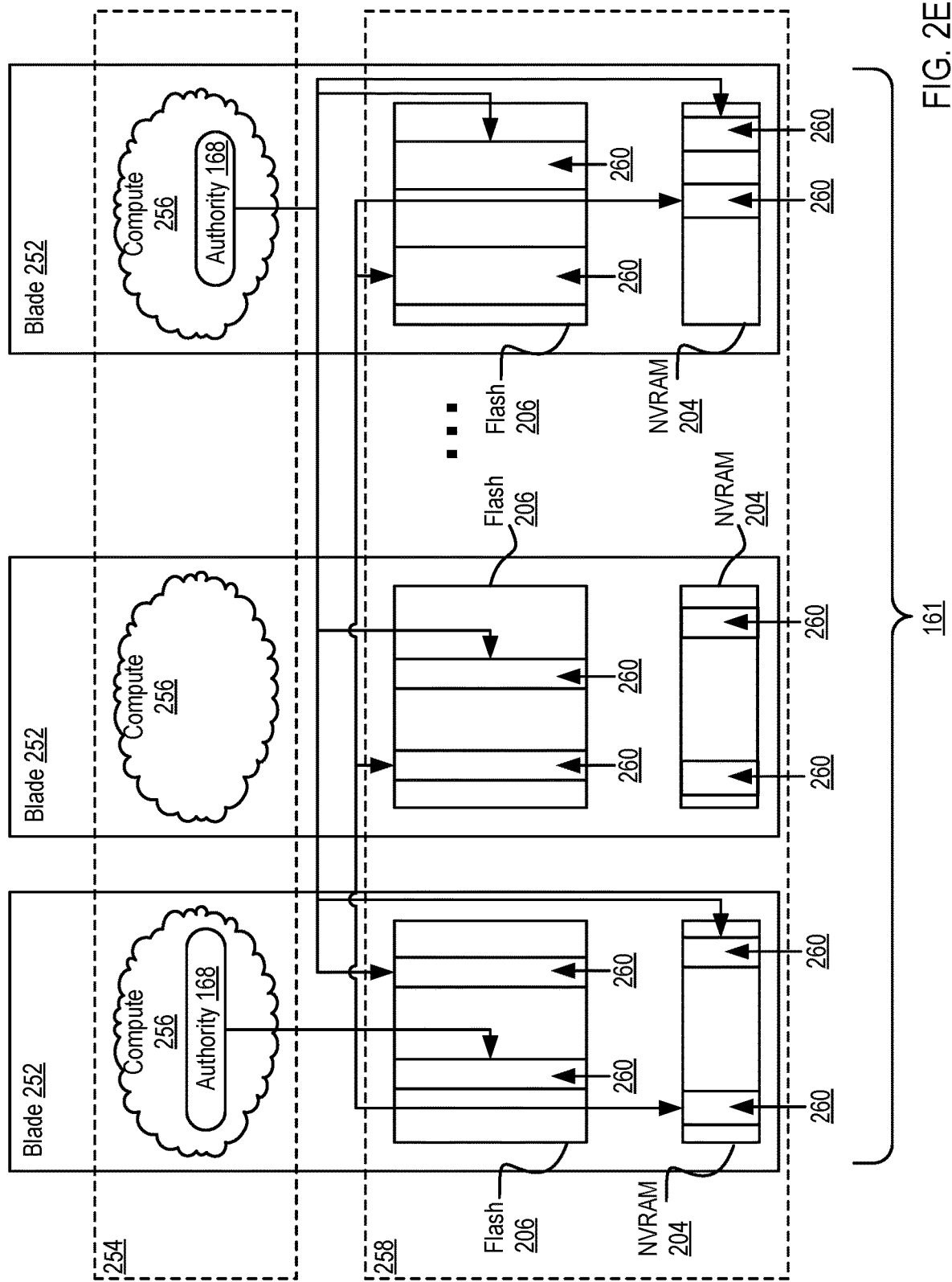
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
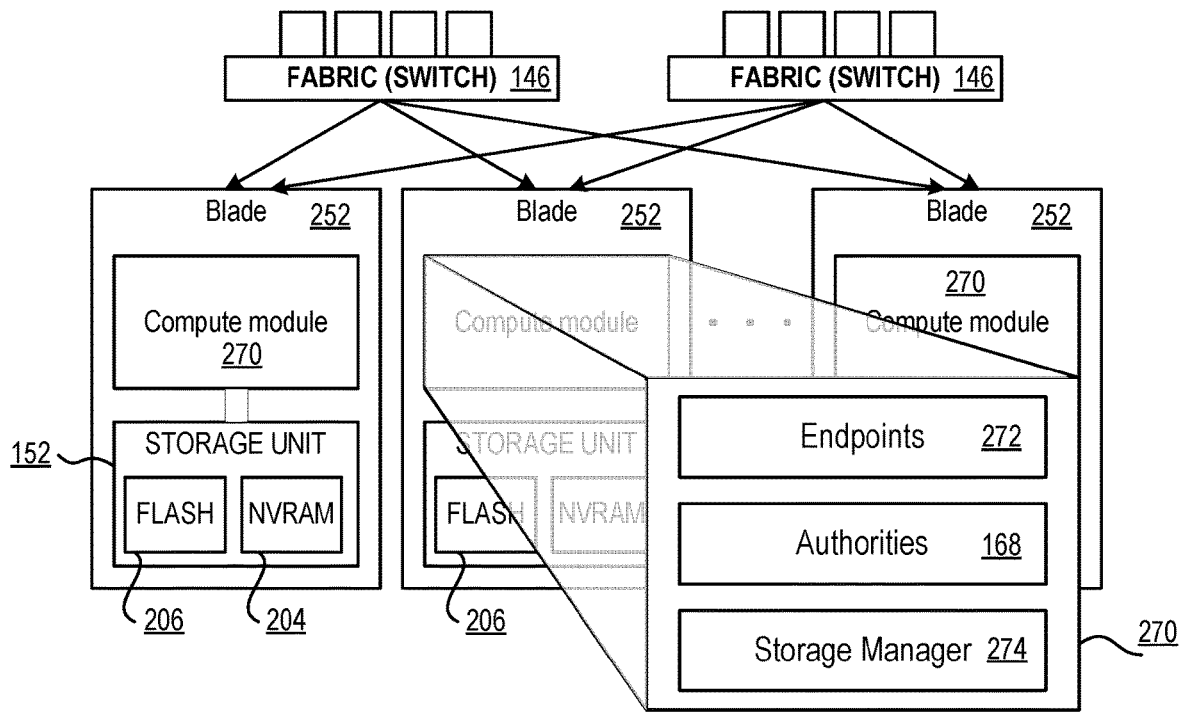
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
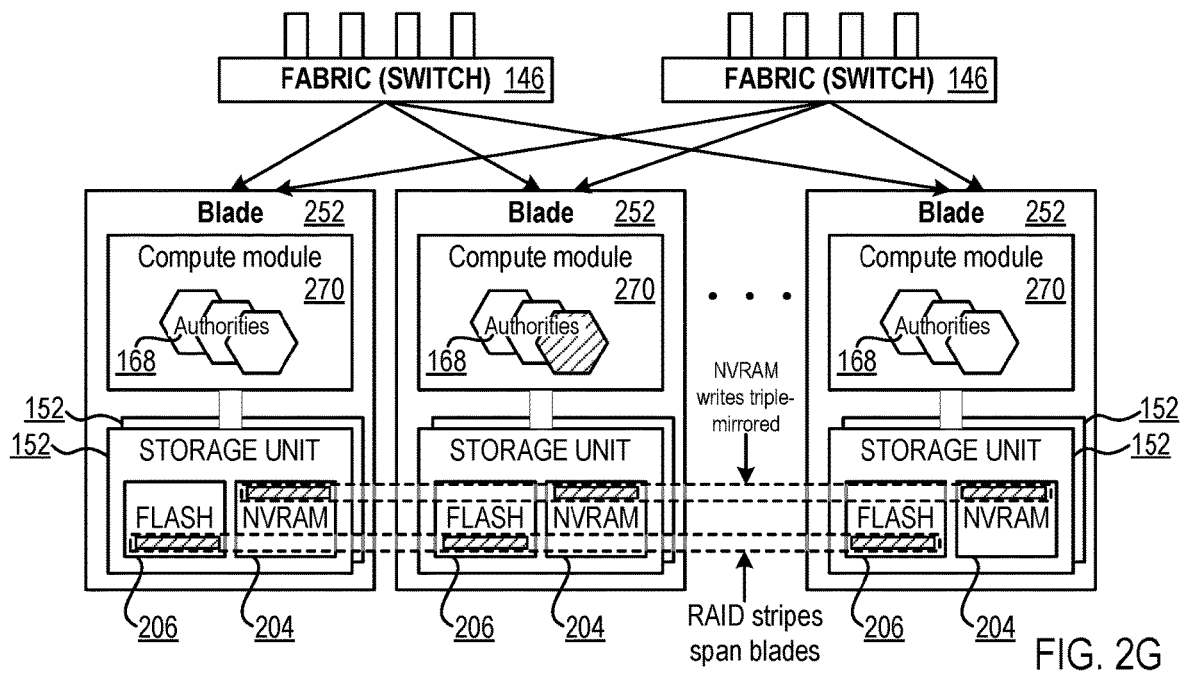
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
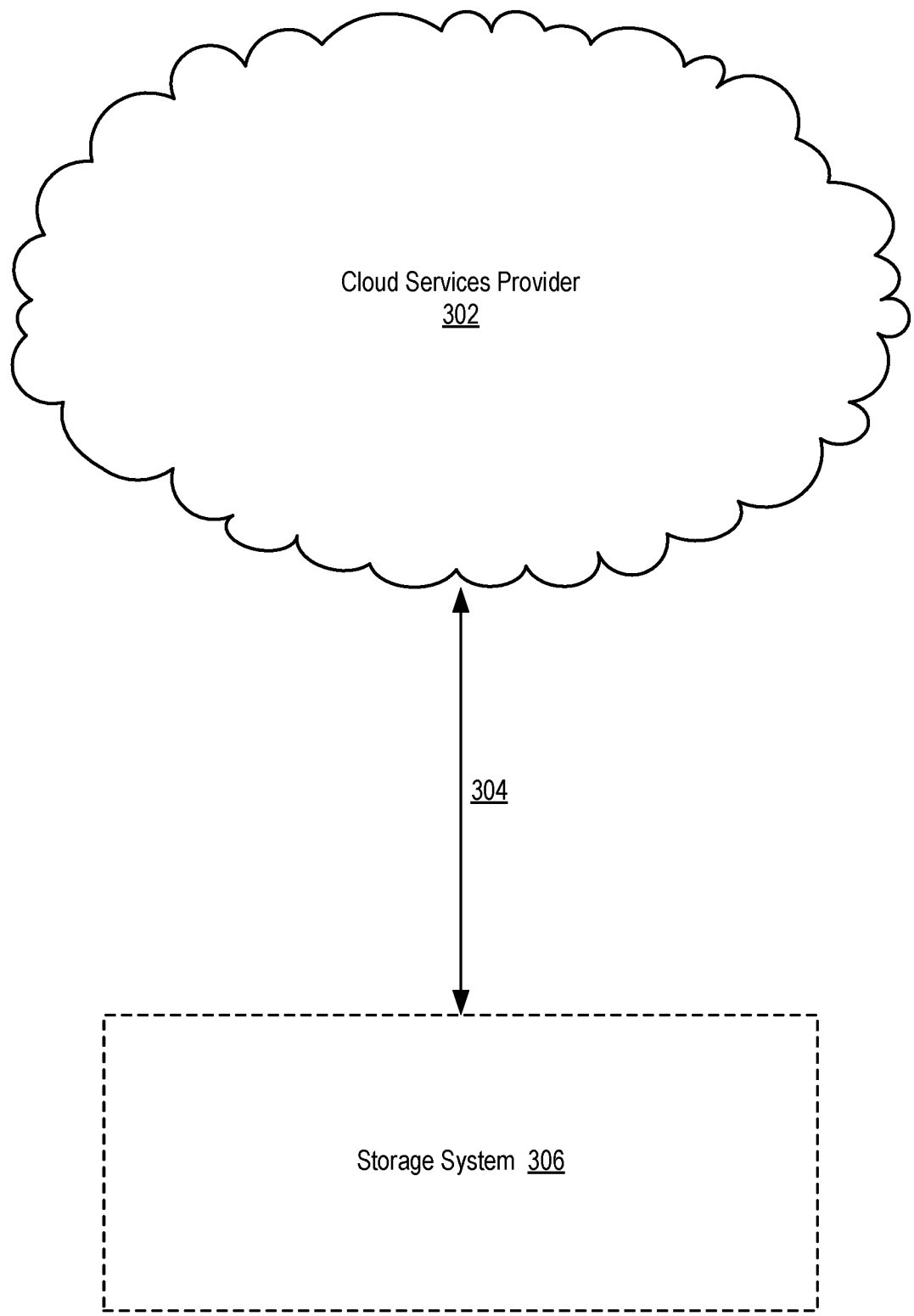
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Although the example depicted in FIG. 3A illustrates the storage system 306 being coupled for data communications with the cloud services provider 302, in other embodiments the storage system 306 may be part of a hybrid cloud deployment in which private cloud elements (e.g., private cloud services, on-premises infrastructure, and so on) and public cloud elements (e.g., public cloud services, infrastructure, and so on that may be provided by one or more cloud services providers) are combined to form a single solution, with orchestration among the various platforms. Such a hybrid cloud deployment may leverage hybrid cloud management software such as, for example, Azure™ Arc from Microsoft™, that centralize the management of the hybrid cloud deployment to any infrastructure and enable the deployment of services anywhere. In such an example, the hybrid cloud management software may be configured to create, update, and delete resources (both physical and virtual) that form the hybrid cloud deployment, to allocate compute and storage to specific workloads, to monitor workloads and resources for performance, policy compliance, updates and patches, security status, or to perform a variety of other tasks.

Readers will appreciate that by pairing the storage systems described herein with one or more cloud services providers, various offerings may be enabled. For example, disaster recovery as a service ('DRaaS') may be provided where cloud resources are utilized to protect applications and data from disruption caused by disaster, including in embodiments where the storage systems may serve as the primary data store. In such embodiments, a total system backup may be taken that allows for business continuity in the event of system failure. In such embodiments, cloud data backup techniques (by themselves or as part of a larger DRaaS solution) may also be integrated into an overall solution that includes the storage systems and cloud services providers described herein.

The storage systems described herein, as well as the cloud services providers, may be utilized to provide a wide array of security features. For example, the storage systems may encrypt data at rest (and data may be sent to and from the storage systems encrypted) and may make use of Key Management-as-a-Service ('KMaaS') to manage encryption keys, keys for locking and unlocking storage devices, and so on. Likewise, cloud data security gateways or similar mechanisms may be utilized to ensure that data stored within the storage systems does not improperly end up being stored in the cloud as part of a cloud data backup operation. Furthermore, microsegmentation or identity-based-segmentation may be utilized in a data center that includes the storage systems or within the cloud services provider, to create secure zones in data centers and cloud deployments that enables the isolation of workloads from one another.

Figure 3B:
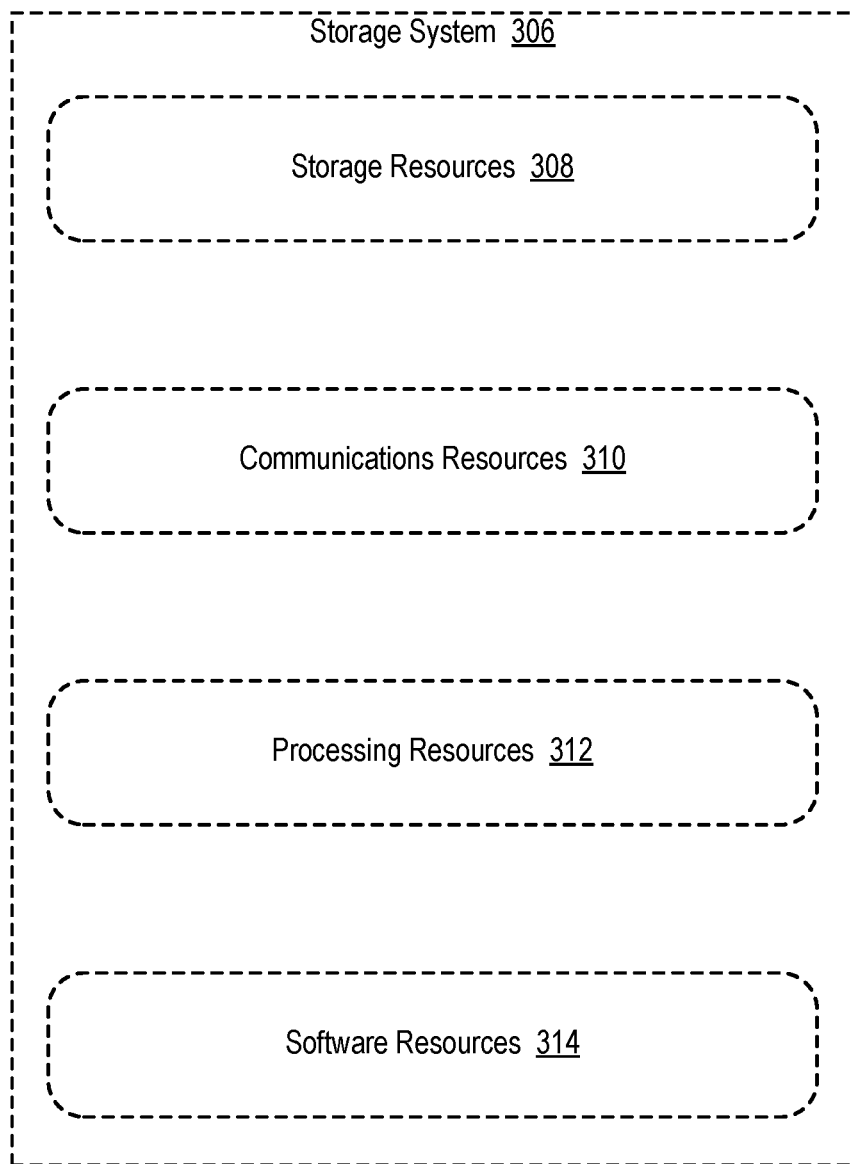
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3B may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The storage resources 308 depicted in FIG. 3B may also include racetrack memory (also referred to as domain-wall memory). Such racetrack memory may be embodied as a form of non-volatile, solid-state memory that relies on the intrinsic strength and orientation of the magnetic field created by an electron as it spins in addition to its electronic charge, in solid-state devices. Through the use of spin-coherent electric current to move magnetic domains along a nanoscopic permalloy wire, the domains may pass by magnetic read/write heads positioned near the wire as current is passed through the wire, which alter the domains to record patterns of bits. In order to create a racetrack memory device, many such wires and read/write elements may be packaged together.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The example storage system 306 depicted in FIG. 3B may leverage the storage resources described above in a variety of different ways. For example, some portion of the storage resources may be utilized to serve as a write cache where data is initially written to storage resources with relatively fast write latencies, relatively high write bandwidth, or similar characteristics. In such an example, data that is written to the storage resources that serve as a write cache may later be written to other storage resources that may be characterized by slower write latencies, lower write bandwidth, or similar characteristics than the storage resources that are utilized to serve as a write cache. In a similar manner, storage resources within the storage system may be utilized as a read cache, where the read cache is populated in accordance with a set of predetermined rules or heuristics. In other embodiments, tiering may be achieved within the storage systems by placing data within the storage system in accordance with one or more policies such that, for example, data that is accessed frequently is stored in faster storage tiers while data that is accessed infrequently is stored in slower storage tiers.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
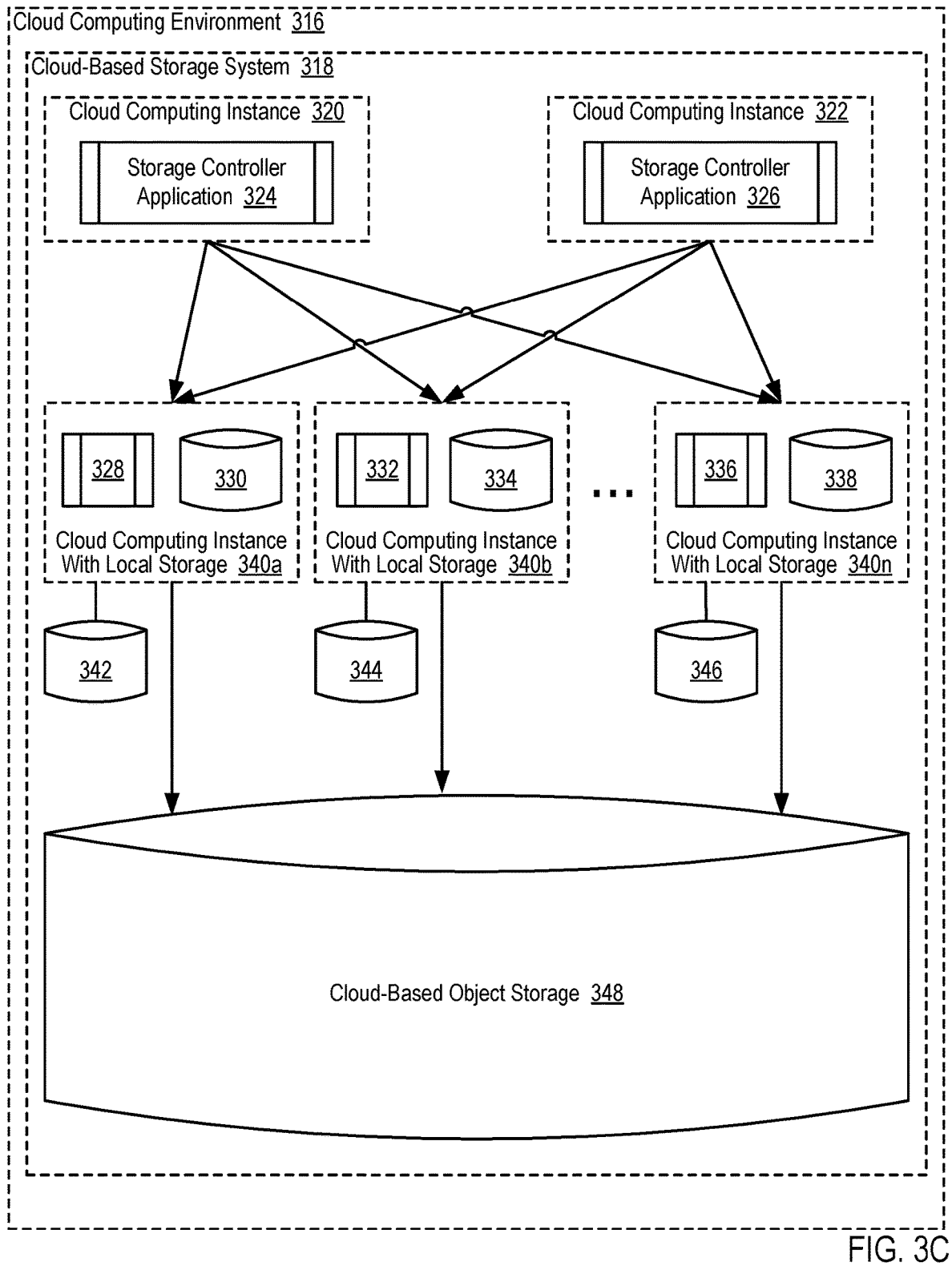
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340b, 340n with local storage 330, 334, 338, the software daemon 328, 332, 336 or some other module of computer program instructions that is executing on the particular cloud computing instance 340a, 340b, 340n may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340a, 340b, 340n may also be configured to write the data to cloud-based object storage 348 that is attached to the particular cloud computing instance 340a, 340b, 340n. The cloud-based object storage 348 that is attached to the particular cloud computing instance 340a, 340b, 340n may be embodied, for example, as Amazon Simple Storage Service ('S3') storage that is accessible by the particular cloud computing instance 340a, 340b, 340n. In other embodiments, the cloud computing instances 320, 322 that each include the storage controller application 324, 326 may initiate the storage of the data in the local storage 330, 334, 338 of the cloud computing instances 340a, 340b, 340n and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340a, 340b, 340n may support block-level access, the cloud-based object storage 348 that is attached to the particular cloud computing instance 340a, 340b, 340n supports only object-based access. In order to address this, the software daemon 328, 332, 336 or some other module of computer program instructions that is executing on the particular cloud computing instance 340a, 340b, 340n may be configured to take blocks of data, package those blocks into objects, and write the objects to the cloud-based object storage 348 that is attached to the particular cloud computing instance 340a, 340b, 340n.

Consider an example in which data is written to the local storage 330, 334, 338 resources and the block-storage 342, 344, 346 resources that are utilized by the cloud computing instances 340a, 340b, 340n in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340a, 340b, 340n is relatively straightforward as 5 blocks that are 1 MB in size are written to the local storage 330, 334, 338 resources and the block-storage 342, 344, 346 resources that are utilized by the cloud computing instances 340a, 340b, 340n. In such an example, the software daemon 328, 332, 336 or some other module of computer program instructions that is executing on the particular cloud computing instance 340a, 340b, 340n may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340a, 340b, 340n are EC2 instances, readers will understand that EC2 instances are only guaranteed to have a monthly uptime of 99.9% and data stored in the local instance store only persists during the lifetime of the EC2 instance. As such, relying on the cloud computing instances 340a, 340b, 340n with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340a, 340b, 340n, such that read operations can be serviced from local storage 330, 334, 338 resources and the block-storage 342, 344, 346 resources that are utilized by the cloud computing instances 340a, 340b, 340n, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340a, 340b, 340n. In such embodiments, the local storage 330, 334, 338 resources and block-storage 342, 344, 346 resources that are utilized by the cloud computing instances 340a, 340b, 340n may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct 1/100, 000th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340*a*, 340*b*, 340*n*, via monitoring communications between cloud computing instances 320, 322, 340*a*, 340*b*, 340*n* and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340*a*, 340*b*, 340*n* has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340*a*, 340*b*, 340*n*, such that data stored in an already existing cloud computing instance 340*a*, 340*b*, 340*n* can be migrated to the one or more new cloud computing instances and the already existing cloud computing instance 340*a*, 340*b*, 340*n* can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks, including the development of multi-layer neural networks, have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

In order for the storage systems described above to serve as a data hub or as part of an AI deployment, in some embodiments the storage systems may be configured to provide DMA between storage devices that are included in the storage systems and one or more GPUs that are used in an AI or big data analytics pipeline. The one or more GPUs may be coupled to the storage system, for example, via NVMe-over-Fabrics ('NVMe-oF') such that bottlenecks such as the host CPU can be bypassed and the storage system (or one of the components contained therein) can directly access GPU memory. In such an example, the storage systems may leverage API hooks to the GPUs to transfer data directly to the GPUs. For example, the GPUs may be embodied as Nvidia™ GPUs and the storage systems may support GPUDirect Storage ('GDS') software, or have similar proprietary software, that enables the storage system to transfer data to the GPUs via RDMA or similar mechanism. Readers will appreciate that in embodiments where the storage systems are embodied as cloud-based storage systems as described below, virtual drive or other components within such a cloud-based storage system may also be configured Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBMTM Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBMTM Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

The storage systems described above may also be configured to implement NVMe Zoned Namespaces. Through the use of NVMe Zoned Namespaces, the logical address space of a namespace is divided into zones. Each zone provides a logical block address range that must be written sequentially and explicitly reset before rewriting, thereby enabling the creation of namespaces that expose the natural boundaries of the device and offload management of internal mapping tables to the host. In order to implement NVMe Zoned Name Spaces ('ZNS'), ZNS SSDs or some other form of zoned block devices may be utilized that expose a namespace logical address space using zones. With the zones aligned to the internal physical properties of the device, several inefficiencies in the placement of data can be eliminated. In such embodiments, each zone may be mapped, for example, to a separate application such that functions like wear levelling and garbage collection could be performed on a per-zone or per-application basis rather than across the entire device. In order to support ZNS, the storage controllers described herein may be configured with to interact with zoned block devices through the usage of, for example, the Linux™ kernel zoned block device interface or other tools.

The storage systems described above may also be configured to implement zoned storage in other ways such as, for example, through the usage of shingled magnetic recording (SMR) storage devices. In examples where zoned storage is used, device-managed embodiments may be deployed where the storage devices hide this complexity by managing it in the firmware, presenting an interface like any other storage device. Alternatively, zoned storage may be implemented via a host-managed embodiment that depends on the operating system to know how to handle the drive, and only write sequentially to certain regions of the drive. Zoned storage may similarly be implemented using a host-aware embodiment in which a combination of a drive managed and host managed implementation is deployed.

Figure 3D:
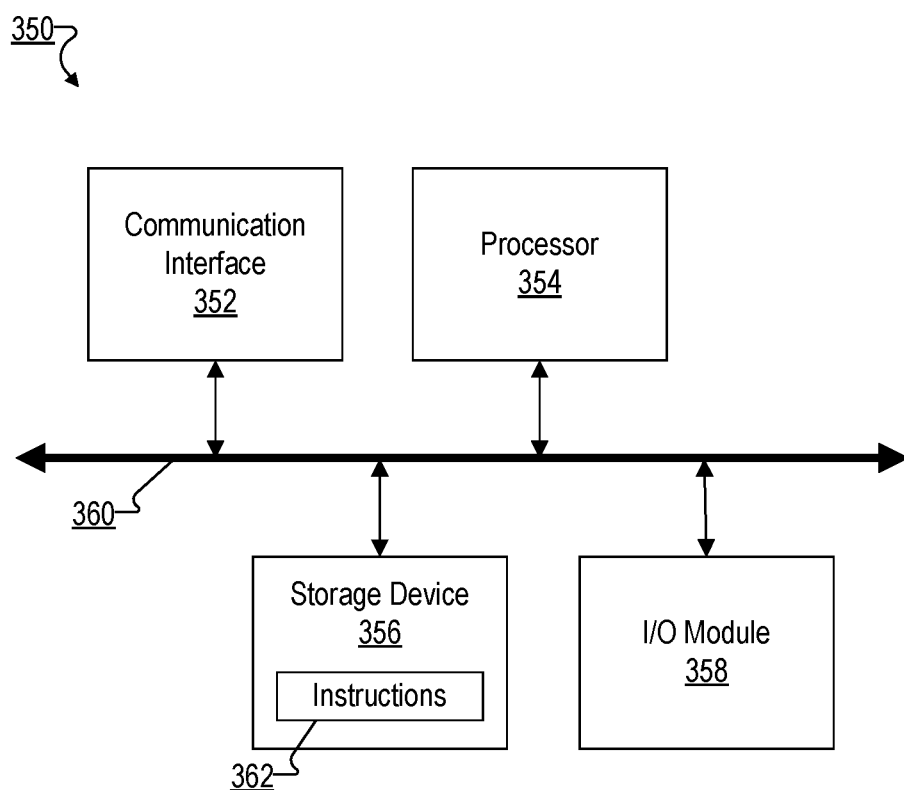
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

The storage systems described above may, either alone or in combination, by configured to serve as a continuous data protection store. A continuous data protection store is a feature of a storage system that records updates to a dataset in such a way that consistent images of prior contents of the dataset can be accessed with a low time granularity (often on the order of seconds, or even less), and stretching back for a reasonable period of time (often hours or days). These allow access to very recent consistent points in time for the dataset, and also allow access to access to points in time for a dataset that might have just preceded some event that, for example, caused parts of the dataset to be corrupted or otherwise lost, while retaining close to the maximum number of updates that preceded that event. Conceptually, they are like a sequence of snapshots of a dataset taken very frequently and kept for a long period of time, though continuous data protection stores are often implemented quite differently from snapshots. A storage system implementing a data continuous data protection store may further provide a means of accessing these points in time, accessing one or more of these points in time as snapshots or as cloned copies, or reverting the dataset back to one of those recorded points in time.

Over time, to reduce overhead, some points in the time held in a continuous data protection store can be merged with other nearby points in time, essentially deleting some of these points in time from the store. This can reduce the capacity needed to store updates. It may also be possible to convert a limited number of these points in time into longer duration snapshots. For example, such a store might keep a low granularity sequence of points in time stretching back a few hours from the present, with some points in time merged or deleted to reduce overhead for up to an additional day. Stretching back in the past further than that, some of these points in time could be converted to snapshots representing consistent point-in-time images from only every few hours.

Although some embodiments are described largely in the context of a storage system, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Advantages and features of the present disclosure can be further described by the following statements:

1. A data storage system comprising: a memory storing instructions; and a processor communicatively coupled to the memory and configured to execute the instructions to: generate, based on a pod that includes a file system constructed of block objects, a virtual copy of the pod such that modifications made to the pod after the generation of the virtual copy of the pod are distinct from the virtual copy of the pod.

2. The system of statement 1 wherein: the pod and the virtual copy of the pod initially share contents of the block objects; and in response to a request to modify content of a block object of the block objects, the processor is configured to execute the instructions to: generate a first virtual private instance of the block object in the pod, wherein the first virtual private instance of the block object shares, with the block object, the content of the block object and a pod-relative identity of the block object; and generate a second virtual private instance of the block object in the virtual copy of the pod, wherein the second virtual private instance of the block object shares, with the block object, the content of the block object and the pod-relative identity of the block object.

3. The system of statement 2 wherein the processor is configured to execute the instructions to: determine that the request is received by way of the pod; and apply a modification associated with the request to the first virtual private instance of the block object in the pod and not to the second virtual private instance of the block object in the virtual copy of the pod.

4. The system of statement 2 wherein the processor is configured to execute the instructions to: determine that the request is received by way of the virtual copy of the pod; and apply a modification associated with the request to the second virtual private instance of the block object in the virtual copy of the pod and not to the first virtual private instance of the block object in the pod.

5. The system of any of statements 1-3 wherein the virtual copy of the pod comprises an immutable snapshot of the pod.

6. The system of any of statements 1-4 wherein: the virtual copy of the pod comprises a clone of the pod; and the generating of the virtual copy of the pod comprises creating a new mutable pod that is a virtual clone of the pod.

7. The system of any preceding statement wherein: the generating of the virtual copy of the pod comprises updating a modification epoch of the pod from a first epoch to a second epoch; the first epoch represents the pod at a point in time when the virtual copy of the pod is generated; and the second epoch represents a mutable version of the pod after the point in time when the virtual copy of the pod is generated.

8. The system of any of statements 1-6 wherein: the pod and the virtual copy of the pod initially share contents of the block objects; and the generating of the virtual copy of the pod comprises marking the shared contents of the block objects as copy-on-write contents.

9. The system of any preceding statement wherein: the file system comprises file system entities managed in a file system layer of the data storage system; and the file system entities are constructed of the block objects managed in a block object store of the data storage system.

10. The system of any preceding statement wherein contents of the block objects: represent contents of the file system entities; and map the contents of the file system entities to blocks of data in the data storage system.

11. The system of any preceding statement wherein the processor is configured to execute the instructions to use the virtual copy of the pod in a replication process for the pod.
12. A data storage system comprising: a memory storing instructions; and a processor communicatively coupled to the memory and configured to execute the instructions to: generate, based on a pod that includes a file system constructed of block objects comprising metadata that maps contents of the file system to blocks of data in the data storage system, a clone of the pod, wherein the pod and the clone of the pod initially share contents of the block objects; receive a request to modify content of a block object of the block objects; determine that the content of the block object is shared between the pod and the clone of the pod; generate, based on the request, a first virtual private instance of the block object that is local to the pod and shares, with the block object, the content of the block object; and generate, based on the request, a second virtual private instance of the block object that is local to the clone of the pod and shares, with the block object, the content of the block object.
13. The system of statement 12 wherein the processor is configured to execute the instructions to: determine that the request is received by way of the clone of the pod; and apply a modification associated with the request to the second virtual private instance of the block object in the clone of the pod and not to the first virtual private instance of the block object in the pod.
14. A method comprising: generating, based on a pod that includes a file system constructed of block objects in a data storage system, a virtual copy of the pod, wherein the pod and the virtual copy of the pod initially share contents of the block objects; receiving a request to modify content of a block object of the block objects; determining that the content of the block object is shared between the pod and the virtual copy of the pod; generating a first virtual instance of the block object that is local to the pod and shares, with the block object, the content of the block object; and generating a second virtual instance of the block object that is local to the virtual copy of the pod and shares, with the block object, the content of the block object.
15. The method of statement 14 further comprising: determining that the request is received by way of the pod; and applying a modification associated with the request to the first virtual private instance of the block object in the pod and not to the second virtual private instance of the block object in the virtual copy of the pod.
16. The method of statement 14 further comprising: determining that the request is received by way of the virtual copy of the pod; and applying a modification associated with the request to the second virtual private instance of the block object in the virtual copy of the pod and not to the first virtual private instance of the block object in the pod.
17. The method of statement 14 or 15 wherein the virtual copy of the pod comprises an immutable snapshot of the pod.
18. The method of any of statements 14-16 wherein the virtual copy of the pod comprises a clone of the pod; and the generating of the virtual copy of the pod comprises creating a new mutable pod that is a virtual clone of the pod.
19. The method of any of statements 14-18 wherein: the generating of the virtual copy of the pod comprises updating an identity of the pod from a first identity to a second identity; the first identity represents the pod at a point in time when the virtual copy of the pod is generated; and the second identity represents a mutable version of the pod after the point in time when the virtual copy of the pod is generated.
20. The method of any of statements 14-18 wherein the generating of the virtual copy of the pod comprises marking the shared contents of the block objects as copy-on-write contents.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

In accordance with certain embodiments of the present disclosure, a storage system may provide unified data storage on block containers and, using the unified storage on block containers, may provide one or more data storage services such as block, file, object, and/or database services. To this end, the storage system may leverage block containers and one or more resources associated with block containers such that a data storage service provided by the storage system benefits from and/or has access to block containers and resources associated with block containers. In certain examples, this may allow block containers that are optimized for implementation using all-flash data storage to be used to provide one or more data storage services that are similarly optimized for implementation using all-flash data storage. The storage system may provide and/or facilitate efficient operations on block containers and container data, such as efficient writing, reading, extending, thin-provisioning, deleting, range-copying, mapping, unmapping, snapshotting, cloning, replicating, compressing, deduplicating, garbage collecting, etc.

Figure 4A:
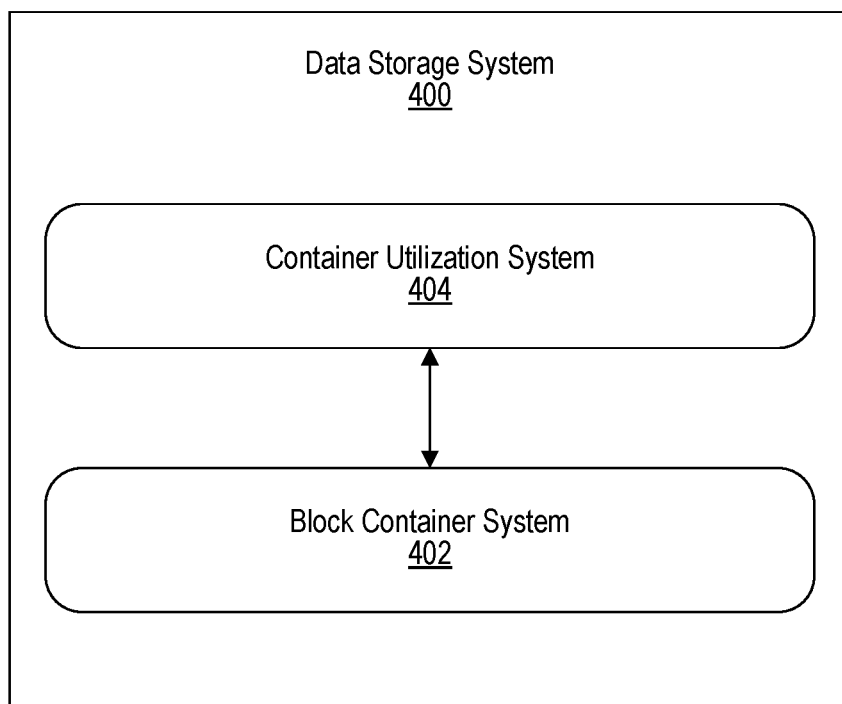
FIGS. 4A-4B illustrate an example of a data storage system that includes a block container system and a container utilization system in accordance with some embodiments of the present disclosure.
Figure 4B:
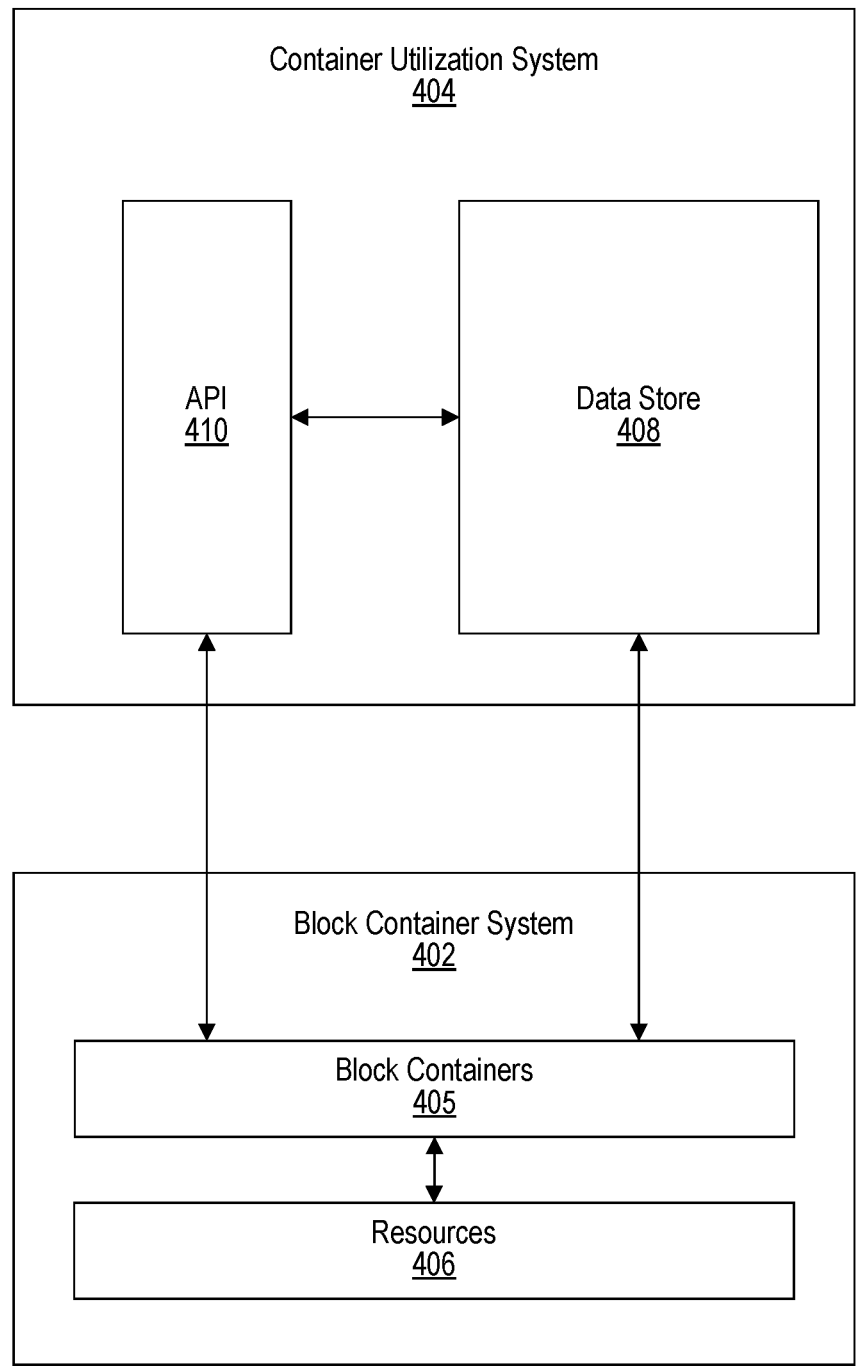

FIGS. 4A-4B illustrate an example of a data storage system 400 that includes a block container system 402 and a container utilization system 404 communicatively coupled to one another. Block container system 402 and container utilization system 404 may be communicatively coupled using any suitable data communication technologies.

Block container system 402 may provide block containers 405 and resources 406 associated with block containers 405. Block containers 405 may represent a linear address space of blocks where block container system 402 may quickly and dynamically create and delete block containers. Block containers 405 may be thin provisioned with a block range deallocate capability. The block address space may be any suitable size, including very large (e.g., a 64-bit address space of bytes or blocks) in some examples. Implementations of block containers 405 may support operations and/or sharing or stored content within and between block containers 405, such as operations or sharing of stored content across block containers of different types (e.g., across block containers of different forms used for different types of storage systems). Examples of such operations or sharing of stored content include, without limitation, snapshots, clones, checkpoints, replication, deduplication, compression, encryption, and virtual copy by reference operations for entire block containers (e.g., cloning by reference the content of one block container to another) as well as for ranges of blocks within and between block containers. Block containers 405 may be tagged, grouped, and/or named to allow operations or mechanisms such as snapshots, clones, checkpoints, and replication to operate consistently and atomically on various types of sets of block containers 405 to form or replace matching sets of block containers 405. Such features may facilitate grouping of individual block containers 405 or sets of block containers 405 into groups.

An example of such a group may be referred to as a "pod." A pod may represent a dataset along with one or more storage systems that store the dataset. A pod may have a name and an identifier. Storage systems may be added to and removed from a pod. When a storage system is added to a pod, the pod's dataset may be copied to that storage system and then kept up to data as the dataset is modified. When a storage system is removed from a pod, the pod's dataset is no longer kept up to date on the storage system. Any storage system that is active for a pod can receive and process requests to modify or read the pod. A pod may also be a unit of administration that represents a collection of block containers 405, volumes, file systems, object/analytic stores, snapshots, and other administrative entities where making administrative changes on any one storage system is automatically reflected to all active storage systems associated with the pod. In the context of storage systems described herein, a pod may operate as a namespace for some set of objects (for example, block containers or snapshots or clones of block containers) that can be operated on as a set, such that additions or removals of a set of objects (such as block containers) from the pod causes future operations to operate on the adjusted collection of these objects. If a pod is replicated, such as through symmetric synchronous replication, between storage systems, then each storage system which is operating normally against the pod will store the same collection of these objects with the same names and other identify or tag metadata.

In certain examples, implementations of block containers 405 may optimize data storage system 400 for flash data storage (e.g., all-flash data storage). For example, block container system 402 may be configured to generally gather a collection of updates which will be organized into segments (e.g., medium-sized segments) that are written and managed in such a way that the content and the capacity held by the stored segments are changed or reused through a garbage collection process. Segments may be any suitable size, such as on the order of megabytes, and may be sized optimally around flash erase blocks or sized optimally for erasure coded segments written as shards across several flash-based storage devices which are organized as erase blocks or to be a reasonably optimal size for desired throughput in writing and reading whole data structures in a data store operating as a bulk backend for data storage system 400 and/or a data storage service provided by data storage system 400 (e.g., writing and reading whole objects in an object store operating as a build backend for data storage system 400). Such segments can work with flash-based data storage that exposes erase blocks directly or through some scheme such as zoned drives. Such a scheme can also be used to organize data to be written (and eventually garbage collected) to non-flash-based zoned drives or to medium-sized objects in a typical type of object store that best supports objects which are written and eventually deleted without ever having been updated in place.

In certain embodiments, block container system 402 may include and/or may be specifically designed to use all-flash data storage for block-based data storage. To this end, block container system 402 may be a flash block-based storage system that is optimized for flash block-based storage and that preserves data integrity, provides consistent low latency and high performance, and maximizes physical media endurance.

Resources 406 associated with block containers 405 may include any components of block container system 402 configured to create, delete, modify, thin provision, allocate, deallocate, append, or otherwise operate on block containers 405 and/or content of block containers 405. Resources 406 may be implemented in any suitable way, including as hardware and/or software components (e.g., as computer-implemented instructions executable by a processor to perform operations on block containers 405). Resources 406 may include any of the storage system resources described herein, including any of storage resources 308, communications resources 310, processing resources 312, software resources 314, and other resources described above. Examples of resources 406 of block container system 402 include, without limitation, data reduction resources (e.g., pattern removal, deduplication, and compression resources), metadata resources (e.g., metadata such as one or more maps that track relationships between logical block addresses and physical media addresses), data structure resources (e.g., graphs of structures called logical extents), data replication resources (e.g., snapshot, clone, extended copy, asynchronous replication, synchronous replication resources), storage reclamation resources (e.g., garbage collection resources), lookaside data structure resources for tracking operations on data for use in implementing or completing implementation of changes in a time-shifted manner (e.g., by a background process at a suitable time), foreground or inline data processing resources (e.g., foreground or inline data reduction as part of a data write process), and background processing resources (e.g., background data reduction, storage reclamation, etc. applied to logically stored data that remains unaltered for a threshold length of time). Examples of resources 406 of block container system 402 may include components and/or processes configured to perform operations such as writing, reading, extending, thin-provisioning, deleting, range-copying, mapping, unmapping, snapshotting, cloning, replicating, compressing, deduplicating, and garbage collecting block containers 405 and/or content of block containers 405.

Block containers 405 may be configured to store and address data in blocks of any suitable size and configuration. Accordingly, block containers system 402 may utilize block containers 405 for multiple types of uses. In certain implementations, block containers 405 may be used to represent volumes, which may function to a client host as individual data storage drives accessed through SCSI, NVMe, or some other block protocol (e.g., mounted drive volumes accessible by an operating system). In certain implementations, block containers 405 may additionally or alternatively include or represent fixed or variable size blocks of data that each contain a number of sectors of data (e.g., zero or more 512-byte sectors of data).

Block container system 402 may include or implement any of the storage systems or features of the storage systems described above. In certain embodiments, block container system 402 may include a virtually mapped allocate-on-write and/or copy-on-write block-based storage system.

Block containers 405 may be implemented in any way suitable to provide one or more of the features of block container system 402 described herein. Examples of architectures for implementing block containers 405 will now be described. The examples are illustrative and not limiting. Additional or alternative architectures for implementing block containers 405 may be used in other examples.

In certain examples, block containers 405 may be implemented using a linear table of vectors to blocks or content-addressable stores. In certain examples, block containers 405 may be implemented using a two-level vector of block references where blocks themselves are compressed and written into garbage collection segments. In certain implementations, the two-level vector may use copy-on-write of a more granular vector level. In certain examples, block containers 405 may be implemented using hash references (e.g., hash tables) to blocks or content-addressable stores. In certain examples, block containers 405 may be implemented using B-trees or similar data structures that reference blocks or content-addressable stores.

In certain examples, block containers 405 may be implemented using graphs of structures called logical extents. A logical extent may include a list of pointers to logical block addresses, to other logical extents, or to a combination of logical block addresses and other logical extents. Logical extents may be linked together to form a data structure such as graph of logical extent nodes that represents relationships between data. Any suitable structure of logical extents may be used, such as an acyclic graph of logical extents. In certain examples, block container system 402 may use a directed acyclic graph ('DAG') or a balanced directed acyclic graph ('B-DAG') of logical extents.

In certain examples, logical extents may be categorized into two types of logical extents: leaf logical extents that reference some amount of stored data in some way (e.g., by including or pointing to logical addresses mapped to physical media locations of data) and composite logical extents that reference other leaf or composite logical extents.

A leaf extent can reference data in a variety of ways. It can point directly to a single range of stored data (e.g., 64 kilobytes of data), or it can be a collection of references to stored data (e.g., a 1 megabyte "range" of content that maps some number of virtual blocks associated with the range to physically stored blocks). In the latter case, these blocks may be referenced using some identity, and some blocks within the range of the extent may not be mapped to anything. Also in the latter case, these block references need not be unique, allowing multiple mappings from virtual blocks within some number of logical extents within and across some number of block containers (e.g., block containers 405) to map to the same physically stored blocks. Instead of stored block references, a logical extent could encode simple patterns. For example, a block that is a string of identical bytes could simply encode that the block is a repeated pattern of identical bytes.

A composite logical extent can be a logical range of content with some virtual size, which comprises a plurality of maps that each map from a subrange of the composite logical extent logical range of content to an underlying leaf or composite logical extent. Transforming a request related to content for a composite logical extent, then, involves taking the content range for the request within the context of the composite logical extent, determining which underlying leaf or composite logical extents that request maps to, and transforming the request to apply to an appropriate range of content within those underlying leaf or composite logical extents.

In certain implementations of block container system 402, block containers can be defined as logical extents. Thus, block containers can be organized using the logical extent model. In certain examples, a graph of logical extents may include a root node associated with a block container in block container system 402. The root node may point to one or more other nodes that point to other nodes and/or logical addresses mapped to physical media locations at which data associated with the block container is stored.

Depending on implementation, leaf or composite logical extents could be referenced from a plurality of other composite logical extents, effectively allowing inexpensive duplication of larger collections of content within and across block containers. Thus, logical extents can be arranged essentially within an acyclic graph of references, each ending in leaf logical extents. This can be used to make copies of block containers, to make snapshots of block containers, or as part of supporting virtual range copies within and between block containers as part of an extended copy operation or similar types of operations.

An implementation may provide each logical extent with an identity which can be used to name it. This simplifies referencing, since the references within composite logical extents become lists comprising logical extent identities and a logical subrange corresponding to each such logical extent identity. Within logical extents, each stored data block reference may also be based on some identity used to name it.

To support these duplicated uses of extents, logical extents may be configured as copy-on-write logical extents. When a data modifying operation affects a copy-on-write leaf or composite logical extent, the logical extent is copied, with the copy being a new reference and possibly having a new identity (depending on implementation). The copy retains all references or identities related to underlying leaf or composite logical extents, but with whatever modifications result from the modifying operation. For example, a write request, a write same request, an extended write read request, an extended write request, or a compare and write request may store new blocks in the storage system (or use deduplication techniques to identify existing stored blocks), resulting in modifying the corresponding leaf logical extents to reference or store identities to a new set of blocks, possibly replacing references and stored identities for a previous set of blocks. Alternately, an un-map request may modify a leaf logical extent to remove one or more block references. In both types of cases, a leaf logical extent is modified. If the leaf logical extent is a copy-on-write logical extent, then a new leaf logical extent will be created that is formed by copying unaffected block references from the old extent and then replacing or removing block references based on the modifying operation.

A composite logical extent that was used to locate the leaf logical extent may then be modified to store the new leaf logical extent reference or identity associated with the copied and modified leaf logical extent as a replacement for the previous leaf logical extent. If that composite logical extent is a copy-on-write logical extent, then a new composite logical extent is created as a new reference or with a new identity, and any unaffected references or identities to its underlying logical extents are copied to that new composite logical extent, with the previous leaf logical extent reference or identity being replaced with the new leaf logical extent reference or identity.

This process continues further backward from referenced extent to referencing composite extent, based on the search path through the acyclic graph used to process the modifying operation, with all copy-on-write logical extents being copied, modified, and replaced.

These copied leaf and composite logical extents can then drop the characteristic of being copy on write, so that further modifications do not result in a copy. For example, the first time some underlying logical extent within a copy-on-write "parent" composite extent is modified, that underlying logical extent may be copied and modified, with the copy having a new identity which is then written into a copied and replaced instance of the parent composite logical extent. But, a second time some other underlying logical extent is copied and modified and with that other underlying logical extent copy's new identity being written to the parent composite logical extent, the parent can then be modified in place with no further copy and replace necessary on behalf of references to the parent composite logical extent.

Modifying operations to new regions of a block container or of a composite logical extent for which there is no current leaf logical extent may create a new leaf logical extent to store the results of those modifications. If that new logical extent is to be referenced from an existing copy-on-write composite logical extent, then that existing copy-on-write composite logical extent will be modified to reference the new logical extent, resulting in another copy, modify, and replace sequence of operations similar to the sequence for modifying an existing leaf logical extent.

If a parent composite logical extent cannot be grown large enough (based on implementation) to cover an address range associated with new leaf logical extents to be created for a new modifying operation, then the parent composite logical extent may be copied into two or more new composite logical extents which are then referenced from a single "grandparent" composite logical extent which yet again is a new reference or a new identity. If that grandparent logical extent is itself found through another composite logical extent that is a copy-on-write logical extent, then that other composite logical extent will be copied and modified and replaced in a similar way as described in previous paragraphs.

This copy-on-write model can be used as part of implementing snapshots, block container copies, and virtual block container address range copies within a storage system implementation based on these directed acyclic graphs of logical extents. To make a snapshot as a read-only copy of an otherwise writable block container, a graph of logical extents associated with the block container is marked copy-on-write and references to the original composite logical extents are retained by the snapshot. Modifying operations to the block container will then make logical extent copies as needed, resulting in the block container storing the results of those modifying operations and the snapshots retaining the original content. Block container copies are similar, except that both the original block container and the copied block container can modify content resulting in their own copied logical extent graphs and subgraphs.

Virtual block container address range copies can operate either by copying block references within and between leaf logical extents (which does not itself involve using copy-on-write techniques unless changes to block references modify copy-on-write leaf logical extents). Alternately, virtual block container address range copies can duplicate references to leaf or composite logical extents. This works well for block container address range copies of larger address ranges. And, this is one way the graphs can become directed acyclic graphs of references rather than merely reference trees. Copy-on-write techniques associated with duplicated logical extent references can be used to ensure that modifying operations to the source or target of a virtual address range copy will result in the creation of new logical extents to store those modifications without affecting the target or the source that share the same logical extent immediately after the block container address range copy operation.

Logical extents, such as described above, are an example of an architecture for implementing block containers 405. Another example includes single-instance stores, where blocks are stored in association with an index derived from a secure hash fingerprint of their content and where a block container would effectively be an array of references that is updated whenever a block is written. A simple two-level logical extent model, where one level represents a vector of references to individual leaf logical extents represents a simpler version of the logical extent model where the leaf logical extents can reference a deduplicated block store or a content addressable block store. Whatever the model, the relationship between data stored into block containers 405 at particular logical block addresses and bulk storage should be dynamic to ensure that new data is written into new blocks that are arranged within medium-sized segments, and organized around garbage collection processes that can move blocks that are still referenced while deleting blocks that are no longer referenced in order to either reclaim space from segments that contain some no longer referenced blocks or, particularly in the case of flash memory, in order to address flash memory durability issues.

Block container system 402 may be configured to present handles to block containers 405. The handles may include any suitable data identifying block containers 405 such as pointers to block containers 405 (e.g., pointers to root nodes of block containers 405). The handles may be used by container utilization system 404 to operate on and/or interact with block containers 405, such as by writing content to and/or reading content from block containers 405.

Container utilization system 404 may be configured to utilize block containers 405 to store and manage content for one or more data storage services provided by a unified data storage system. As an example, for a block storage service, a block volume may be implemented on a single block container 405 (a block container representing a volume). As another example, for a file storage service, individual files, directories, file system data, and/or metadata may be implemented on individual block containers 405. As another example, for an object storage service, individual objects and metadata may be implemented on individual block containers 405. As another example, for a database, block containers 405 may be allocated to store individual redo logs, archive logs, table spaces, blobs (binary large objects), data configuration data, and/or metadata.

To this end, container utilization system 404 may be configured to use block containers 405 of block container system 402, as well as resources 406 of block container system 402 in some examples, to provide one or more data stores for storing and managing content for one or more data storage services. For example, container utilization system 404 may provide a data store 408 that utilizes block containers 405 to represent data stored in data store 408. Accordingly, data store 408 may be referred to as a container-based data store 408 for storing and managing content for a data storage service. Data store 408 may operate as a bulk backend data store for one or more data storage services.

Container utilization system 404 may be configured to facilitate use of block containers 405 to represent data for any suitable number and/or type of data storage services. To this end, container utilization system 404 may provide and maintain any suitable number and types of data stores for storing content for any suitable number and/or type of data storage services. In at least this regard, data storage system 400 may be a unified storage system that supports various types of data storage services and/or data storage protocols. For example, container utilization system 404 may provide one or more data stores 408 for storing content for block, file, object, and/or database storage services.

Block containers 405 of block container system 402 may be adapted and/or used differently by container utilization system 404 for various data storage services. For example, certain block containers 405 may be used to represent content for a first storage service (e.g., a block storage service), certain block containers 405 may be used to represent content for a second storage service different from the first storage service (e.g., a file storage service), etc.

In certain embodiments in which block containers 405 are implemented using graphs of logical extents as described above, container utilization system 404 may be configured to use graphs of logical extents to represent and manage data in data store 408. For example, a data instance for a data storage service may be represented as a block container defined by a graph of logical extents that point to and/or include data for the data instance. Container utilization system 404 may associate the data instance with the block container defined by the graph of logical extents, such as by associating an identifier for the data instance with a root node of the graph of logical extents.

Figure 5:
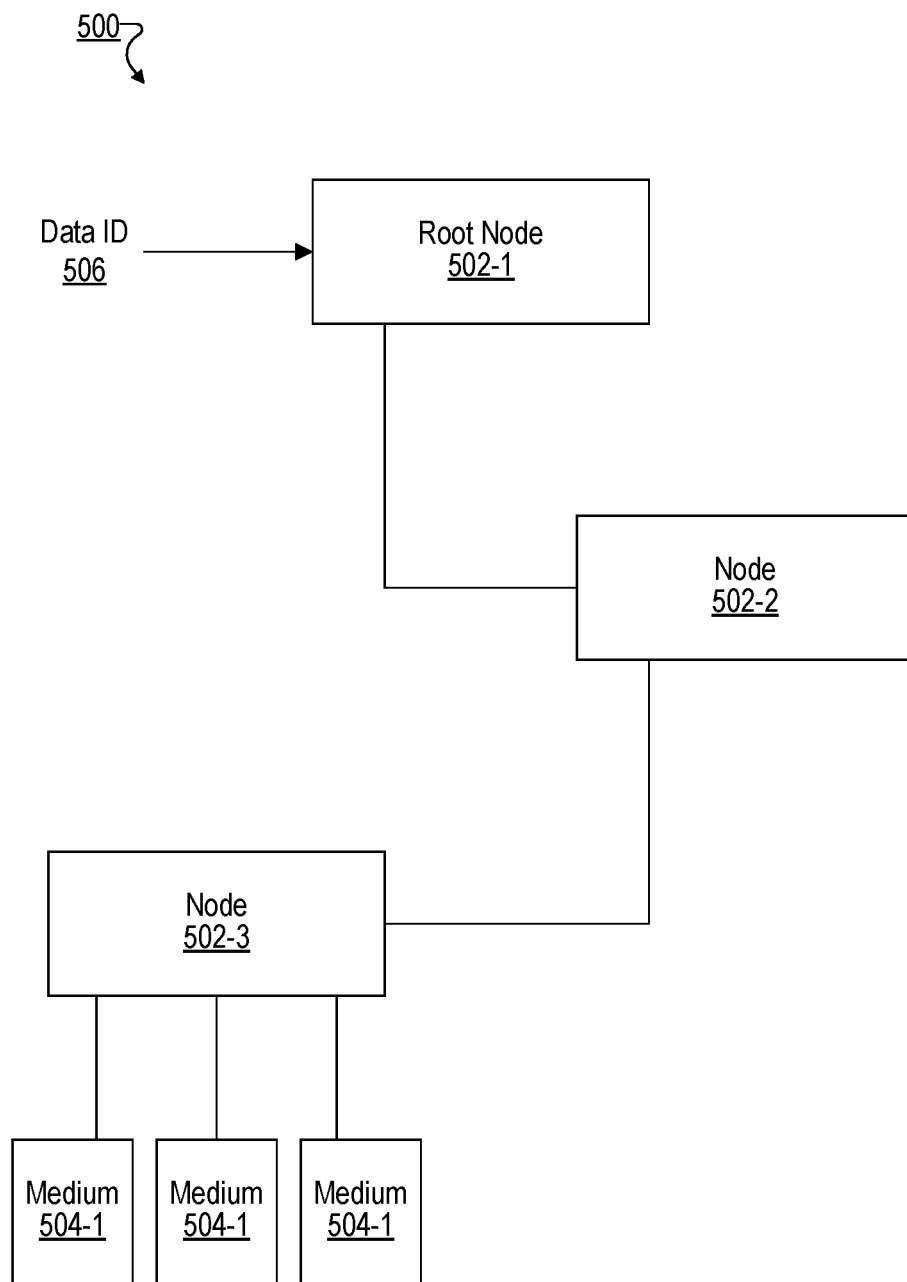
FIG. 5 illustrates an example of a data structure resource used to represent a data instance in accordance with some embodiments.

FIG. 5 illustrates an example of a block container 500 used to represent a data instance in accordance with some embodiments. As shown in FIG. 5, block container 500 may include a graph (e.g., an acyclic graph such as a directed acyclic graph or a balanced directed acyclic graph) of logical extent nodes 502-1 through 502-3 (collectively "logical extent nodes 502," "logical extents 502," or "nodes 502"). In the illustrated graph, node 502-1 is a root node, node 502-2 is a child node of node 502-1, and node 503-3 is a child node of node 502-2.

The graph of logical extents is associated with and represents a data instance. In the illustrated example, a data instance identifier (data ID) 506 is mapped to root node 502-1 to associate a data instance having the data ID 506 to the root node 502-1 and consequently to the graph of logical extents 502. Data ID 506 may be any suitable unique identifier and may be produced in any suitable way. For example, container utilization system 404 may generate or receive data ID 506. Container utilization system 404 may map the data ID 506 to root node 502-1 in any suitable way.

Each of nodes 502 includes a list of one or more pointers to other nodes 502 and/or to logical addresses mapped to physical media locations at which data associated with the data object is stored. For example, root node 502-1 may include a pointer to node 502-2, which may include a pointer to node 502-3. Node 502-3 may include pointers to logical addresses such as logical block addresses that are mapped to locations in physical media at which data for the object is stored. In FIG. 5, mediums 504-1 through 504-3 (collectively "mediums 504") may represent the logical addresses (in a linear address space) and/or locations in physical media at which data for the data instance is stored. Accordingly, nodes 502-1 and 502-2 may be composite logical extents, and node 502-3 may be a leaf logical extent.

While FIG. 5 depicts a data ID 506 for a data instance being mapped to root node 502-1, this is illustrative of certain embodiments. A data instance may be associated with a graph of logical extents in any suitable way, including by directly mapping the data instance to any other suitable internal handle for supporting virtualized thin provisioning of block containers 405 and/or blocks in block container system 402. Moreover, the use of a graph of logical extents to represent a block container 405 is illustrative only. Block containers 405 may be represented using any suitable architecture, including any of the other illustrative architectures described herein.

The use of block containers 405 to represent data instances in data store 408 may provide flexibility for the storage and management of the data instances. For example, for certain data storage services, data instances can be any size and can be resized by reconfiguring the block containers 405 representing the data instances. As another example, additional resources of block container system 402 may be used, such as by applying the resources to the block containers 405 to perform one or more operations on the data instances. To illustrate, data reduction resources, data replication resources (e.g., snapshotting), and/or storage reclamation resources of block container system 402 may be applied to the data instances represented by block containers 405. Such applications may provide instantaneous and/or efficient snapshotting of the data instances in data store 408, reducing of data by using multiple block containers 405 to point to the same stored content that are associated with multiple data instances, and garbage collecting to reclaim storage in data store 408.

Block containers 405 of block container system 402 may be adapted for representing and managing data in data store 408. For example, an architecture used to represent a block container 405 may be adapted to reduce or minimize overhead that is associated with the block container 405. To illustrate, a block container 405 may be associated with a volume in a block storage service such that the block container 405 is tied to an overhead associated with the volume. The block container 405 or another block container 405 may be adapted by freeing it from the volume and/or at least some of the overhead associated with the volume. For example, overhead such as metadata overhead, administrative overhead, visual overhead, representation overhead associated with presented, user managed structures, and/or overhead associated with host exports may be reduced or for some types of overhead eliminated from the block container system 402. For example, block containers 405 may be presented to and/or otherwise used by one or more storage services without being presented to or in any way directly used by users of the storage services and/or without being exported or otherwise exposed externally on an individual basis. Such configurations may allow block containers 405 to have minimal overhead in block container system 402, and in some cases to have none of one or more of the types of overheads mentioned above. For example, a storage service such as a file storage service may present a file system as a whole, as an exported and user administered entity. These features may allow a data instance to be represented with a block container 405 that has substantially less overhead in comparison with, say, a set of block devices which are implemented using similar internal structure as the described block container. Accordingly, for the same finite physical storage resources, container utilization system 404 may store and manage many more data instances represented with block containers 405 compared to the number of volumes that can be represented in block container system 402. In certain examples, for instance, only tens of thousands of volumes may be practically represented using full administrative load volumes implemented in the style of block containers 405 compared to practical support for billions of data instances being represented using adapted, low administrative load block containers 405.

Container utilization system 404 may be configured to perform one or more operations to provide data store 408 and to represent and manage data in data store 408 using block containers 405 and resources 406 of block container system 402. Such operations may include, without limitation, writing data, reading data, creating a data instance, setting a length of a data instance, retrieving information about data, deleting data, snapshotting data, appending data, reducing data, replicating data, and reclaiming storage in data store 408. In certain examples, garbage collection resources and/or other resources of block container system 402 may be scaled to handle large numbers of data instances represented with block containers 405.

In certain examples, block containers 405 can provide identifiers formed of multiple parts that may include, for example, a namespace part and a unique identifier within the context of the namespace, where different parts of the identifiers might be provided by varying combinations of the layer implementing the block containers 405 and the layer requesting that block containers 405 be created. Snapshots, clones, checkpoints, and replicas can form new block container names such that some parts are retained while others are adjusted in a common way, such as by retaining some unique identifier associated with a particular block container while including a common substring representing the snapshot, clone, checkpoint, or replica. So, for example, given a file storage system built from block containers 405 named using a combination of a file system name or identifier and a block container identifier that is unique relative to the file system, when making a clone of the file storage system's files, directories, and other data and metadata, the cloned block containers 405 can retain their file system relative unique identifiers while adjusting the file storage system identifier part to be an identifier for the file storage system clone. Then, file storage system or other storage service logic can be pointed at the cloned block containers 405 based on the name pattern of the file storage system clone while reusing the unique identifier parts of the block container names to match the block containers 405 to the logical components within the file storage system.

Alternately, or additionally, block containers 405 can be grouped in various ways such that block containers 405 have names (including names that are simple, dynamically assigned integers) within some group. In such a case, a file storage system or other storage service may be built to make use of one or more groups, such that making a snapshot or clone of a group results in a new group that retains the block container names but has a different group name or identifier. In this case, storage service logic can be pointed at a group instead of utilizing some other naming pattern of block containers 405.

In certain examples, such groups may be based on pods, or for a pod-based storage system, groups or other types of block container collections can be contained within pods. Pods may provide a convenient scheme for additional forms of snapshots, clones, replication schemes, symmetric synchronous replication, continuous data protection, and more.

Container utilization system 404 may provide an application program interface (API) 410 as shown in FIG. 4B. API 410 may include a set of defined operations that may be performed by container utilization system 404 when the operations are called. The set of operations may include and/or support any of the operations of container utilization system 404 described herein. As shown in FIG. 4B, API 410 may be communicatively coupled to data store 408 and block containers 405. Accordingly, API 410 may perform operations on block containers 405 of block container system 402. In certain examples, API 410 may perform operations on block containers 405 by invoking and applying one or more resources 406 (e.g., defined functions) of block container system 402 to perform operations described herein. API 410 may also perform operations on data store 408 and data stored in data store 408.

API 410 may be exposed to and used by one or more data storage services. In such a configuration, the data storage services may leverage and benefit from one or more features of data storage system 400. For example, the data storage services may directly leverage and benefit from data storage provided by container utilization system 404 and indirectly leverage and benefit from block containers 405 and resources 406 of block container system 402 that are used by container utilization system 404.

Figure 6A:
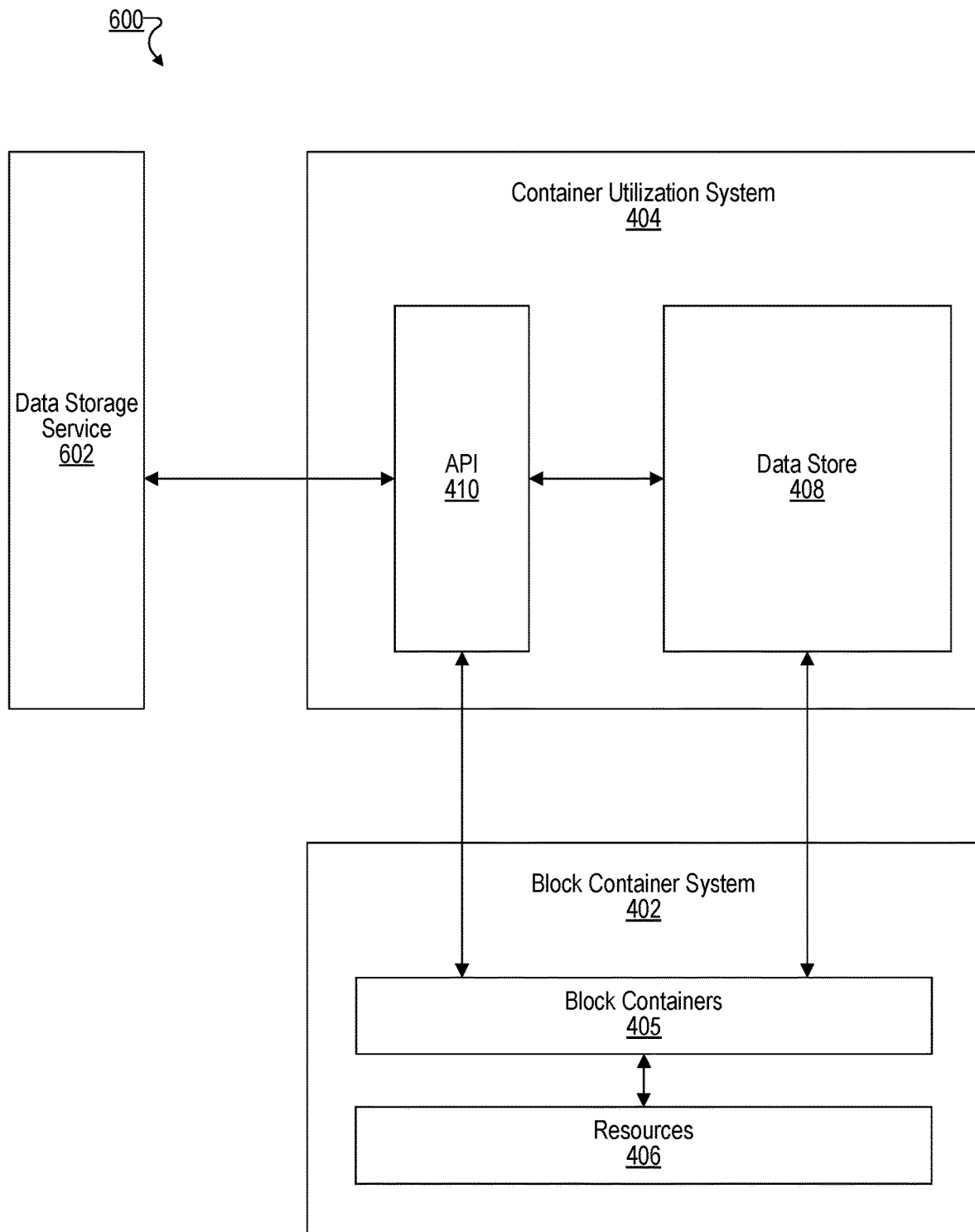
FIGS. 6A-B illustrate examples of data storage service systems configured to interface with a container utilization system in accordance with some embodiments of the present disclosure.

FIG. 6A illustrates an example of a data storage system 600 that includes a data storage service 602 configured to interface with container utilization system 404 by way of API 410. Data storage service 602 may be implemented in any suitable way (e.g., as a data storage system, as an engine, as a virtual data system, etc.) and may interface with container utilization system 404 in any suitable way, including by issuing calls to and receiving responses to the calls from API 410 of container utilization system 404.

Data storage service 602 may be any suitable type of data storage service, such as a file storage service that uses one or more file storage protocols, an object storage service that uses one or more object storage protocols, a block storage service that uses one or more block storage protocols, a database service that uses one or more database protocols, etc. In certain examples, data storage service 602 is a data storage service 602 that is not a block storage service.

Data storage system 400 and/or data storage system 600 may provide data storage service 602 with access to resources of block container system 402 and container utilization system 404 (e.g., through API 410) such that data storage service 602 may be built on block containers 405. For example, data storage service 602 may store and manage content of data storage service 602 in data store 408, and the content may be stored and managed using block containers 405 as described herein.

An example in which data storage service 602 is a file storage service will now be described. The example is illustrative. A file storage service may be implemented in other ways in other examples. Data storage service 602 may be a different type of data storage service in yet other examples.

In certain implementations, data storage service 602 may include a virtual file system (VFS) configured to manage file data. For example, the VFS may manage metadata that represents information about data files and how the data files map to data instances such as block containers stored in data store 408. In certain embodiments, the VFS may employ data structures called envelopes in which metadata about the data files and mappings of the data files to block containers is maintained. An envelope may include information about one or more data files. Envelopes may include any suitable information about data files and corresponding block containers, including, file identifiers, block container identifiers, container store map information (e.g., info about relationships between file identifiers and block container identifiers), snapshot info for the data (indicating older block container versions), root node identifiers for root nodes of graphs representing block containers in container-based data store 408, size information for files, block containers, and/or graphs of logical extents, statistics for the data, log information for the data, and the like. In some examples, envelopes may be directories plus caches of metadata about files contained in the directories. Data storage service 602 may be configured to provide any information about data files, including block container identifiers and/or other information represented in envelopes, to API 410 in conjunction with calling functions of API 410. Data storage service 602 may also be configured to receive information about data files, including block container identifiers and/or other information to be represented in envelopes (e.g., logical size of a file, logical space used for the file, etc.), from API 410 in conjunction with responses from called functions of API 410.

In certain implementations, data storage service 602 may be configured to generate and provide block container identifiers for use by container utilization system 404. Container utilization system 404 may be configured to use the block container identifiers as local identifiers within container utilization system 404 or may be configured to map the block container identifiers to local identifiers generated and used within container utilization system 404.

In certain embodiments, data storage service 602 and container utilization system 404 may be configured to represent each data file or envelope as a block container in data store 408. Data storage service 602 may be configured to cache files and push cached block containers to container utilization system 404 in batches for writing to data store 408. Data store 408, in turn, may persist block containers and associated versions (e.g., snapshots) and make the block containers available for fast access by data storage service 602.

Container utilization system 404 may be configured to provide transaction semantics for use by data storage service 602. In certain embodiments, the transaction semantics may allow, for at least some classes of operations, data storage service 602 to issue multiple updates to a file and request that all or none of the updates be made to the block container representing the file. Container utilization system 404 may be configured to implement all or none of the updates and return either new or old data to data storage service 602.

In certain implementations, container utilization system 404 and data storage service 602 may be configured to support multi-container transactions. For example, container utilization system 404 may use one or more resources 406 of block container system 402 to provide an array of parallel transaction queues (e.g., 32 buffers) that can be written to independently for increased throughput. The number of parallel transaction queues written to may be maximized to increase throughput.

To illustrate the use of such parallel transaction queues, a transactional update may include data for multiple metadata elements and/or operations (e.g., create a block container, create another block container, append to a block container, etc.). Container utilization system 404 may be configured to perform everything associated with such a transactional update all together or not at all. Accordingly, everything in the transactional update may be made visible to a host at the same time.

Data storage service 602 may be configured to provide file storage services (e.g., to a host server that is not shown in FIG. 6A). To this end, data storage service 602 may be configured to support any file-based storage protocols, including for example, NFS, SMB, and/or CIFS. One or more such protocols may be used by a host server, for example, to interface with the VFS.

In the case of a storage system providing a file service, such as through NFS or SMB, container utilization system 404 makes it very simple for the file service layer to concentrate on protocol handling and file service semantics without being concerned about layout out files on the storage, while benefiting from the rich semantics of block containers 405. For example, file stores get the benefit of deduplication and compression without having to implement those features separately, will also benefit from all the other block container or pod services such as snapshots, clones and various types, forms, and methods of replication, and may be able to leverage symmetric synchronous replication to provide symmetrically accessible mirrored files in a simple fashion. Individual files can be cloned easily by virtually copying one block container to another as part of creating a new file. A file can be re-cloned by virtually copying the block container associated with the first file to the block container associated with the second container. This can, for example, make it very fast and space efficient to copy a collection of virtual machine images stored as files, or for storing Docker- and Kubernetes-style containers which are generally stored as a collection of overlay directories but where cloning operations could be used to eliminate the separate overhead of reading and writing to these overlays during run-time operation of such a container In certain examples, a file system of a file storage service can be versioned by making a sequence of snapshots of the file system's associated block containers based on naming or grouping rules. If subtrees of a file system are differentiated in a coordinated way such as with attributes of block containers, for example based on various kinds of tags or name components, then a file system can leverage that to get highly performant and flexible subdirectory snapshots through requests to the block container service layer to snapshot block containers with those attributes to create new block containers with a particular set of new attributes to differentiate them from the original block containers.

While an example of a file storage service system interfacing with container utilization system 404 has been described above, any suitable data storage service system, including another type of data storage service system, may interface with container utilization system 404. For example, an object-based storage service system (e.g., an S3 storage service system) may interface with container utilization system 404. An object store may get the benefit of deduplication and compression without having to implement those features separately, may also benefit from all the other block container or pod services, and may even be able to leverage symmetric synchronous replication to provide symmetrically accessible mirrored objects in a simple fashion. Individual objects can be cloned easily by virtually copying one block container to another as part of creating a new object. An object can be re-cloned by virtually copying the block container associated with the first object to the block container associated with the second container. This can, for example, make it very fast and space efficient to copy a collection of virtual machine images or containers. As another example, a database service system may interface with container utilization system 404. A database that stores blobs may benefit from deduplication and/or inherit additional block container and pod capabilities.

A storage service system that interfaces with container utilization system 404 may be configured to provide data storage services using any suitable data storage protocol or set of protocols.

Figure 6B:
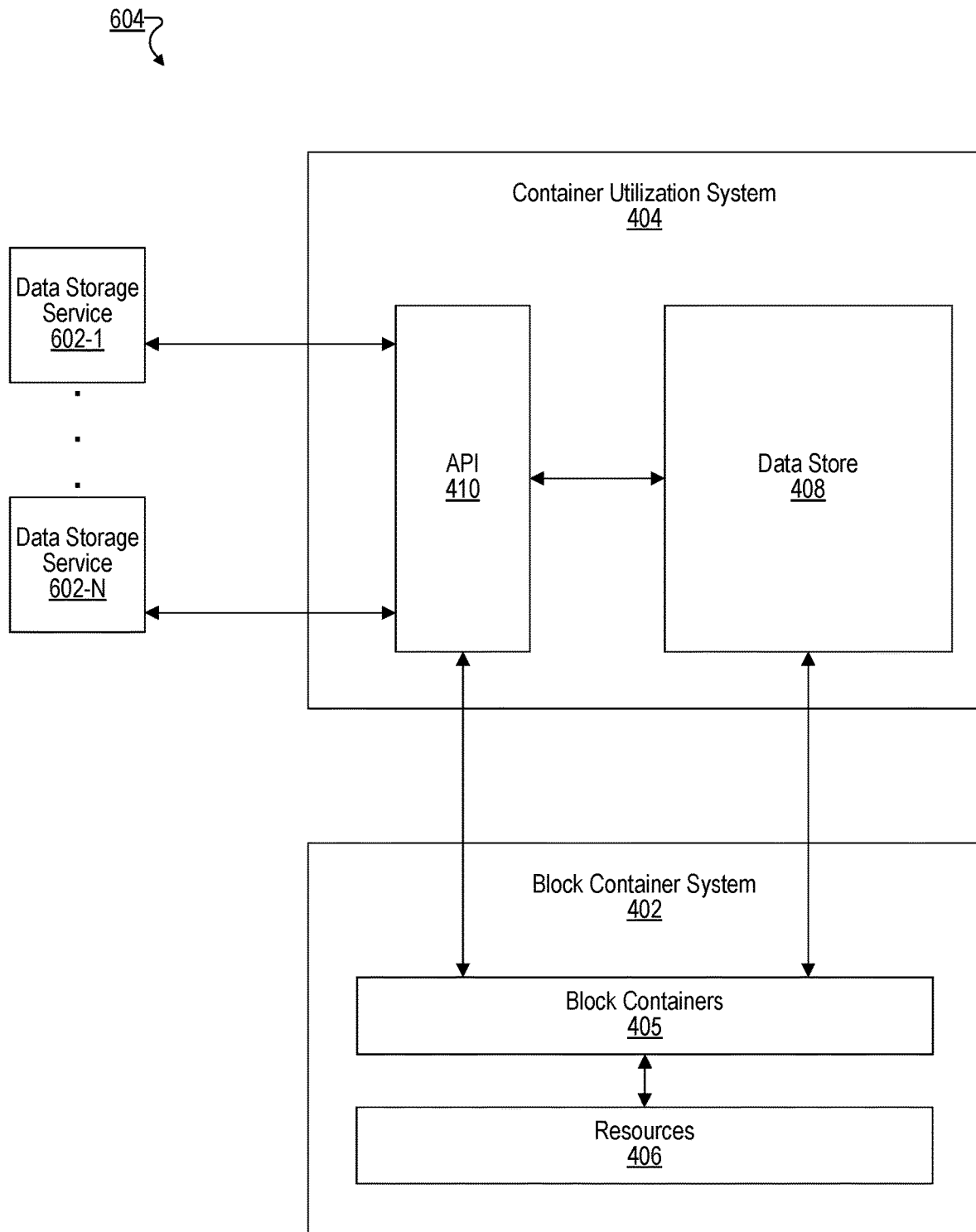

While FIG. 6A illustrates one data storage service 602 supported by container utilization system 404 and block container system 402, these systems may be configured to support any number of data storage services, including data storage services of different types. FIG. 6B illustrates an example of a data storage system 604 that includes N number of data storage services 602 (data storage services 602-1 through 602-N) configured to interface with container utilization system 404 by way of API 410. The plurality of data storage services 602 shown in FIG. 6B may include any suitable combination of data storage services (e.g., file, block, object, database, etc.) configured to interface with container utilization system 404 by way of API 410.

Data storage services 602 may be provided with access to resources of block container system 402 and container utilization system 404 (e.g., through API 410) such that data storage services 602 may be built on block containers 405. For example, data storage services 602 may store and manage content of data storage services 602 in one or more data stores (e.g., data store 408) maintained by container utilization system 404, and the content may be stored and managed using block containers 405 as described herein.

Container utilization system 404 may function as an intermediary between block container system 402 and one or more data storage services 602. This may allow different data storage services 602 to easily interface with container utilization system 404 (e.g., by way of API 410) in order to benefit from block containers 405 and resources 406 of block container system 402.

In certain examples, block container system 402 and/or container utilization system 404 may be configured to allow space efficient virtual copying or cloning of block ranges or block containers associated with one storage service to be used by another storage service. As example, individual files or sets of files of one file system may be virtually copied to another file system. As another example, individual files or sets of files of a file system may be turned into individual objects or sets of objects in an object store (or vice versa). As another example, a database blob may be virtually copied from a database to make a file or object. In a more complex example, a file contained within a virtual machine's file system image where the file system image is itself stored, for example, as either a block volume or an individual file on a block container, could be virtually copied to form an independent file or object within a file system or object store that directly utilizes block containers.

In certain examples, block container system 402 and/or container utilization system 404 may be configured to provide a variant of this in which multiple identities may be provided for a block container such that different storage service can share a block container, which sharing may include inheriting changes to the content of the block container. For example, a file system and an object store may share a block container. The file system may use a first identifier for the block container, and the object store may use a second identifier for the block container. Changes made to content of a file in the file system may be inherited by a corresponding object in the object store by way of the changes to the content of the file being made in the shared block container.

While FIGS. 4A, 4B, 6A, and 6B illustrate container utilization system 404 and block container system 402 as separate entities, other configurations may be implemented in other embodiments. As an example, container utilization system 404 and block container system 402 may be flattened into a container storage system configured to operate in any of the ways described herein. This may be accomplished in any suitable way, including by implementing one or more of resources 406 in a container storage system. The resources 406 implemented in the container storage system may include the same resources as may be used in a block storage system and/or may include adaptations of the resources that are configured for use with the container storage system. The reader will appreciate that any other implementation of a container storage system may be configured to operate in any of the ways described herein using any of the illustrative resources described herein and/or other suitable resource.

Figure 7:
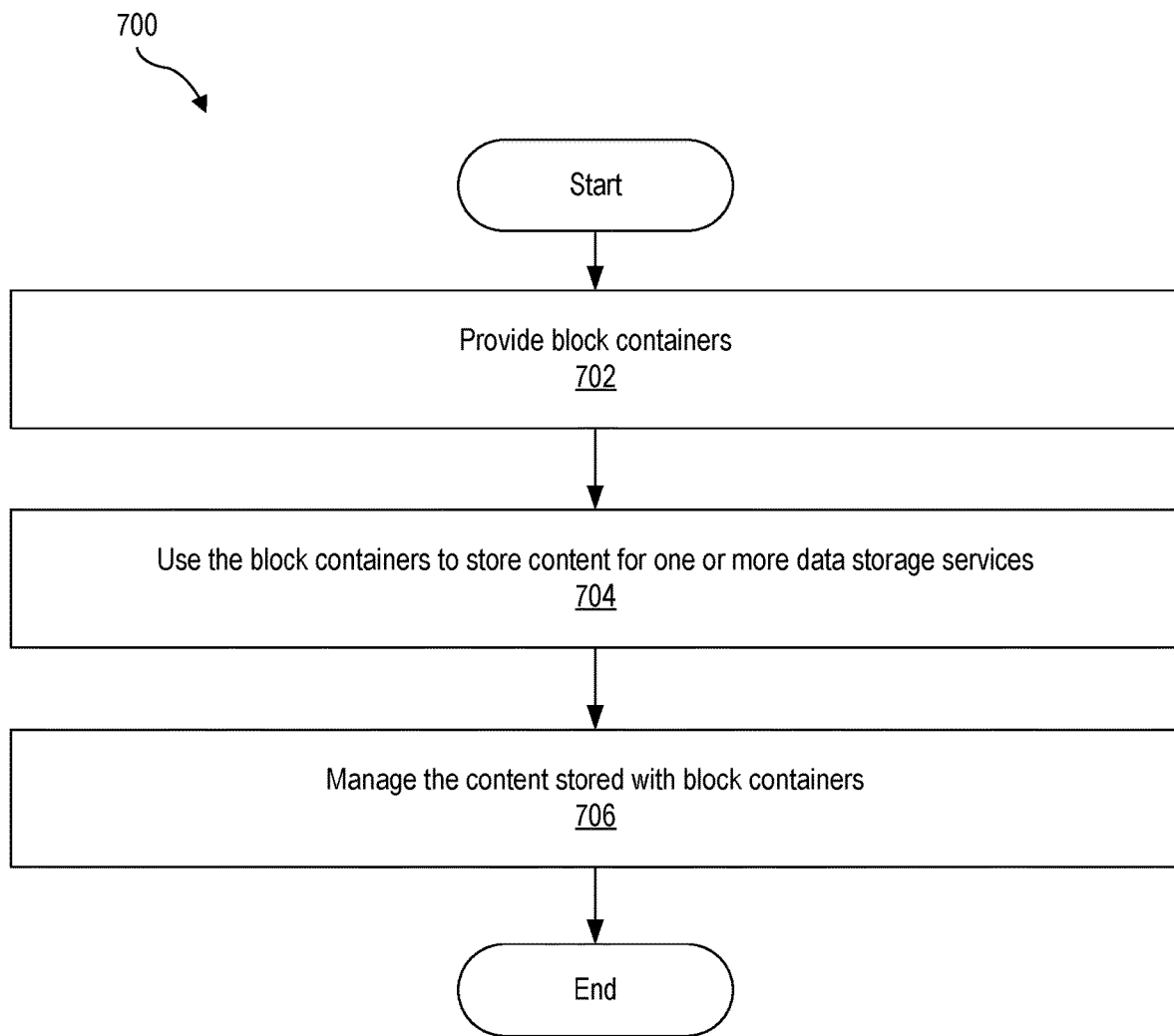
FIGS. 7-11 illustrate example methods of a data storage system in accordance with some embodiments of the present disclosure.

FIG. 7 illustrates an exemplary method 700 for a data storage system. While FIG. 7 illustrates exemplary operations according to one embodiment, other embodiments may omit, add to, reorder, and/or modify any of the operations shown in FIG. 7. One or more of the operations shown in FIG. 7 may be performed by data storage system 400, any components included therein, and/or any implementation thereof.

In operation 702, block containers are provided. For example, block container system 402 may provide block containers 405 in any of the ways described herein.

In operation 704, the block containers are used to store content for one or more data storage services. For example, container utilization system 404 may use block containers 405 to store content for one or more data storage services 602 in any of the ways described herein.

In operation 706, the content stored with the block containers is managed. For example, block container system 402 and/or container utilization system 404 may perform one or more operations to manage the content, such as by applying resources 406 of block container system 402 to perform snapshotting, cloning, deduplication, compression, garbage collection, and/or other operations on the content stored with block containers 405.

Figure 8:
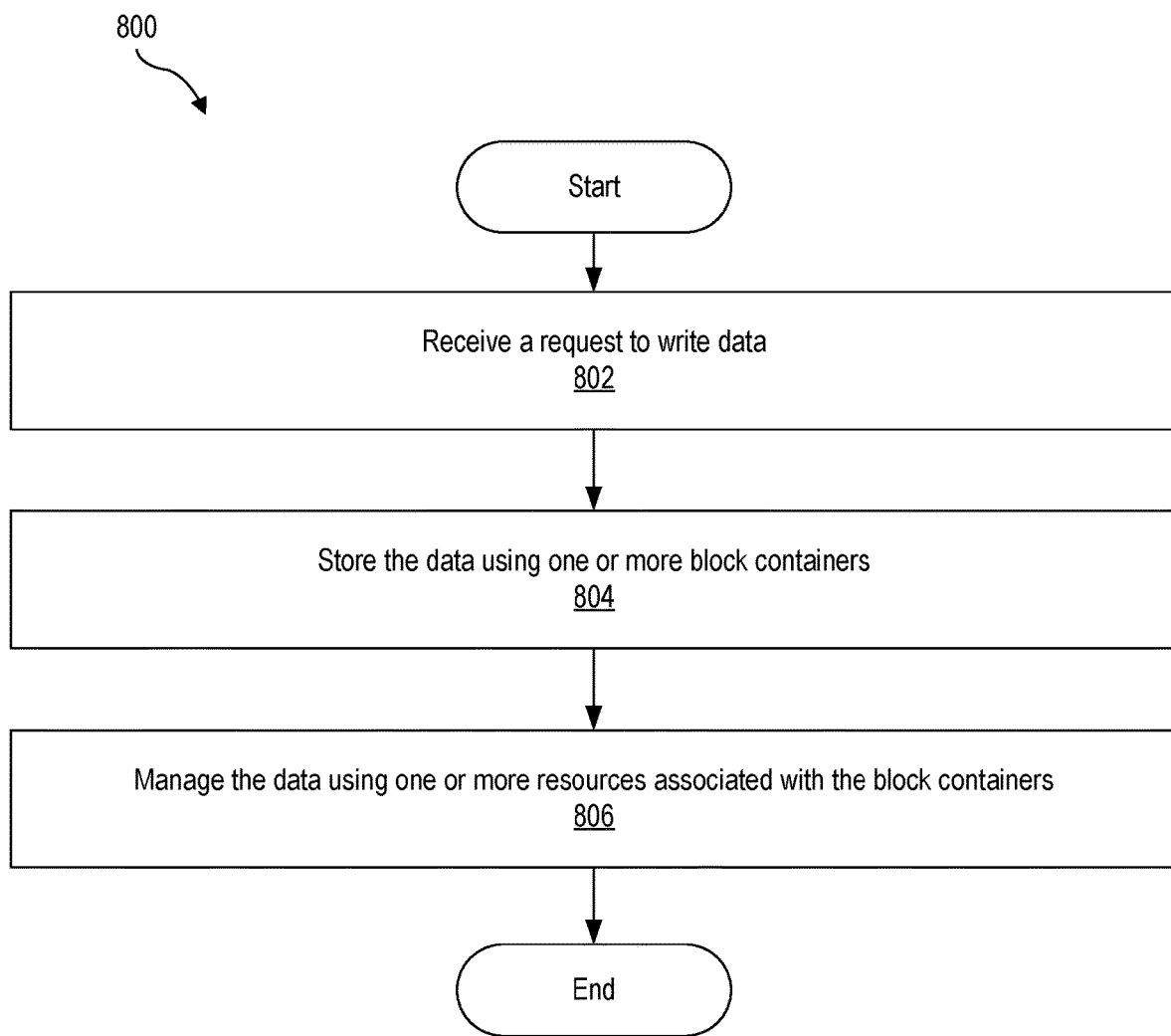

FIG. 8 illustrates an exemplary method 800 for writing and managing data. While FIG. 8 illustrates exemplary operations according to one embodiment, other embodiments may omit, add to, reorder, and/or modify any of the operations shown in FIG. 8. One or more of the operations shown in FIG. 8 may be performed by data storage system 400, any components included therein, and/or any implementation thereof.

In operation 802, a data storage system receives a request to write data. The data storage system may receive the request from any suitable source, such as a data storage service 602, another data storage system configured to interface with the data storage system, or a host (e.g., a host controller, a host server, etc.).

The request may include any information indicating or associated with the request. For example, the request may include data to be written and information about the data, such as a data identifier (a data file identifier, a block container identifier to be used by the data storage system to identify a block container to which the data is written), size information for the data, etc. Data fields included in the request may by defined by a schema used to interface with the data storage system.

In operation 804, the data storage system stores the data to a data store in response to the request received in operation 802. The data storage system may use one or more block containers to store the data to the data store.

Operation 804 may include the data storage system performing one or more processes to store the data to the data store. The processes may use any of the illustrative resources described herein. In certain examples, the storing of the data to the data store may include multi-stage processes such as a frontend process and a backend process. The frontend process may include use of resources to write the data to a temporary data store (e.g., a non-volatile data store, NVRAM, a cache, etc.) and reducing the data (e.g., via pattern recognition, data deduplication, and compressing the data). The frontend process may be performed inline such that the data storage system may notify, with low latency, a host from which the request was received that the data write has been performed. The backend process may include use of resources to write the data to the data store, which may include batch writing the reduced data to all-flash memory.

In operation 806, the data storage system manages the data in the data store using one or more resources associated with the block containers. Operation 806 may include the data storage system performing one or more processes to use one or more resources of block container system 402 to manage the data in the data store. The processes may use any of the illustrative resources described herein. In certain examples, the managing of the data in the data store may include using resources of block container system 402 to reduce the data in the data store (e.g., by deep deduplication, deep compression, etc.) and/or reclaim storage (e.g., by garbage collection).

Figure 9:
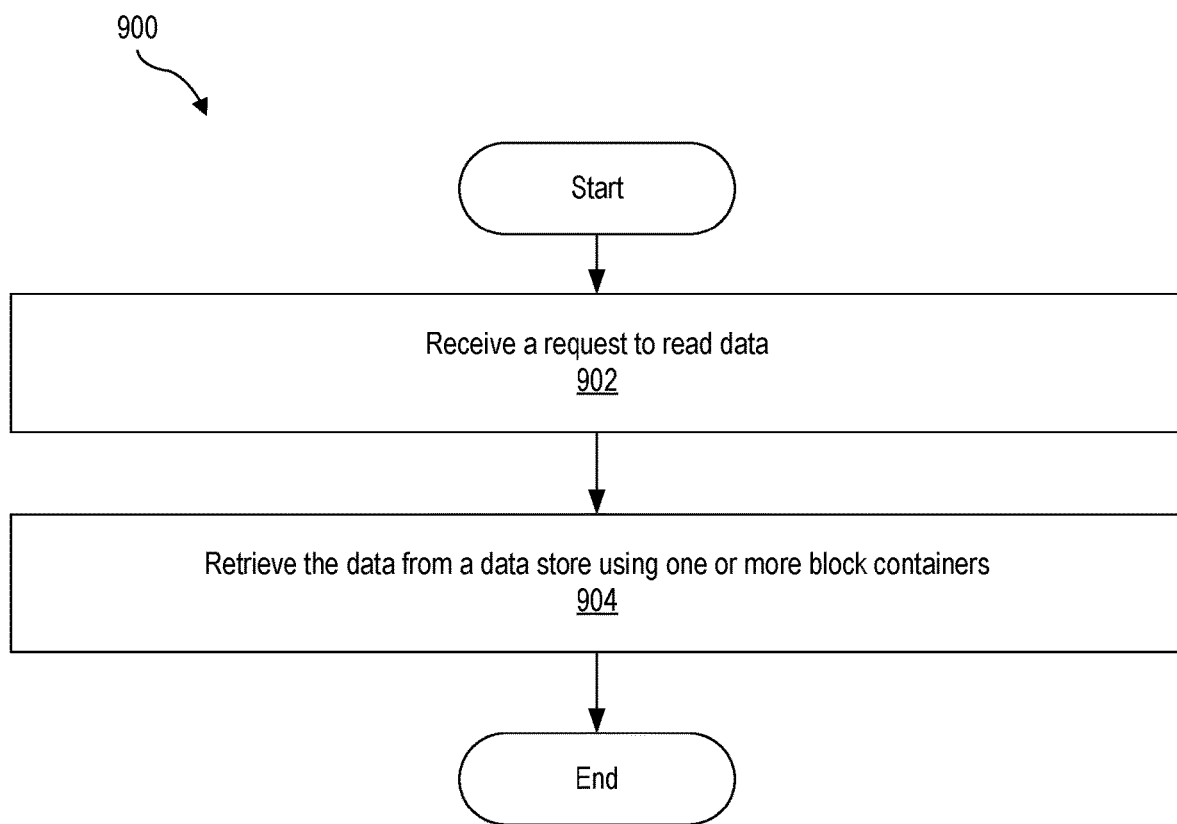

FIG. 9 illustrates an exemplary method 900 for reading data. While FIG. 9 illustrates exemplary operations according to one embodiment, other embodiments may omit, add to, reorder, and/or modify any of the operations shown in FIG. 9. One or more of the operations shown in FIG. 9 may be performed by data storage system 400, any components included therein, and/or any implementation thereof.

In operation 902, a data storage system receives a request to read data. The data storage system may receive the request from any suitable source, such as data storage service 602, another data storage system configured to interface with the data storage system, or a host (e.g., a host controller, a host server, etc.).

The request may include any information indicating or associated with the data to be read. For example, the request may include information about the data to be read, such as a data identifier (a data file identifier, a data object identifier used by the data storage system to identify a data object in which the object data is stored, etc.). Data fields included in the request may by defined by a schema used to interface with the data storage system.

In operation 904, the data storage system retrieves the data from the data store in response to the request received in operation 902. The container storage system may use one or more block containers to retrieve the data from the data store. For example, the data storage system may use a block container that represents the data in the data store, to locate and retrieve the data. This may include using a data identifier to identify a handle of the block container and using the handle to access and use the block container to locate and retrieve the data.

Additionally, in certain examples, the data storage system may use a lookaside data structure, such as a lookaside table or cache, to locate and retrieve the data. The data storage system may be configured to generate and populate the lookaside data structure with data representing a log of actions that are to be performed by the data storage system in a time-shifted manner, such as later as part of a background process. For example, the lookaside data structure may indicate tuples that are written to a silo but not yet written to the data store. Accordingly, the data storage system may use the lookaside data structure, together with a block container, to locate and retrieve data being read.

Figure 10:
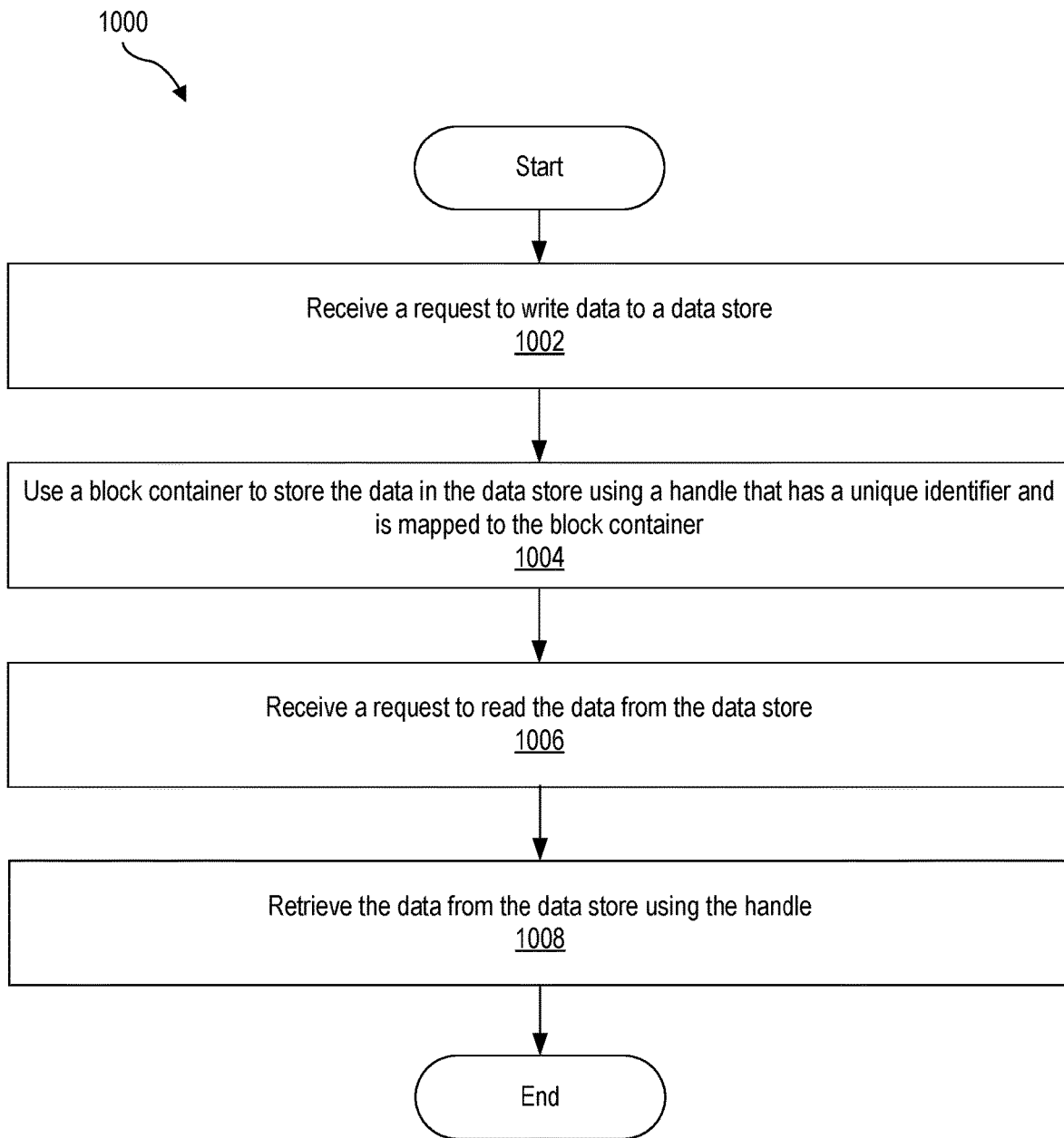

FIG. 10 illustrates an exemplary method 1000 for using a block container to represent data in a data store. While FIG. 10 illustrates exemplary operations according to one embodiment, other embodiments may omit, add to, reorder, and/or modify any of the operations shown in FIG. 10. One or more of the operations shown in FIG. 10 may be performed by a data storage system, any components included therein, and/or any implementation thereof.

In operation 1002, a data storage system receives a request to write data to a data store. The data storage system may receive the request from any suitable source, such as a data storage service 602, another data storage system configured to interface with the data storage system, or a host (e.g., a host controller, a host server, etc.).

The request may include any information indicating or associated with the request. For example, the request may include data to be written and information about the data, such as a data identifier (a data file identifier, a data object identifier to be used by the data storage system to identify a data instance to which the data is written), size information for the data, etc. Data fields included in the request may by defined by a schema used to interface with the data storage system.

In operation 1004, the data storage system uses a block container to store the data to the data store in response to the request received in operation 1002. The data storage system uses a handle having a unique identifier mapped to the block container to identify the block container.

In certain examples, the storing of the data to the data store may include the data storage system performing multi-stage processes such as a frontend process and a backend process. The frontend process may include writing the data to a temporary data store (e.g., a non-volatile data store, NVRAM, a cache, etc.) and reducing the data (e.g., via pattern recognition, data deduplication, and compressing the data). The frontend process may be performed inline such that the data storage system may notify a host, with low latency, that the data write has been performed. The backend process may include writing the data to the data store, which may include batch writing the reduced data to all-flash memory.

In operation 1006, the data storage system receives a request to read the data from the data store. The data storage system may receive the request from any suitable source, such as a data storage service 602, another data storage system configured to interface with the container storage system, or a host (e.g., a host controller, a host server, etc.).

The request may include any information indicating or associated with the data to be read. For example, the request may include information about the data to be read, such as a data identifier (a data file identifier, a data object identifier used by the data storage system to identify a data object in which the data is stored, etc.). Data fields included in the request may by defined by a schema used to interface with the data storage system.

In operation 1008, the data storage system retrieves the data from the data store using the handle. This may include using the handle to identify and use the block container to locate and retrieve the data. Operation 1008 may additionally include searching a lookaside data structure to identify any data indicating that the block container is to be used for retrieval of data (e.g., data from a snapshot of the data that is not yet carried through to an updated version of the data).

Figure 11:
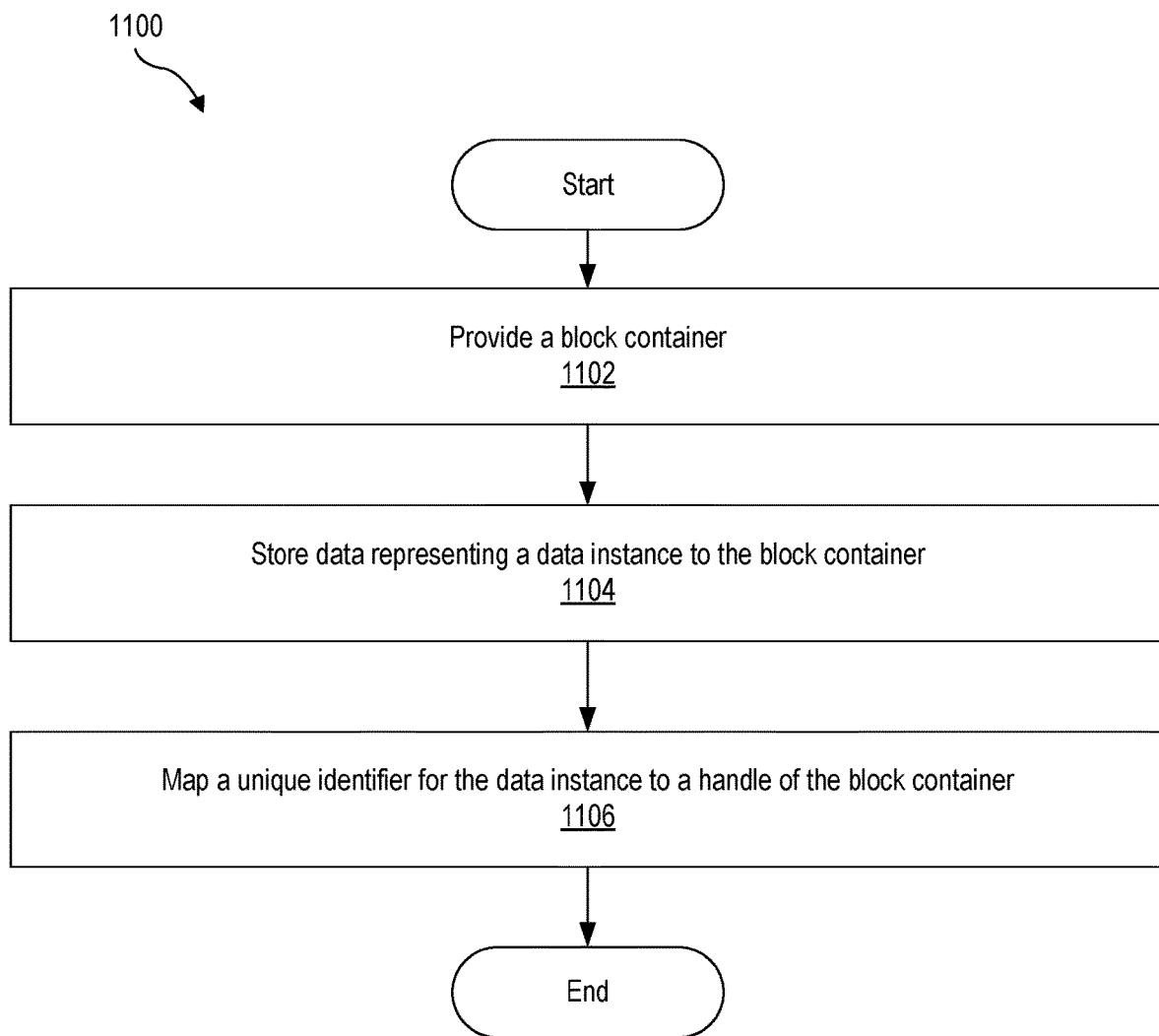

FIG. 11 illustrates an exemplary method 1100 for using a block container to represent data in a data store. While FIG. 11 illustrates exemplary operations according to one embodiment, other embodiments may omit, add to, reorder, and/or modify any of the operations shown in FIG. 11. One or more of the operations shown in FIG. 11 may be performed by a data storage system, any components included therein, and/or any implementation thereof.

In operation 1102, a data storage system provides a block container (e.g., by thin provisioning the block container). Operation 1102, which may be performed in response to a request to write data to a data store, may be performed in any suitable way. For example, the data storage system may provision the block container based on data to be written to the data store and/or further based on block containers that already exist in the data store.

In operation 1104, the data storage system stores data representing a data instance to the block container. Operation 1104 may be performed in any suitable way, including by writing the data to logical and/or physical storage media locations and associating the block container to the logical storage media locations (e.g., logical addresses) mapped to the physical storage media locations.

In operation 1106, the data storage system maps a unique identifier for the data instance to a handle of the block container. Operation 1106 may be performed in any suitable way, including by the data storage system receiving or generating the unique identifier for the data instance and associating the unique identifier with the block container (e.g., by storing the unique identifier in the block container).

In accordance with certain embodiments of the present disclosure, a data storage system such as any of the illustrative storage systems described herein may be configured to use pods to efficiently copy file systems constructed of block objects. For example, a storage system may generate, based on a pod that includes a file system constructed of block objects, a virtual copy of the pod such that modifications made to the pod after the generation of the virtual copy of the pod are distinct from the virtual copy of the pod. All block objects and configuration information (e.g., metadata, state information, etc.) of the file system in the pod will be included in the virtual copy of the pod, resulting in a comprehensive virtual copy of the file system. Such copying of a pod may be used in certain embodiments to implement pod-based snapshots or clones of a file system, and may be used as part of a process to replicate a file system.

In certain examples, the term "pod" refers to any storage system construct that groups large numbers of storage entities (e.g., block objects and file systems) within a namespace and that supports efficient operations on all entities as a group. A pod may provide a view into a data set that includes the entities in the group. Accordingly, entities in the group may be accessed (e.g., read, written, etc.) by way of the pod.

In certain examples, the term "virtual copy" refers to any copy of a source that is configured to be accessed (e.g., operated on) as a full copy of the source but is not actually a full copy of the source. The virtual copy of the source may include any set of data (metadata, tables, graphs, or other data structures) that allows the virtual copy of the source to be accessed as a full copy of the source without being a full copy of the source. For example, the virtual copy may include copies of all or a subset of source metadata and/or references to source metadata and/or data. The virtual copy may not include actual physical copies of source data but may instead be mapped to the source data such that all the source data (or at least part of the source data in some examples) is initially shared by the source and the virtual copy of the source.

In certain examples, a file system constructed of block objects may refer to any file system that utilizes block objects to represent and/or manage content of the file system. Block objects, which may be stored in a block object data store, may be implemented based on concepts in block-based storage systems but oriented toward high object counts and dynamic creation and deletion that are atypical of volume-based block storage. Block objects are suitable for storing data and metadata for individual files and directories of a file system with efficient random read-write access (at least at the level of blocks). In some cases, block objects may be specialized for particular uses, such as for storing directories or other file system metadata in a form more suited to structured data access.

Block objects provide efficient mechanisms for certain data operations, including operations that utilize and/or are related to efficiently creating a copy of a source such as a snapshot, a clone, or a replication of the source. Block objects may be configured to support low latency random updates, at least at the level of writing and overwriting random blocks. Block objects may be configured to have a rich set of primitives for modifying the block objects (richer than primitives of conventional object stores).

In certain examples, block objects may correspond to block containers such as block containers 405 described herein. For example, block objects may include block containers or be an implementation of block containers.

Figure 12:
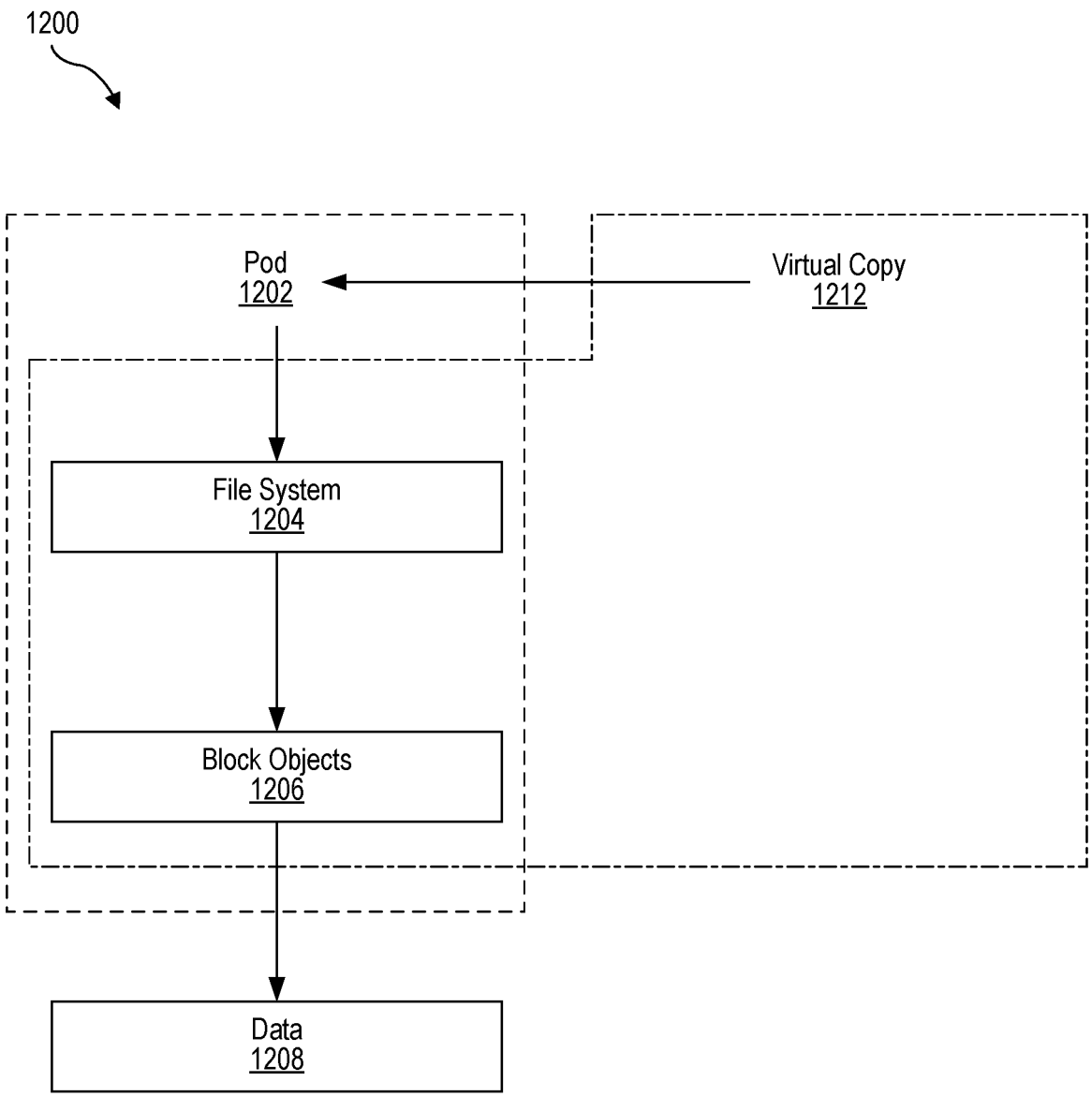
FIG. 12 illustrates an example of a data storage system in accordance with some embodiments of the present disclosure.

FIG. 12 illustrates an example of a data storage system 1200 ("storage system 1200") including a pod 1202 that includes a file system 1204 constructed of block objects 1206.

Pod 1202 may be any construct within storage system 1200 that defines a group of storage entities within a namespace and supports efficient group-level operations on the entities as a group. Pod 1202 and its group-level operations may be configured to support as many block objects as a file system may use. For file systems with few files, such as limited-use file systems storing virtual machine images or database tablespaces, this may not be all that many, perhaps on the range of hundreds to a few thousand block objects. For other file systems, the number of block objects could be in the millions or even billions, making it more important that the mechanisms for supporting groups and operations on those groups scale to these large numbers of block objects.

In certain examples, pod 1202 may include any data structure(s) containing one or more references to (e.g., pointers, references based on identifiers, etc.) contents of the pod 1202, such as a reference to file system 1204, references to file system entities in file system 1204 (e.g., references to files and directories arranged in one or more hierarchies), references to block objects 1206, etc. For example, pod 1202 may include a table containing any such reference(s). Such a table or other suitable data structure(s) may associate pod 1202 with its contents.

Storage system 1200 may be configured to support accessing file system 1204 by way of pod 1202. This may allow storage system 1200 to determine that requests to access the file system 1204 are received by way of pod 1202 and are thus for the file system 1204 in pod 1202 rather than for another file system (a copy of the file system 1204) in another pod. In other words, different accesses of the file system 1204 can be identified by storage system 1200 to differentiate an access to the file system 1204 in pod 1202 versus an access to a copy of the file system 1204 in one or more other pods or copies of pod 1202. If the file system identity is a file system property, then access to copies in other pods will need a distinguishing identity. This may be handled by adding the pod as part of the file system's identity. Once a file system's pod has been identified, any accesses to entities of the file system (e.g., block objects of the file system) can operate within the namespace of the pod, so there should be no ambiguity when looking at a block object identifier (such as one within a directory object) which block object in which pod is being referenced.

In certain examples, storage system 1200 may be configured to maintain a data structure such as a table (e.g., an indirection table) that includes information that maps storage entities such as file systems to pods in which the storage entities are included. Such a data structure may allow storage system 1200 to use the same file system identity for the file system 1204 across multiple pods, with a unique pod identity for each pod being added to the file system identity to distinguish the file system 1204 by the pod in which the file system 1204 is included. The same principle may be applied to identifiers of entities within the file system 1204, including identifiers of file system elements and block objects 1206 of the file system 1204, to path sets of the file system, to managed directories of the file system, or to any other file system metadata that the storage system 1200 may implement. The metadata may be stored in block objects 1206 or may be implemented in some other way. A virtual copy of a pod should ensure that all relevant information for any file system in the pod will be virtually or physically copied from the pod to the virtual copy of the pod.

While the example illustrated in FIG. 12 shows pod 1202 to include one file system 1204, this is illustrative only. In other examples, pod 1202 may be defined to include one or more additional data storage entities, such as one or more additional file systems and/or one or more other types of data storage entities (e.g., one or more volumes). A pod may be defined to include any suitable grouping of storage entities.

File system 1204 may include file system metadata defining a configuration of file systems entities (e.g., files and directories arranged in one or more hierarchies) included in the file system 1204. Any suitable metadata (e.g., path sets) and/or file system entities (e.g., managed directories) may be employed to represent configuration information of the file system 1204. In certain examples, file system 1204 includes file system entities managed in a file system layer (e.g., such as a file service layer described above) of storage system 1200.

File system 1204 may be constructed of block objects 1206 in any suitable way. For example, file system 1204 and/or file system entities may be mapped to or otherwise associated with corresponding block objects 1206.

Because file system 1204 is included in pod 1202, block objects 1206 corresponding to the file system 1204 are also included in pod 1202.

Block objects 1206 may include metadata content referencing (e.g., pointing to) actual data 1208 of file system 1204 but may be unaware themselves of the configuration (e.g., structure) of the file system 1204. The contents of block objects 1206 may be said to represent contents of the file system entities and to map the contents of the file system entities to actual blocks of data (e.g., data 1208) in storage system 1200. Block objects 1206 may include any suitable form of metadata content that represents contents of file system entities, maps the contents of the file system entities to actual data 1208, and supports efficient operations (e.g., block-level operations) on the metadata and/or actual data 1208.

In certain embodiments, for example, block objects 1206 may include content such as B-tree like directed acyclic graph-based data structures organizing references to exclusive or shared content using storage entities referred to as extents, which may include composite and leaf logical extents configured and operable on in any of the ways described above and/or as described in U.S. patent application Ser. No. 15/842,850 filed Dec. 14, 2017, the contents of which are hereby incorporated by reference. The '850 patent application describes an example of a way of referencing shared versus unique blocks and for cloning ranges of logical blocks or other logical storage elements, as well as an illustrative model of leaf and composite logical extents and a model for referencing shared blocks by content identifier from those extents. In other embodiments, block objects 1206 may be implemented in other ways. For example, contents of block objects 1206 may include or be represented with one or more tables (e.g., database tables).

Storage system 1200 may be configured to efficiently create a copy of a pod. This may be accomplished by storage system 1200 creating (e.g., in response to a request to snapshot, clone, or otherwise copy a pod) a virtual copy of the pod. Storage system 1200 may be configured to generate the virtual copy of the pod in a manner such that modifications made to the pod after the generation of the virtual copy of the pod are distinct from the virtual copy of the pod. When the virtual copy of the pod is a writable copy of the pod, modifications made to the writable copy of the pod are likewise distinct from the pod.

FIG. 12 illustrates a virtual copy 1212 of pod 1202 generated by storage system 1200. Storage system 1200 may generate the virtual copy 1212 of the pod 1202 in any suitable way. As an example, storage system 1200 may generate a new data structure that includes a reference to pod 1202, as is represented in FIG. 12. As another example, storage system 1200 may generate a new data structure that is a copy of the data structure representing pod 1202 and generate and assign a new identifier to the new data structure. If the pod 1202 includes a data structure containing a reference to file system 1204, the virtual copy 1212 of the pod 1202 may include a new data structure containing a copy of the reference to the file system 1204. If the pod 1202 includes a data structure containing references to contents of the file system 1204, block objects 1206, and/or contents of block objects 1206, the virtual copy 1212 of the pod 1202 may include a new data structure containing copies of the references to the contents of the file system 1204, the block objects 1206, and/or the contents of block objects 1206. The pod 1202 and the virtual copy 1212 of the pod 1202 share whatever data (e.g., whatever metadata or at least some metadata) has not yet been modified since the virtual copy 1212 was created.

Upon creation of the virtual copy 1212 of the pod 1202, at least some of the contents of the pod 1202 are shared between the pod 1202 and the virtual copy 1212 of the pod 1202. In certain examples, all the contents of the pod 1202 (e.g., all contents of file system 1204 and block objects 1206) are initially shared between the pod 1202 and the virtual copy 1212 of the pod 1202. For example, the virtual copy 1212 of the pod 1202 may be represented by a data structure that includes a reference to the same contents as pod 1202. FIG. 12 illustrates, by way of dashed lines, that contents of file system 1204 and contents of block objects 1206 are shared between the pod 1202 and the virtual copy 1212 of the pod 1202. While FIG. 12 shows data 1208 not included in the pod 1202 or the virtual copy 1212 of the pod 1202, in other examples data 1208 may be considered to be included in and shared between the pod 1202 and the virtual copy 1212 of the pod 1202 at least because the data 1208 is referenced by block objects 1206 that are included in and shared between the pod 1202 and the virtual copy 1212 of the pod 1202.

In other examples, a subset of the contents of the pod 1202 are initially shared between the pod 1202 and the virtual copy 1212 of the pod 1202. This may be implemented in a variety of ways, such as by the contents of the block objects 1206 being shared, some of the contents of the block objects 1206 being shared, the contents of the block objects 1206 and some of the contents of file system 1204 being shared, data structures organizing references to block objects and/or file systems being shared, etc. Such examples may include storage system 1200 partially copying some elements of the pod 1202 into the virtual copy 1212 of the pod 1202, such as by creating copies of header elements and/or creating placeholder elements in the virtual copy 1212 of the pod 1202. Any configuration of a virtual copy of the pod 1202 that supports efficient copying may be generated by the storage system 1200.

Storage system 1200 may be configured to perform one or more operations as part of generating a virtual clone that enable the storage system 1200 to localize any modifications that are made to the pod 1202 after the virtual copy 1212 of the pod 1202 has been created such that those modifications are distinct to the pod 1202 and are not shared with the virtual copy 1212 of the pod 1202. If the virtual copy 1212 is a writable copy of the pod 1202, such operations may also enable storage system 1200 to localize any modifications that are made to the virtual copy 1212 of the pod 1202 after the virtual copy 1212 of the pod 1202 has been created such that those modifications are distinct to the virtual copy 1212 of the pod 1202 and are not shared with the pod 1202.

In certain examples, operations associated with generating a virtual copy may include storage system 1200 adding information about the virtual copy 1212 to a data structure such as a table. For example, storage system 1200 may maintain a table that identifies file systems globally (e.g., using global identifiers in the storage system 1200) and references file systems within particular pods by pod and a pod-relative identifier. When storage system 1200 generates the virtual copy 1212 of the pod 1202, an entry for file system 1204 in the pod 1202 remains unchanged and includes a name and an identifier that references the file system 1204 in the pod 1202 by pod and pod-relative file system identifier. Storage system 1200 adds to the table a new entry for the virtual copy 1212 of the pod 1202. The new entry includes a new name for the virtual copy 1212 of the pod 1202 and an identifier that references the file system 1204 in the virtual copy 1212 of the pod 1202 using the pod-relative file system identifier. Such entries in the table may be used by storage system 1200 to determine access contexts (e.g., pathways) of modifications requests received after the virtual copy 1212 of the pod 1202 has been created, such as whether a modification request associated with file system 1204 is received by way of the pod 1202 or by way of the virtual copy 1212 of the pod 1202.

When block objects are within a pod that a file system operates within, then the block object identities should be unique within the pod, but their identities should map when accessed through another pod that is a pod-level copy. So, for example, given a pod POD1 with a file system FS1 and a set of block objects OBJECT1 through OBJECT9999, if the pod were cloned to form a pod POD2, then the original file system could be accessed as POD1.FS1, and the file system's objects could be accessed as POD1.OBJECT1 through POD1.OBJECT9999, and the clone's file system and objects could be accessed as POD2.FS1 and POD2.OBJECT1 through POD2.OBJECT9999.

An alternative scheme can use a table to map from file system identifiers that are not pod based to a combination of a pod and a pod-relative file system identifier. In such a case, to access a clone of a file system, a new identifier may be used, which is then mapped to the clone pod and the pod-relative file system identifier.

In certain examples, operations associated with generating a virtual copy may include storage system 1200 updating information associated with the pod 1202 and/or the virtual copy 1212 of the pod 1202 to indicate modification epochs (e.g., the start of new modification time periods) for the pod 1202 and/or the virtual copy 1212 of the pod 1202. For example, when generating the virtual copy 1212 of the pod 1202 and the virtual copy 1212 is a clone of the pod 1202, storage system 1200 may update an identifier for the pod 1202 to indicate the start of a new modification epoch for the pod 1202 and provide an identifier for the clone of the pod 1202 to indicate the start of a new modification epoch (e.g., the first modification epoch) for the clone of the pod 1202.

Storage system 1200 may be configured to use the modification epochs to determine how to process modification requests that are received after the clone of the pod 1202 has been generated. For example, when a modification request is received by way of an access context, e.g., by way of the pod 1202 or the clone of the pod 1202, storage system 1200 may compare a data entity's epoch, such as the epoch of a block object 1206 to be modified in accordance with the request, with the modification epoch of the pod 1202 or the clone of the pod 1202 associated with the access context. If the compared epochs do not match, the data structure is shared between the pod 1202 and the clone of the pod 1202 and should be privatized before making the modification. Storage system 1200 may make a private copy of the data entity (e.g., the block object 1206) and mark the private copy of the data entity with the current modification epoch. Storage system 1200 may then make the modification privately within either the pod 1202 or the clone of the pod 1202 (depending on the access context) using the private copy of the data structure such that the modification is distinct to either the pod 1202 or the clone of the pod 1202 and not shared with the other.

In certain examples, operations associated with generating a virtual copy may include storage system 1200 manipulating copy-on-write state on entities of an access context such as a pathway. For example, when a data structure is shared between two access pathways, the two pathways may each mark their references to the shared data structure as copy-on-write. Any attempt to make a modification down either pathway will encounter the copy-on-write state on the pointed-to data structure, which will cause storage system 1200 to make a copy of the pointed-do data structure that results in the various structures the data structure pointed to now being shared by two data structures, the original and the copy. The references to the next level of data structures are marked as copy-on-write, and so on up the pathway such that data structures along the pathway from where the sharing happened down to the data structure that is modified are copied and updated.

After the virtual copy 1212 of the pod 1202 has been generated, localization (e.g., privatization) of at least some of the contents of the pod 1202, which may include any contents of the pod such as metadata, contents of file system 1204 (e.g., file system entities), block objects 1206, and/or contents of block objects 1206, may be selectively performed as needed, such as in response to occurrences of a predefined trigger event. Any suitable trigger event may be defined and used to trigger localization of contents of the pod 1202, such as an access request, which may include a request to read data, a request to modify data, or any other suitable type of access request. A request to modify data may include a request to add, delete, create, change, move, or clone something (e.g., add a block object, add metadata, create a file, delete a file, change a file, create a directory, add or remove a file to or from a directory, delete a directory, move a file or directory between directories, cloning block objects, etc.) Examples of such modifications include, without limitation, adding a block or directory object, adding metadata for a new file system or a new path set representing a new managed directory, deleting a block object, deleting a file system, deleting a path set because a managed directory was deleted, and modifying something such as by adding or removing an entry in a directory, updating a path set, overwriting a block to a block object, writing a new block that extends a block object, doing a virtual copy operation between block objects or between parts of a single block object, and un-mapping some block from a block object (e.g., virtually zeroing blocks in a block object by having them no longer point to anything). Any such request to modify may operate on data or metadata that is shared between the pod 1202 and the virtual copy 1212 of the pod 1202 and will be localized to the pod 1202 or the virtual copy 1212 of the pod (depending on the access context of the request) as part of the modification.

By generating a virtual copy of the pod 1202 and then selectively performing localization of contents of the pod 1202 and/or contents of the virtual copy of the pod 1202 as needed based on a predefined trigger event, efficiently copying of the pod 1202 may be provided. The efficient copying may allow virtual copies to be created quickly and using minimal resources of storage system 1200 and for localization of contents of the pod 1202 and/or contents of the virtual copy of the pod 1202 (which may include actual copying of contents of the pod 1202 and/or the virtual copy of the pod 1202) to be selectively performed such that resources are used for localization only when needed. This can be especially beneficial for file systems constructed of large numbers of block objects and/or file systems representing substantial amounts of data that is never or infrequently updated.

Modifications made to the pod 1202 after the virtual copy 1212 of the pod 1202 has been generated are distinct from the virtual copy 1212 of the pod 1202. To illustrate, storage system 1200 may receive a request to modify content of the pod 1202. The request may be to modify a block object 1206 or content of a block object 1206 and/or a file system entity or content of a file system entity. Such a request may include a request to modify data within data 1208 (e.g., a block of data) associated with (e.g., referenced by) content of the block object 1206, for example. In response to the request, storage system 1200 may determine that the request is associated with the pod 1202 (e.g., is received by way of the pod 1202) and that the content to be modified is associated with both (e.g., shared by) the pod 1202 and the virtual copy 1212 of the pod 1202 and should be localized before performing the requested modification. This determination may be made in any suitable way, including based on the access context of the request, modification epochs of the pod associated with the access context of the request and the content to be modified, reference counting, and/or copy-on-write markers associated with the access context of the request and the content to be modified.

Storage system 1200 may then localize content of the pod 1202 and modify, based on the modification request, the content in the pod 1202 privately in any suitable manner that does not share the modification or the modified content with the virtual copy 1212 of the pod 1202. Accordingly, the modification made in the pod 1202 is private to the pod 1202 and thus distinct from the virtual copy 1212 of the pod 1202. In certain examples, in conjunction with modifying the content in the pod 1202, storage system 1200 may update metadata associated with the modified content, such as a modification epoch of the modified content (e.g., by updating an identifier associated with the content), a reference counter associated with the modified content, or a copy-on-write marker associated with the content, to indicate the localization and/or the modification of the content.

Figure 13A:
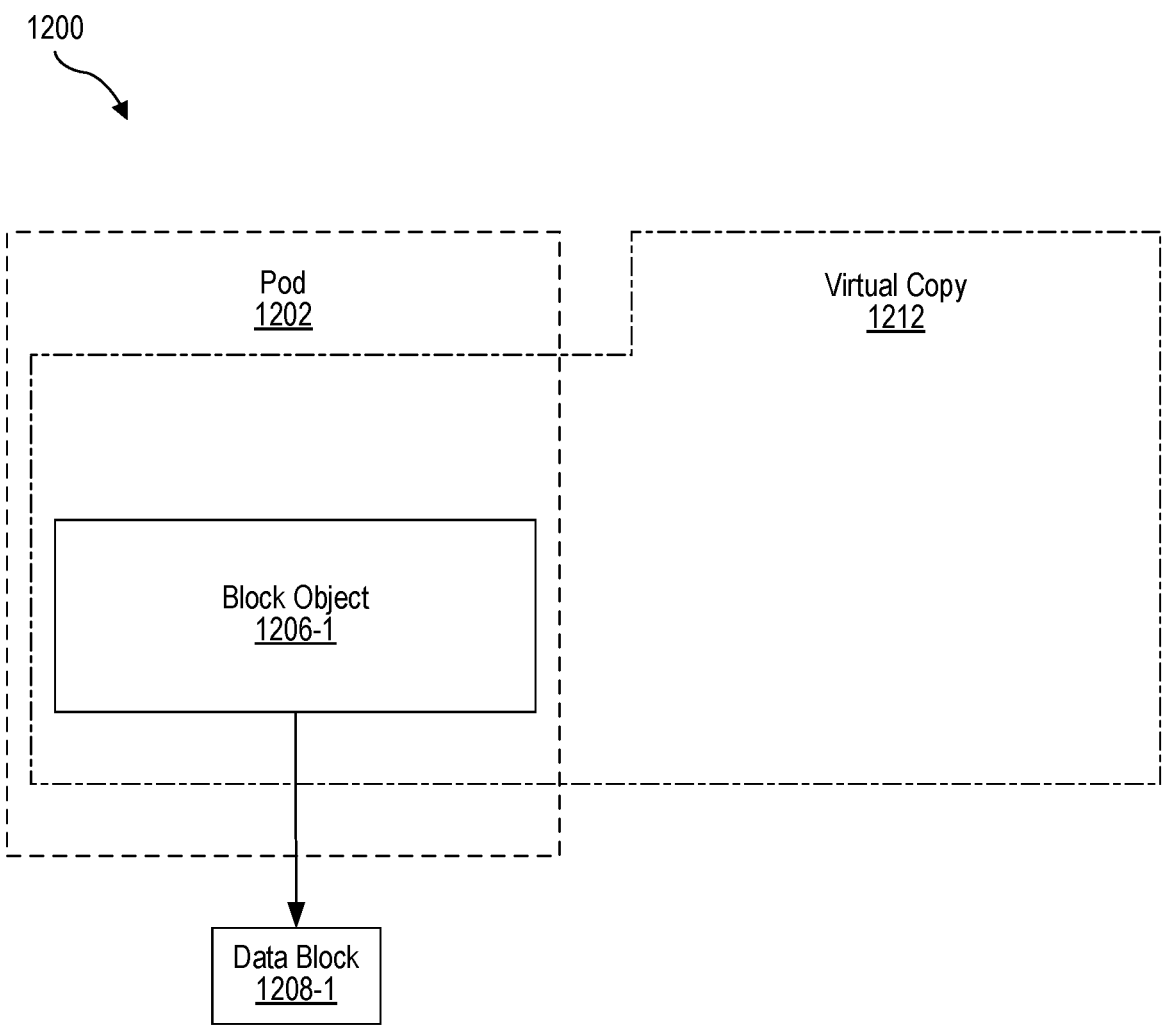
FIGS. 13A-13C illustrate an example of a modification to content of a virtually copied pod in accordance with some embodiments of the present disclosure.
Figure 13B:
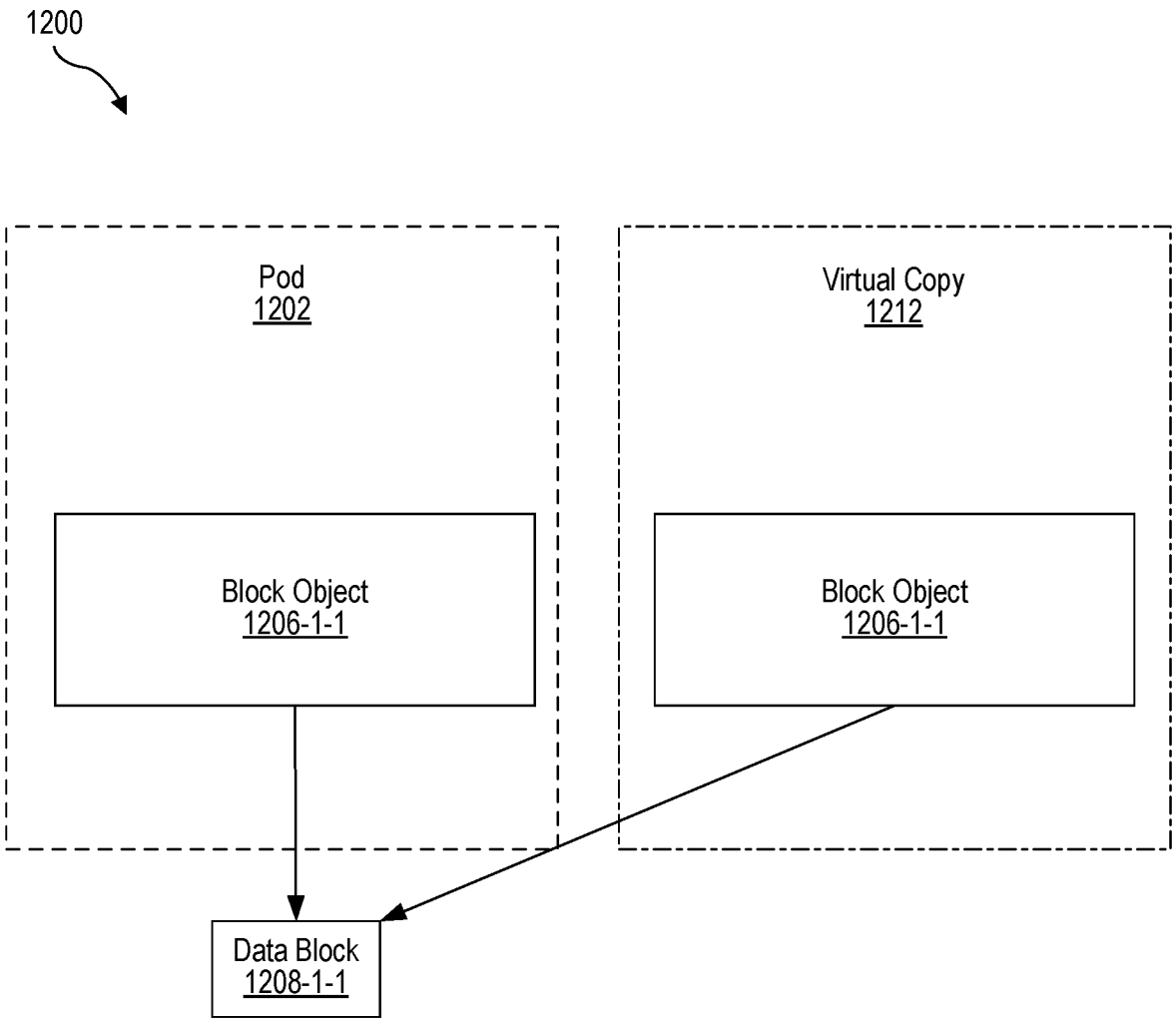
Figure 13C:
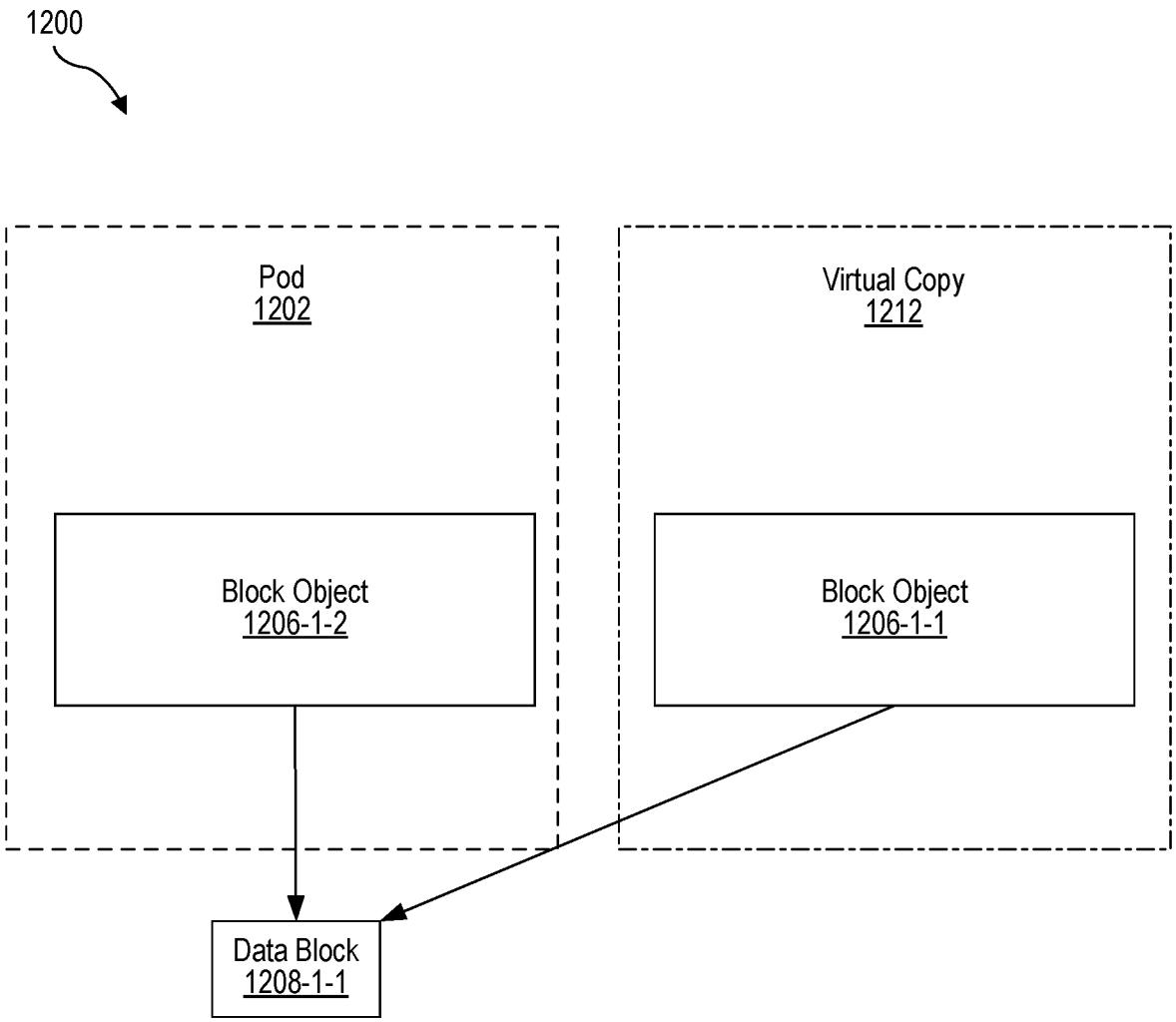

FIGS. 13A-13C illustrate an example of a modification being made to content of a block object in the pod 1202. In FIG. 13A, a block object 1206-1 is shared by the pod 1202 and the virtual copy 1212 of the pod 1202. Storage system 1200 detects a request to modify content of the block object 1206-1. The request to modify content of the block object 1206-1 may include a request to modify content of the block object 1206-1 without modifying a data block 1208-1 to which the block object 1206-1 is mapped or may include a request to modify the data block 1208-1 and involves modifying content of the block object 1206-1 because the block object 1206-1 is mapped to the data block 1208-1.

Storage system 1200 may determine an access context associated with the request, which may include determining whether the request is received by way of the pod 1202 or the virtual copy 1212 of the pod 1202. Storage system 1200 may also determine that the block object 1206-1 is shared between the pod 1202 and the virtual copy 1212 of the pod 1202 and should be localized before modifying the block object 1206-1 such that the modification will be local and distinct to the pod 1202 or the virtual copy 1212 of the pod 1202 and not shared with the other.

In response to the request and the determination to localize the block object 1206-1, storage system 1200 may generate virtual private instances of the block object 1206-1—a first private instance 1206-1-1 of the block object 1206-1 in the pod 1202 and a second private instance 1206-1-1 of the block object 1206-1 in the virtual copy 1212 of the pod 1202, as shown in FIG. 13B. In some examples, the virtual private instances 1206-1-1 of the block object 1206-1 may be identical to one another except for their respective associations with the pod 1202 and the virtual copy 1212 of the pod 1202. In certain examples, each virtual private instance 1206-1-1 of the block object 1206-1 may share, with the block object 1206-1, the initial content of the block object 1206-1 and a pod-relative identity of the block object 1206-1.

After the virtual private instances 1206-1-1 are generated, storage system 1200 may perform one or more requested modifications. For example, storage system 1200 may determine that the request to modify is received by way of the pod 1202, meaning that the modification is to be applied privately in the pod 1202, making the modification in the pod 1202 distinct from the virtual copy 1212 of the pod 1202. Storage system 1200 may then apply a requested modification to the first virtual private instance 1206-1-1 of the block object 1206-1 in the pod 1202 and not to the second virtual private instance 1206-1-1 of the block object 1206-2 in the virtual copy 1212 of the pod 1202. In FIG. 13C, the modified first virtual private instance 1206-1-1 is represented as modified first virtual private instance 1206-1-2 to indicate that the modified first virtual private instance 1206-1-2 in the pod 1202 is distinct (e.g., different) from the second virtual private instance 1206-1-1 in the virtual copy 1212 of the pod 1202.

The modification operations described above may apply to various types of virtual copies, such as when the virtual copy 1212 is a snapshot or a clone of the pod 1202. In examples in which the virtual copy 1212 is a snapshot of the pod 1202, the snapshot may be an immutable (e.g., a read-only) snapshot of the pod 1202 at a point in time. In such examples, modification requests may not be received by way of the snapshot of the pod 1202.

In examples in which the virtual copy 1212 is a clone of the pod 1202, the clone may be a mutable copy of the pod 1202 (e.g., a new pod that is a virtual clone of the pod 1202), meaning that after the clone of the pod 1202 is generated, each of the pod 1202 and the clone of the pod 1202 may be independently and privately modified without the modification being shared with the other. In such cloning examples, a modification request may be received by way of the pod 1202 to modify content of the pod 1202 or by way of the clone of the pod 1202 to modify content of the clone of the pod 1202. When a modification request is determined to be received by way of the clone of the pod 1202, storage system 1200 may operate as described above to apply a requested modification to a private instance in the clone of the pod (e.g., a virtual private instance of a block object in the pod) and not to a corresponding private instance in the source pod (e.g., a corresponding virtual private instance of a block object in the source pod).

As mentioned, a virtual copy of a pod may be a snapshot of the pod, which may be one form of a virtual copy. In certain examples, the snapshot of the pod may be an immutable (e.g., read-only), point-in-time image of the pod that represents the state of the pod at a point in time. The snapshot remains unchanged (virtually) until removed, but the original pod may localize its modifications from the snapshot (and any other snapshots of the pod) as the original pod is modified. That is, after the snapshot is created, the pod may continue to be writeable and thus able to be modified distinctly from the snapshot such that any modifications made to the pod after the snapshot is created are not made to the snapshot or any other snapshots of the pod. In certain examples, snapshots of a pod may remain associated with the pod during the lifespans of the snapshots until the snapshots are deleted. This association can, for example, be included in some calculations of space accounting, such as to provide an indication of how much physical capacity of a storage system a pod is using itself coupled with how much additional physical capacity of the storage system is used by the snapshots of the pod.

As also mentioned, a virtual copy of a pod may include a clone of the pod, which may be a second form of a virtual copy. In certain examples, the clone of the pod may be a distinct pod that is initially a mutable (e.g., writeable) copy of the pod. Upon creation of the clone pod, the source pod and the clone pod may be symmetrical with the same content (e.g., with their contents shared between them such as by the pods referencing the same contents). Each of the source pod and the clone pod may be independently modified such that modifications made to one of the pods are distinct from and not made to the other pod, allowing the pods to diverge from one another after the clone is created.

Storage system 1200 may be configured to perform any of the operations described herein to generate pod clones of pod snapshots, pod clones of pod clones, and/or pod snapshots of pod clones. As an example, the pod 1202 may be a snapshot or a clone of another pod, and the virtual copy 1212 of the pod 1202 may be a snapshot or a clone of the pod 1202. Accordingly, a sequence of virtual copies of pods may be generated by storage system 1200 and may include sequences of pod clones, pod snapshots, or both pod clones and pod snapshots.

Figure 14:
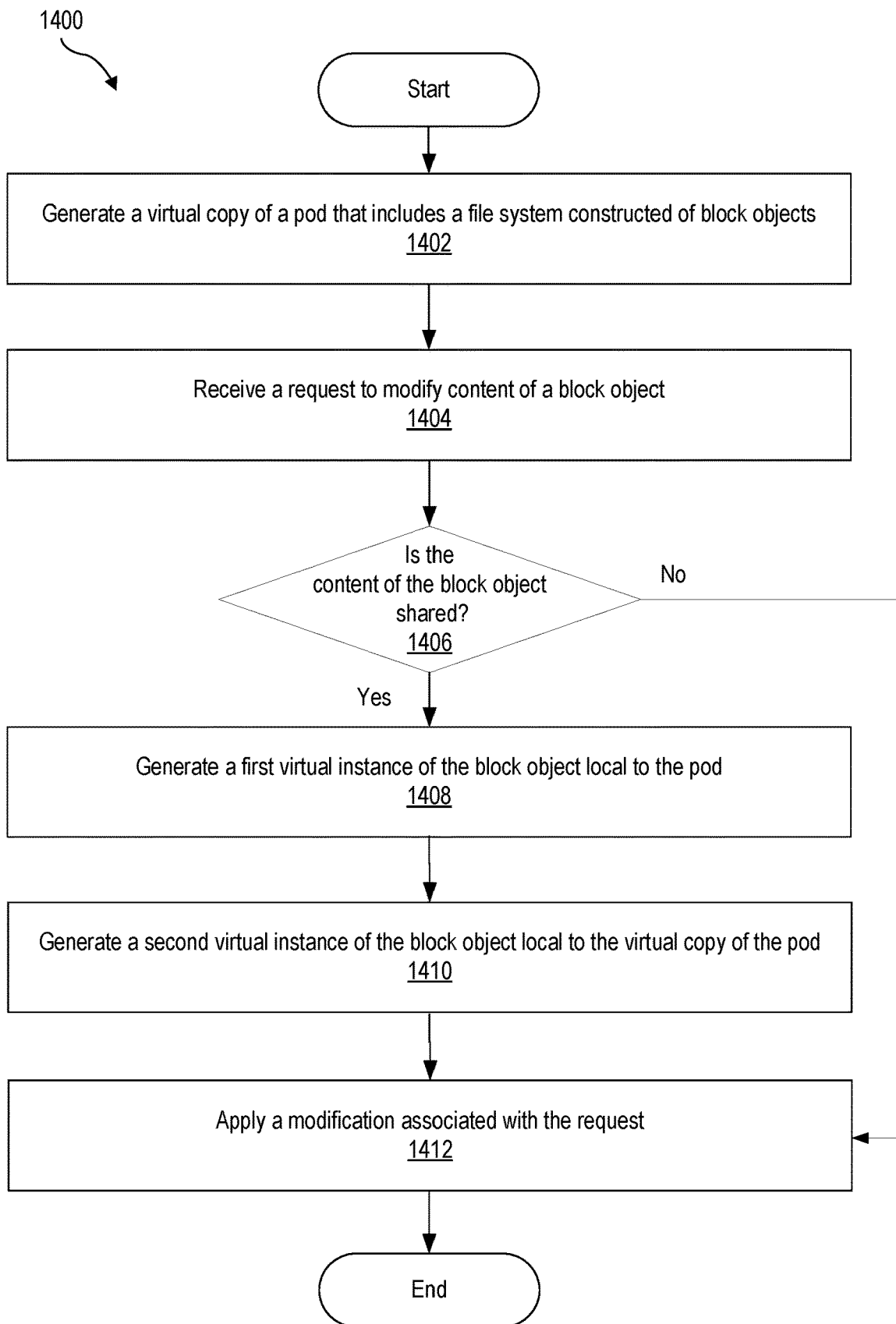
FIG. 14 illustrates an example method of copying a file system in accordance with some embodiments of the present disclosure.

FIG. 14 depicts an illustrative method 1400. While FIG. 14 illustrates example operations according to certain embodiments, other embodiments may omit, add to, reorder, and/or modify any of the operations shown in FIG. 14. One or more of the operations shown in FIG. 14 may be performed by a storage system, any components included therein, and/or any implementation thereof.

In operation 1402, a storage system generates a virtual copy of a pod that includes a file system constructed of block objects. The pod and the virtual copy of the pod initially share contents (e.g., contents of the block objects) between them, such as by the pod and the virtual copy of the pod each referencing the same contents (e.g., file system entities, block objects, metadata, etc.).

The storage system may generate the virtual copy of the pod in any suitable way, including in any of the ways described herein. For example, the generation of the virtual copy of the pod may include the storage system performing one or more of the operations described herein for the pod and/or the virtual copy of the pod in preparation for the initially shared contents to be subsequently localized distinctly between the pod and the virtual copy of the pod as needed. For example, the storage system may update information associated with the pod and/or the virtual copy of the pod, such as by updating an indirection table with information about the virtual copy of the pod (e.g., information about the virtual copy and its relationship with the file system), updating pod modification epochs (e.g., from a current epoch to a next epoch), updating pod identifiers (e.g., from a current identifier to a next identifier), providing a new epoch or identifier for the virtual copy, marking copy-on-write states, etc.

In operation 1404, the storage system receives a request to modify content of a block object included in the block objects. The request may be received in any suitable way or by way of any suitable access context and may include any type of modification request. While this particular example is described in the context of the modification request being associated with content of a block object, in other examples a modification request may include a request to modify any other content of the pod or the virtual copy of the pod (e.g., metadata, path sets, etc.).

In operation 1406, the storage system determines whether the content to be modified is shared between the pod and the virtual copy of the pod or is local to the pod or the virtual copy of the pod by way of which the request is received. Operation 1406 may be performed in any suitable way, including in any of the ways described herein. For example, the storage system may use the access context of the request, modification epochs, copy-on-write indications, reference counters, any other mechanism, or a combination of any of these mechanisms to make the determination.

When the storage system determines that the content of the block object is shared between the pod and the virtual copy of the pod, the storage system may perform operations 1408, 1410, and 1412 of method 1400. On the other hand, when the storage system determines that the content of the block object is local to the pod or the virtual copy of the pod, the storage system may perform operation 1412 without performing operations 1408 and 1410 of method 1400, as illustrated in FIG. 14.

In operation 1408, the storage system generates a first virtual instance of the block object local to the pod. The first virtual instance of the block object may share, with the block object, the content of the block object. Operation 1408 may be performed in any suitable way, including in any of the ways described herein.

In operation 1410, the storage system generates a second virtual instance of the block object local to the virtual copy of the pod. The second virtual instance of the block object may share, with the block object, the content of the block object. Operation 1410 may be performed in any suitable way, including in any of the ways described herein.

In operation 1412, the storage system applies a modification associated with the request. Operation 1412 (or an earlier operation of method 1400) may include the storage system determining an access context of the request, which may include determining if the request is received by way of the pod or the virtual copy of the pod. When the request is received by way of the pod, the storage system may apply the modification associated with the request to a private instance of the block object in the pod and not to a corresponding private instance of the block object in the virtual copy of the pod. The virtual private instance may be the first private virtual instance generated in operation 1408 if the content is shared and operation 1408 is performed or may be a virtual private instance generated previously in the pod if the content to be modified was previously localized to the pod. When the request is received by way of the virtual copy of the pod, the storage system may apply the modification associated with the request to a private instance of the block object in the virtual copy of the pod and not to a corresponding private instance of the block object in the pod. The virtual private instance may be the second private virtual instance generated in operation 1410 if the content is shared and operation 1410 is performed or may be a virtual private instance generated previously in the virtual copy of the pod if the content to be modified was previously localized to the virtual copy of the pod.

In certain examples, pods may be used for data replication. For example, a storage system (e.g., storage system 1200) may be configured to replicate a pod as a whole. To this end, a source storage system may establish a physical copy of a pod at some other location in a target storage system. The target storage system may be nearby the source storage system (e.g., in the same data center or a nearby data center) or farther away.

Replicating to a relatively nearby location connected with high-bandwidth networks could be synchronous, in which case the replicated copy is kept up to date with all modifications as they occur (or at least kept up to date with any completed modifications). In certain examples, a pod may be a subset of data in one storage system that is stretched as a unit to a mirrored copy on another storage system for symmetric access by hosts connected to either storage system (including single hosts connected to both storage systems). In this symmetric case, there may not be two distinctly separate and separately identified pods on the two storage systems; there may instead be one named and identified pod that stores physical copies on two storage systems (or really on any number of storage systems that are symmetrically replicating the pod). Updates to the pod that are initiated to any of the storage systems may then be synchronously replicated to the other copies of the pod on the other storage systems, at least between replicating storage systems that are running normally and communicating between each other and that store up-to-date physical copies of the pod.

Pods may be used for types of replication other than symmetrical synchronous replication. Such other models of replication may define administratively separate pods with an asymmetric relationship between them, with one being a source and one being a target at any particular point in time. Example versions of this will now be described.

One version is asymmetric synchronous replication, where there is an explicit source system that allows writes and that is synchronously replicating to a separate pod with a separate identity on a second storage system. Access on the second storage system (whichever storage system is currently the target) may require an operation to either enable access to a clone of the pod, such as for fire drill purposes, or an operation to switch replication so the prior target of replication is promoted to be the primary pod for the replication relationship, which makes the new primary the source of replication and the prior source of replication the target of replication at least if and when the prior source becomes available. This may happen when the original source faults in some way, and replication will usually be stopped when this happens. This may also happen as a set of administrative actions to flip source and target.

Another version is a second type of asymmetric replication sometimes referred to as "near sync" replication, where modifications to a source pod on one storage system are sent to a target pod on a second storage system but where signaling completion of modification operations to the source pod does not require waiting for an indication that the modification completed on the target. This type of replication may follow the same promotion, clone, fire drill, and direction reversal model as described above for asymmetric synchronous replication, except that some operations may preferably involve waiting for modifications to catch up before some direction switches, snapshot, or clone operations can complete.

Another version is a third type of asymmetric replication sometime referred to as asynchronous, periodic, or snapshot-based replication. This scheme involves periodically taking a snapshot (such as at intervals of once an hour, but it doesn't have to be at regular intervals) and sending the contents of that snapshot from a source storage system to one or more target storage systems. This may be done efficiently such that the amount of data sent for one snapshot is roughly related to the amount of change since the last transmitted snapshot. One implementation of snapshot-to-snapshot replication involves comparing a most recent snapshot to the prior transmitted snapshot and generating and transmitting a list of differences. Another implementation may involve using something similar for transmitting the list of block objects that have been created, deleted, or modified, while using a logical extent and content block identifier model for transmitting the actual changes to a block object.

When any of these forms of replication are implemented based on pods and ensure that block objects and relevant metadata for file systems within the pod are replicated from a pod on one storage system to a pod (either the same pod or a paired pod) on a second storage system, and while the replication process is running normally and isn't in some initial sync or out-of-sync recovery mode, then that second storage system will have all the contents of the file systems contained with the pod. In the case of symmetrically replicated pods, a file system could be accessible from all storage systems that share the pod, if the file system logic itself implements locking and other coordination needed to ensure consistent and correct access from the storage systems that share a symmetrically replicated pod containing a file system. In the case of asymmetrically replicated pods, a running and accessible file system may be associated with the source storage system that is currently active for updates to the source pod. Alternatively, a running and accessible file system may be associated with a clone of the pod on any storage system, such as for the fire drill case mentioned earlier.

Given that snapshots can be made to work with block objects or collections of block objects, and given that snapshots can be compared for differences by searching for storage entities that were added, removed, or modified between two snapshots, periodic or other difference-based replication techniques can transmit those differences from one storage system or data center to another. A storage system may employ mechanisms to optimize this, including taking into account data already transmitted or that is otherwise already stored on the target. These optimizations may include compression that suppresses the transmitting of repeated strings or that reduces the bytes transmitted by data containing a limited range of byte values. Optimizations may also use data checksums or fingerprints to determine that a replication target already has data that shows up as differences between two snapshots or that shows up in the initial transfer of a pod dataset to a target. Optimizations may also include awareness of blocks that have already been transmitted from a source storage system or data center to a target storage system or data center, such as because a block or logical data segment with an associated identifier was somehow virtually copied within that storage system (or was determined on the source storage system to be a duplicate within that storage system and was thus already reduced by that storage system's deduplication mechanism) and the transmitting of that block or logical data segment identifier is recognized on the target as having been transferred previously. Nearly synchronous replication of a pod, such as replication that depends on various kinds of lightweight checkpoints, can also be used.

In certain examples, a replication process may use a virtual copy of a pod. As an example, a first virtual copy and a second virtual copy of a source pod in a storage system may be generated and compared to determine any differences between the copies. The determined differences may then be used to update a replication of the pod in another storage system.

If a file system is created within a particular pod, resulting in all its block objects being created and manipulated within that same pod, then the operations described above may be straightforward. If a snapshot or clone is taken of the pod itself, then all the block objects and other file system state will be held in the snapshot and will be available in the clone. If the pod is replicated to another storage system, then all the block objects for the file system should also be replicated, whether the replication is synchronous, nearly synchronous, periodic, or based on copying pod snapshots.

More complex problems may arise in supporting moving file systems between pods, which may be a useful feature for ensuring that a set of file systems can be snapshotted, cloned, or replicated together and consistently, possibly together with other non-file system objects (such as volumes or other types of storage entities that can also be grouped together into a pod). If, for example, a pod is being replicated and a file system is moved into the pod, then all the file system and block objects should be replicated to the target, which would require that the replication process realize that the new block objects have been added to the pod. The contents of the file system (e.g., block, managed directory, and directory objects and structures) may not have otherwise been modified, so they might not show up as changed. A storage system (e.g., storage system 1200) may perform a process that checks for objects that had not previously been replicated, which process may detect that the new objects had not yet been replicated. This can represent a scalable bookkeeping problem if the number of block objects is very large. If the block objects need to be marked in some way as being part of a particular pod in order for replication to proceed efficiently, then the storage system can employ an intermediate transitioning table (e.g., an indirection table) to identify and note in the table that block objects identified as being part of a file system that is transitioning between pods should really be considered part of the target pod, even if they haven't been migrated yet. Then, operations to modify those block objects can detect the discrepancy and operate as if the block objects are part of the target pod, or move the block objects as part of the modifying operation. As long as the identity of the file system is the same or maps in a predictable way between pods, then file system level operations can first look for the block object in one pod and then in the other pod. If a file system is moved multiple times, then there could be a chain of pods to search looking for a particular block object.

Replication could also handle this similarly by considering block objects that have not yet moved, but that are part of a file system that has been moved, to be objects that should be replicated as part of the replication of that pod. This can cause a problem for snapshot or checkpoint-based replication if the snapshot or checkpoint cannot intrinsically account for the block objects that have not yet been moved. This could be handled by ensuring that any modification to a block object will first move the block object to the current pod for the block object's file system. As long as a file system is included or excluded from a snapshot or checkpoint depending on whether the file system was moved before or after the snapshot or checkpoint was established, then any modifications to block objects between the time a file system is moved into a pod and the time a snapshot or checkpoint is established will be included in the pod, and any unmodified block objects can be retrieved either from their prior location outside of the pod or from their unmodified state inside the pod and the results will be the same.

Also, if database-style mechanisms are used to store block-object-to-pod relationships, it may be a relatively fast table operation to modify block-object-to-pod relationships after a file system is transferred between pods.

The problem of moving a file system out of a pod may be similar. The map of a file system to a pod can be updated so the file system is no longer in its previous pod, and the file system's block objects would then follow suit, either indirectly by the block objects having a relationship to that file system which is no longer in the pod or by updating the block objects themselves to indicate that they are no longer in the pod, likely with the file system relationship happening first and the block object to pod mapping being updated later. As with modifications to block objects being moved into a pod as part of a file system, if an operation to modify a block object is applied to a block object in a file system that has been moved out of a pod, the block object can be moved out of the pod before applying the update to keep proper relationships to any prior or subsequent snapshots, checkpoints, or clones of the pod.

The various forms of pod-based replication may suffer from an issue: if an existing file system (or volume) is moved into a pod, then a very large dataset may suddenly be added to the data that must be replicated, which can be impossible, difficult, or impractical to replicate in a timely manner. Synchronous or nearly synchronous replication may not account for the sudden appearance of hundreds of gigabytes of data or hundreds of thousands of block objects and still maintain a zero or very low RPO and RTO. Snapshot-difference-based replication may also miss its RPO objectives if a terabyte of data or millions of new block objects are suddenly added as a result of a file system (or volume) being moved into a pod.

To address this issue, a storage system may be configured with a mechanism to migrate block volumes or file systems to a target storage system or data center before a file system (or volume) can be added to a pod that is being replicated. Such a mechanism may include a mechanism of joining two pods together or splitting pods apart from each other, with joining being efficient if the two pods are already replicated between the same storage systems. For example, the storage system may replicate a pod containing a file system to a target storage system prior to joining that pod with another pod that is already replicated between the source storage system and that target storage system. For synchronously replicated or nearly synchronously replicated pods, that join can itself be a replicated operation. For snapshot-difference-based replication, the join could be a transmitted operation as with synchronous or nearly synchronous replication, or the data already transmitted on behalf of one pod could contain block, data segment, or block object or file system identifiers that can make it clear when transmitting differences between two snapshots that include the time when one pod was joined to a second pod that the resulting blocks, logical segments, block objects, or file systems added to the second pod by the join are already present as a result of the first pod having already been replicated.

The transferring or replicating of one pod before it is joined with a second pod that is already replicated can also be performed in a number of ways, including by transferring the first pod over a network or establishing an ongoing replication for the first pod prior to the join operation, or by copying data for the first pod to some local but removeable storage (such as a separate storage system that can be disconnected from the first storage system's local network) and then physically transporting that removeable storage to the target storage system's data center (such as by putting it on a truck, train, plane, ship or some combination) and shipping it to the target data center to be installed and merged somehow with the target storage system's datasets. Some of these mechanisms of transmitting data for snapshot-difference-based replication can also be used for synchronous or nearly synchronous replication after a fault led to a temporary or extended replication outage.

In certain examples, one or more storage systems may be configured to identify instances of data, such as blocks or logical segments, that have already transferred between storage systems (e.g., as part of replication or other transfer operations). For example, a sequence of virtual copy operations (of pods, of block containers, or of logical sections of storage elements such as volumes or block containers to other logical sections of the same or of different such storage elements) can result in shared content as shared logical segments. These logical segments, or parts of logical segments, can be given identifiers that remain the same as long as the logical segment remains the same. If through some context that shares a first logical segment, content of that first segment is modified, then a second logical segment with a new identifier may be created. This second logical segment may share parts of the first logical segment, for at least some parts of the first logical segment that were not modified in the change that formed the second logical segment. These shared parts may retain identities from the first logical segment, with modified parts being given new unique identities.

Further, virtual copy operations or deduplication can result in data blocks being referenced from multiple logical segments. Uniquely stored blocks in a storage system, including non-duplicate, non-copied blocks, or blocks shared between storage elements as a result of virtual copy operations or deduplication can also have identities within a storage system. Pods, block objects, volumes, and other storage entities may share various data blocks, for example through copy operations or deduplication procedures, resulting in those storage entities incorporating those data blocks by those identities into their logical segments.

If at a point in time, a set of logical segments with combinations of logical segment or part identifiers, or a set of block identifiers, are somehow transferred (such as through a first replication) from a first storage system to a second storage system, then the second storage system can record some or all of these logical segment, part, and block identifiers. A subsequent process to replicate from the first storage system to the second storage system, or even to replicate from the second storage system back to the first storage system, can use these identifiers to determine that some logical segment, part, or block identifiers are already present on the target and thus the content for those logical segments, parts, or blocks don't need to be transferred, even though the presence of particular logical segment, part, or block identifiers may have resulted from a set of operations unrelated to the particular replication process. For example, a set of virtual copy operations may have resulted in a block object incorporating a logical segment, part, or block that had arrived in the storage system through some other replication or transfer process.

Further, replication processes, or other transfer processes, from the second storage system to a third storage system may result in a third storage system receiving logical segment, part, or blocks with identifiers that originated on the first storage system. A replication process that subsequently operates between the first and third storage systems can then determine that some of those logical segment, part, or block identifiers are already present, thus allowing their actual content transfer to be avoided, even though the identifiers resulted in being present on the third storage system as a result of the transfer from the second storage system to the third storage system that occurred after those logical segments, parts, or blocks were transferred from the first storage system to the second storage system.

This transitive use of identity to avoid content transfers can be extended arbitrarily to any number of storage systems making internal virtual copies and transferring data in various ways between each other. And, through any reasonable combination of such virtual copies and physical transfers, matching logical segment, part, and block identifiers can be compared to avoid transfers for content that the target of a physical transfer already stores.

This can also work for virtual storage systems running in virtual server environments or running in cloud provider infrastructure. Further, virtual or physical storage systems can store content in cloud provider infrastructure, such as in cloud-based object stores, and if those same identifiers are stored in the object stores, then those identifiers can be read to determine that a storage system that is reading data from the object store, such as to rehydrate the contents of a pod from a storage system that had stored its content in the object store, already has some of that content so the content for which the identifiers are already present then does not need to be read from the object store.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A data storage system comprising:
    a memory storing instructions; and
    a processor communicatively coupled to the memory and configured to execute the instructions to:
        generate, based on a pod that includes a file system constructed of block objects that are presented to the file system and that map file system data structures representative of files and directories of the file system to blocks of data, wherein the block objects are modifiable, with the block objects supporting random read-write access to ranges of bytes at a block level of the block objects, a virtual copy of the pod such that modifications made to the pod after the generation of the virtual copy of the pod are distinct from the virtual copy of the pod;
        the pod being a storage system construct that groups storage entities within a namespace and supports operations on the storage entities as a group.

2. The data storage system of claim 1, wherein:
    the pod and the virtual copy of the pod initially share contents of the block objects; and
    in response to a request to modify content of a block object of the block objects, the processor is configured to execute the instructions to:
        generate a first virtual private instance of the block object in the pod, wherein the first virtual private instance of the block object shares, with the block object, the content of the block object and a pod-relative identity of the block object; and
        generate a second virtual private instance of the block object in the virtual copy of the pod, wherein the second virtual private instance of the block object shares, with the block object, the content of the block object and the pod-relative identity of the block object.

3. The data storage system of claim 2, wherein the processor is configured to execute the instructions to:
    determine that the request is received by way of the pod; and
    apply a modification associated with the request to the first virtual private instance of the block object in the pod and not to the second virtual private instance of the block object in the virtual copy of the pod.

4. The data storage system of claim 2, wherein the processor is configured to execute the instructions to:
    determine that the request is received by way of the virtual copy of the pod; and
    apply a modification associated with the request to the second virtual private instance of the block object in the virtual copy of the pod and not to the first virtual private instance of the block object in the pod.

5. The data storage system of claim 1, wherein:
    the block objects store metadata for the files and directories of the file system; and
    the block objects, the files, and the directories are within the namespace of the pod.

6. The data storage system of claim 1, wherein:
    the virtual copy of the pod comprises a clone of the pod; and
    the generating of the virtual copy of the pod comprises creating a new mutable pod that is a virtual clone of the pod.

7. The data storage system of claim 1, wherein:
    the generating of the virtual copy of the pod comprises updating a modification epoch of the pod from a first epoch to a second epoch;
    the first epoch represents the pod at a point in time when the virtual copy of the pod is generated; and
    the second epoch represents a mutable version of the pod after the point in time when the virtual copy of the pod is generated.

8. The data storage system of claim 1, wherein:
    the pod and the virtual copy of the pod initially share contents of the block objects; and
    the generating of the virtual copy of the pod comprises marking the shared contents of the block objects as copy-on-write contents.

9. The data storage system of claim 1, wherein:
    the files and directories of the file system are managed in a file system layer of the data storage system; and
    the files and directories of the file system are constructed of the block objects managed in a block object store of the data storage system.

10. The data storage system of claim 9, wherein contents of the block objects:
    represent contents of the files and directories of the file system.

11. The data storage system of claim 1, wherein the processor is configured to execute the instructions to use the virtual copy of the pod in a replication process for the pod.

12. A data storage system comprising:
    a memory storing instructions; and
    a processor communicatively coupled to the memory and configured to execute the instructions to:
        generate, based on a pod that includes a file system constructed of block objects that are presented to the file system and that comprise metadata that maps file system data structures representative of files and directories of the file system to blocks of data in the data storage system, wherein the block objects are modifiable, with the block objects supporting random read-write access to ranges bytes at a block level of the block objects, a clone of the pod, wherein the pod and the clone of the pod initially share contents of the block objects;
        receive a request to modify content of a block object of the block objects;
        determine that the content of the block object is shared between the pod and the clone of the pod;

generate, based on the request, a first virtual private instance of the block object that is local to the pod and shares, with the block object, the content of the block object; and generate, based on the request, a second virtual private instance of the block object that is local to the clone of the pod and shares, with the block object, the content of the block object.

13. The data storage system of claim 12, wherein the processor is configured to execute the instructions to:

determine that the request is received by way of the clone of the pod; and apply a modification associated with the request to the second virtual private instance of the block object in the clone of the pod and not to the first virtual private instance of the block object in the pod.

14. A method comprising:

generating, based on a pod that includes a file system constructed of block objects in a data storage system, a virtual copy of the pod, wherein the pod and the virtual copy of the pod initially share contents of the block objects, wherein the block objects are presented to the file system and map file system data structures representative of files and directories of the file system to blocks of data, wherein the block objects are modifiable, with the block objects supporting random read-write access to ranges of bytes at a block level of the block objects;

receiving a request to modify content of a block object of the block objects;

determining that the content of the block object is shared between the pod and the virtual copy of the pod;

generating a first virtual instance of the block object that is local to the pod and shares, with the block object, the content of the block object; and generating a second virtual instance of the block object that is local to the virtual copy of the pod and shares, with the block object, the content of the block object.

15. The method of claim 14, further comprising:

determining that the request is received by way of the pod; and applying a modification associated with the request to the first virtual instance of the block object in the pod and not to the second virtual instance of the block object in the virtual copy of the pod.

16. The method of claim 14, further comprising:

determining that the request is received by way of the virtual copy of the pod; and applying a modification associated with the request to the second virtual instance of the block object in the virtual copy of the pod and not to the first virtual instance of the block object in the pod.

17. The method of claim 14, wherein the virtual copy of the pod comprises an immutable snapshot of the pod.

18. The method of claim 14, wherein:

the virtual copy of the pod comprises a clone of the pod; and the generating of the virtual copy of the pod comprises creating a new mutable pod that is a virtual clone of the pod.

19. The method of claim 14, wherein:

the generating of the virtual copy of the pod comprises updating an identity of the pod from a first identity to a second identity;

the first identity represents the pod at a point in time when the virtual copy of the pod is generated; and the second identity represents a mutable version of the pod after the point in time when the virtual copy of the pod is generated.

20. The method of claim 14, wherein:

the generating of the virtual copy of the pod comprises marking the shared contents of the block objects as copy-on-write contents.

* * * * *